United States Patent
Yang et al.

(10) Patent No.: US 11,860,447 B2
(45) Date of Patent: Jan. 2, 2024

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventors: Wen-Yao Yang, Taichung (TW); Kuan-Chun Wang, Taichung (TW); Hsin-Hsuan Huang, Taichung (TW); Huan-Sheng Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 416 days.

(21) Appl. No.: 17/137,662

(22) Filed: Dec. 30, 2020

(65) Prior Publication Data

US 2022/0035125 A1 Feb. 3, 2022

(30) Foreign Application Priority Data

Jul. 29, 2020 (TW) .................................. 109125620

(51) Int. Cl.
*G02B 9/60* (2006.01)
*G02B 13/00* (2006.01)
*G02B 3/04* (2006.01)

(52) U.S. Cl.
CPC ................. *G02B 9/60* (2013.01); *G02B 3/04* (2013.01); *G02B 13/0045* (2013.01)

(58) Field of Classification Search
CPC ........ G02B 9/60; G02B 3/04; G02B 13/0045; G02B 15/145125; G02B 15/145117; G02B 15/17; G02B 15/1441
See application file for complete search history.

(56) References Cited

U.S. PATENT DOCUMENTS

| 5,731,907 | A | 3/1998 | Sigler |
| 2016/0223791 | A1* | 8/2016 | Hsieh .................. G02B 13/0045 |
| 2016/0320589 | A1 | 11/2016 | Liao et al. |
| 2018/0059376 | A1 | 3/2018 | Lin et al. |
| 2018/0284394 | A1* | 10/2018 | Chen ........................ G02B 3/02 |
| 2018/0335610 | A1 | 11/2018 | Chen et al. |

(Continued)

FOREIGN PATENT DOCUMENTS

| CN | 107608053 A | 1/2018 |
| CN | 107664811 A | 2/2018 |
| CN | 108107549 A | 6/2018 |

(Continued)

*Primary Examiner* — Alicia M Harrington
*Assistant Examiner* — Justin W. Hustoft
(74) *Attorney, Agent, or Firm* — Locke Lord LLP; Tim Tingkang Xia, Esq.

(57) ABSTRACT

An imaging optical lens assembly includes five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side. The first lens element has positive refractive power, the second lens element has negative refractive power and the third lens element has negative refractive power. With specific conditions being satisfied, the imaging optical lens assembly can be miniaturized while providing good image quality.

28 Claims, 34 Drawing Sheets

(56) References Cited

U.S. PATENT DOCUMENTS

2018/0364455 A1   12/2018   Chen et al.
2019/0056570 A1    2/2019   Yeh et al.

FOREIGN PATENT DOCUMENTS

| CN | 108152936 A | 6/2018 |
|---|---|---|
| CN | 111007624 A | 4/2020 |
| TW | I679453 B | 12/2019 |
| WO | 2019205789 A1 | 10/2019 |

* cited by examiner

IMAGING OPTICAL LENS ASSEMBLY, IMAGING APPARATUS AND ELECTRONIC DEVICE

RELATED APPLICATIONS

This application claims priority to Taiwan Application Serial Number 109125620, filed on Jul. 29, 2020, which is incorporated by reference herein in its entirety.

BACKGROUND

Technical Field

The present disclosure relates to an imaging optical lens assembly and an imaging apparatus, and more particularly, to an imaging optical lens assembly and an imaging apparatus applicable to electronic devices.

Description of Related Art

With the advancement in semiconductor process technology, performances of image sensors have been improved, and pixels have been reduced to even smaller sizes. Therefore, imaging optical systems with high image quality have become an indispensable part of modern electronic devices.

With the rapid development of science and technology, the application range of electronic devices equipped with imaging optical systems have become wider, and the requirements for optical lens assemblies have become more diverse. It is difficult for conventional imaging optical systems to achieve a balance among multiple requirements, such as image quality, sensitivity, aperture size, volume or viewing angle. Therefore, there is a need for an imaging optical system that satisfies the aforementioned requirements.

SUMMARY

According to one aspect of the present disclosure, an imaging optical lens assembly comprises five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side. The first lens element has positive refractive power, the second lens element has negative refractive power, and the third lens element has negative refractive power. An axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an entrance pupil diameter of the imaging optical lens assembly is EPD, and the following conditions are satisfied:

$0.50<TL/f<1.0$;

$10.0<V4+V5<45.0$;

$0.15<T23/(T12+T34+T45)$; and $0.50<f/EPD<2.40$.

According to one aspect of the present disclosure, an imaging apparatus comprises the aforementioned imaging optical lens assembly, a reflective element, and an image sensor.

According to another aspect of the present disclosure, an electronic device comprises at least two imaging apparatuses disposed on the same side of the electronic device. The at least two imaging apparatuses comprise: a first imaging apparatus comprising the aforementioned imaging optical lens assembly and a first image sensor; and a second imaging apparatus comprising an optical lens assembly and a second image sensor. A field of view of the first imaging apparatus differs from a field of view of the second imaging apparatus by at least 30 degrees.

According to one aspect of the present disclosure, an imaging optical lens assembly comprises five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side. The third lens element has negative refractive power. An axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the image-side surface of the fifth lens element and the image surface is BL, an axial distance between the object-side surface of the first lens element and the image-side surface of the fifth lens element is TD, a curvature radius of the image-side surface of the first lens element is R2, a curvature radius of the object-side surface of the second lens element is R3, and the following conditions are satisfied:

$0.50<TL/f<1.0$;

$10.0<V4+V5<45.0$;

$0.38<T23/(T12+T34+T45)$;

$0.03<BL/TD<0.50$; and $-7.0<(R2+R3)/(R2-R3)<2.80$.

According to one aspect of the present disclosure, an imaging optical lens assembly comprises five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side. The first lens element has positive refractive power and the third lens element has negative refractive power. An axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the fourth lens element is f4, and the following conditions are satisfied:

$0.50 < TL/f < 1.0;$ $10.0 < V4+V5 < 45.0;$ $0.50 < T23/(T12+T34+T45);$ and $-2.0 < f/f4 < 1.50.$ According to one aspect of the present disclosure, an imaging optical lens assembly comprises five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side. The first lens element has positive refractive power. The third lens element has negative refractive power. At least one of the object-side surface and the image-side surface of the third lens element is aspherical. At least one of the five lens elements is made of plastic. There is an air gap between each of adjacent lens elements of the five lens elements. An axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the fourth lens element is f4, a central thickness of the fourth lens element is CT4, a central thickness of the fifth lens element is CT5, and the following conditions are satisfied:

$0.50 < TL/f < 1.0;$ $10.0 < V4+V5 < 70.0;$ $0.75 < T23/(T12+T34+T45);$ $-2.0 < f/f4 < 2.20;$ and $0.20 < (CT4+T45)/CT5 < 2.50.$

DETAILED DESCRIPTION

The present disclosure provides an imaging optical lens assembly including five lens elements. The five lens elements, in order from an object side to an image side along an optical path, are a first lens element, a second lens element, a third lens element, a fourth lens element and a fifth lens element. Each of the five lens elements has an object-side surface facing the object side and an image-side surface facing the image side. The first lens element has positive refractive power for providing significant converging power for miniaturization. The second lens element has negative refractive power to correct aberrations generated by the first lens element. The third lens element has negative refractive power, which is favorable for balancing the refractive power of the second lens element to avoid excessive aberrations from overly large refractive power of a single lens element.

The object-side surface of the first lens element may be convex in a paraxial region thereof to balance spherical and comatic aberrations of the imaging optical lens assembly. The object-side surface of the first lens element may be convex in a paraxial region thereof and the image-side surface of the first lens element may be convex in a paraxial region thereof, so as to balance the surface shape distribution of the first lens element at the object side and the image side, and to avoid total reflection caused by an excessively large incident angle of light on a lens surface.

The image-side surface of the second lens element may be concave in a paraxial region thereof to achieve a balance with the first lens element, so as to better control the optical path and reduce aberrations. The object-side surface of the second lens element may be convex in a paraxial region thereof and the image-side surface of the second lens element may be concave in a paraxial region thereof, so as to favorably correct astigmatism of the imaging optical lens assembly.

Figure 16:
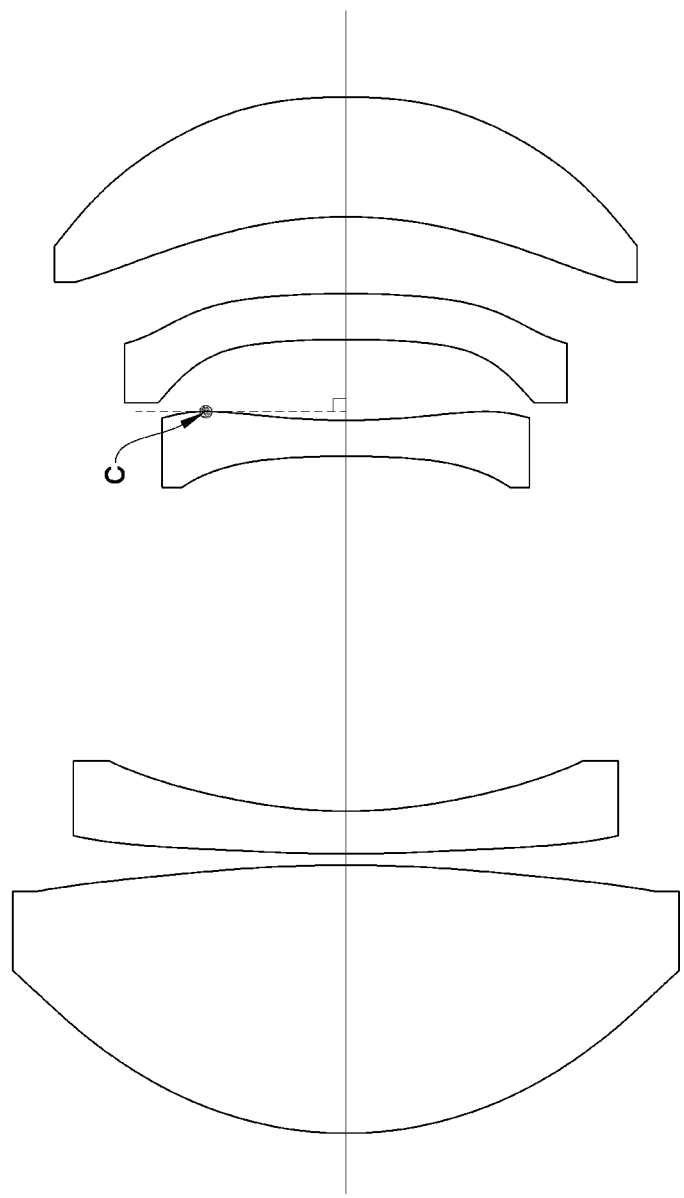
FIG. 16 is a schematic view illustrating the critical point in the 1st embodiment of the present disclosure as an example.

The image-side surface of the third lens element may be concave in a paraxial region thereof to shorten the back focal length for miniaturization of the imaging optical lens assembly. The image-side surface of the third lens element may be concave in a paraxial region thereof and has at least one convex critical point in an off-axis region thereof so as to correct field curvatures and distortion to flatten the Petzval surface. Please refer to FIG. 16, which is a schematic view illustrating the critical point in the 1st embodiment as an example. In addition, at least one of the object-side surface and the image-side surface of the third lens element is aspheric, which can increase the degree of freedom in lens design and correct off-axis aberrations.

The object-side surface of the fifth lens element may be concave in a paraxial region thereof and the image-side surface of the fifth lens element may be concave in a paraxial region thereof, which can increase the symmetry of the imaging optical lens assembly and improve image quality.

Figure 17:
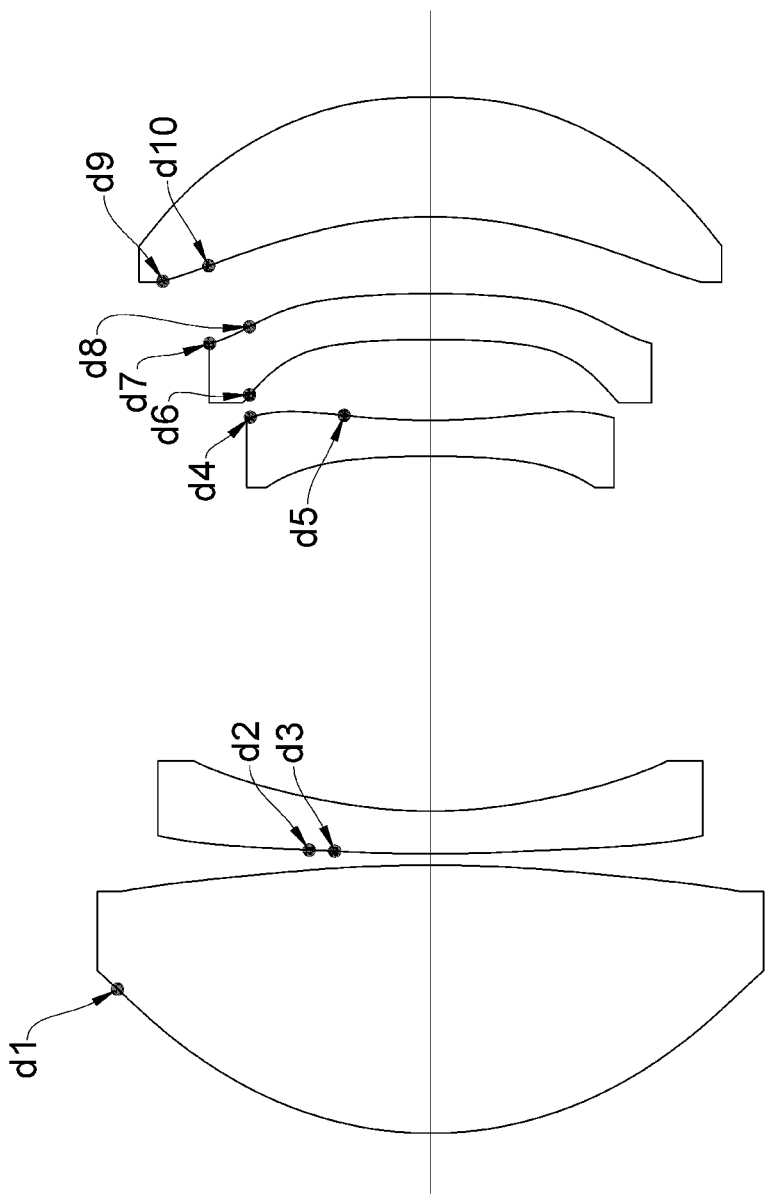
FIG. 17 is a schematic view illustrating the inflection point in the 1st embodiment of the present disclosure as an example.

At least one of the five lens elements has at least one inflection point, which can correct distortion of the image periphery. Please refer to FIG. 17, which is a schematic view illustrating the inflection point in the 1st embodiment as an example.

The axial distance between the second lens element and the third lens element can be the maximum among all axial distances between adjacent lens elements, which can facilitate a telecentric structure and provide a sufficient image size.

The absolute value of the focal length of the first lens element can be the minimum among absolute values of focal lengths of the five lens elements, which can facilitate the formation of a telephoto and the effective convergence of incident light.

The effective radius of the object-side surface of the first lens element can be the largest among effective radii of surfaces of the five lens elements, which can provide a larger range of incident light to ensure sufficient image brightness.

The effective radius of the object-side surface or the image-side surface of the third lens element can be the smallest among effective radii of surfaces of the five lens elements, which can increase the symmetry of the imaging optical lens assembly and improve image quality.

At least one of the five lens elements can be made of plastic, which can increase the degree of freedom in lens design and improve feasibility of mass production.

There can be an air gap between each of adjacent lens elements of the five lens elements, which can simplify the lens assembling process and improve the assembly yield rate.

An axial distance between the object-side surface of the first lens element and an image surface is TL, and a focal length of the imaging optical lens assembly is f. When the following condition is satisfied: $0.50<TL/f<1.0$, a total track length and the field of view of the lens assembly can be balanced for more device applications. Moreover, the following condition can be satisfied: $0.60<TL/f<0.90$.

An Abbe number of the fourth lens element is V4, and an Abbe number of the fifth lens element is V5. When the following condition is satisfied: $10.0<V4+V5<70.0$, chromatic aberrations of the imaging optical lens assembly can be corrected. Moreover, the following condition can be satisfied: $10.0<V4+V5<45.0$. Moreover, the following condition can be satisfied: $20.0<V4+V5<40.0$.

An axial distance between the first lens element and the second lens element is T12, an axial distance between the second lens element and the third lens element is T23, an axial distance between the third lens element and the fourth lens element is T34, and an axial distance between the fourth lens element and the fifth lens element is T45. When the following condition is satisfied: $0.15<T23/(T12+T34+T45)$, distances between the lens elements can be balanced to facilitate the lens assembling process favorably and improve the yield rate. Moreover, the following condition can be satisfied: $0.38<T23/(T12+T34+T45)$. Moreover, the following condition can be satisfied: $0.50<T23/(T12+T34+T45)$. Moreover, the following condition can be satisfied: $0.75<T23/(T12+T34+T45)$. Moreover, the following condition can be satisfied: $1.20<T23/(T12+T34+T45)$. Moreover, the following condition can be satisfied: $0.30<T23/(T12+T34+T45)<15.0$. Moreover, the following condition can be satisfied: $1.60<T23/(T12+T34+T45)<10.0$. Moreover, the following condition can be satisfied: $2.0<T23/(T12+T34+T45)<7.0$ The focal length of the imaging optical lens assembly is f, and an entrance pupil diameter of the imaging optical lens assembly is EPD. When the following condition is satisfied: $0.50<f/EPD<2.40$, the lens aperture can be well adjusted to increase the amount of incident light into the system and improve image brightness. Moreover, the following condition can be satisfied: $1.0<f/EPD<2.20$.

A minimum among Abbe numbers of the lens elements of the imaging optical lens assembly is Vdmin. When the following condition is satisfied: $10.0<Vdmin<20.0$, the focal points of different wavelengths can be corrected to avoid image overlaps. Moreover, the following condition can be satisfied: $12.0<Vdmin<19.0$. Moreover, the following condition can be satisfied: $12.0<Vdmin<18.0$.

A maximum effective radius on the object-side surface of the first lens element is Y11, and a maximum effective radius on the image-side surface of the fifth lens element is Y52. When the following condition is satisfied: $1.0<Y11/Y52<1.80$, the ratio of the light ranges between incident light and exiting light can be balanced to effectively control image brightness.

The entrance pupil diameter of the imaging optical lens assembly is EPD, and a maximal image height of the imaging optical lens assembly is ImgH. When the following condition is satisfied: $1.50<EPD/ImgH<3.0$, it is favorable for providing sufficient incident light and light receiving area to avoid vignetting around the image. Moreover, the following condition can be satisfied: $1.80<EPD/ImgH<2.30$.

An axial distance between the aperture stop and the image surface is SL, and an axial distance between the object-side surface of the first lens element and the image surface is TL. When the following condition is satisfied: $0.75<SL/TL<0.92$, the aperture stop can be well positioned to balance the total track length of the imaging optical lens assembly. Moreover, the following condition can be satisfied: $0.80<SL/TL<0.89$.

A central thickness of the second lens element is CT2, a central thickness of the third lens element is CT3, a central thickness of the fourth lens element is CT4, and an axial distance between the second lens element and the third lens element is T23. When the following condition is satisfied: $0.05<(CT2+CT3+CT4)/T23<1.10$, the distribution of the distances between lens elements can be balanced to facilitate favorable telephoto photography. Moreover, the following condition can be satisfied: $0.10<(CT2+CT3+CT4)/T23<0.60$.

An axial distance between the image-side surface of the fifth lens element and the image surface is BL, and an axial distance between the object-side surface of the first lens element and the image-side surface of the fifth lens element is TD. When the following condition is satisfied: $0.03<BL/TD<0.50$, it is favorable for avoiding interference due to an overly short back focal length, and the imaging optical lens assembly from becoming excessively large due to an overly long back focal length. Moreover, the following condition can be satisfied: $0.05<BL/TD<0.20$.

A curvature radius of the image-side surface of the first lens element is R2, and a curvature radius of the object-side surface of the second lens element is R3. When the following condition is satisfied: $-7.0<(R2+R3)/(R2-R3)<2.80$, the lens surface shapes of the first lens element and the second lens element can be effectively balanced, so as to better control the optical path by the first lens element, and the second lens element can be used to correct the stronger refractive power of the first lens element. Moreover, the following condition can be satisfied: $-2.5<(R2+R3)/(R2-R3)<1.8$. Moreover, the following condition can be satisfied: $-0.5<(R2+R3)/(R2-R3)<0.7$.

A curvature radius of the object-side surface of the third lens element is R5, and a curvature radius of the image-side surface of the third lens element is R6. When the following condition is satisfied: $0<(R5+R6)/(R5-R6)<1.45$, it is favorable to control the optical path by the third lens element so as to reduce the refraction angle.

The maximal image height of the imaging optical lens assembly is ImgH, and the focal length of the imaging optical lens assembly is f. When the following condition is satisfied: $0.10<ImgH/f<0.26$, the lens assembly can provide an improved field of view for use in telephoto systems.

A central thickness of the first lens element is CT1, and the central thickness of the fourth lens element is CT4. When the following condition is satisfied: $0.08<CT4/CT1<0.25$, it is favorable for balancing the ratio of the central thicknesses between the first lens element and the fourth lens element so as to control the size of the imaging optical lens assembly.

The focal length of the imaging optical lens assembly is f, and a focal length of the fourth lens element is f4. When the following condition is satisfied: $-2.0<f/f4<2.20$, aberrations generated by the third lens element can be corrected. Moreover, the following condition can be satisfied: $-2.0<f/f4<1.50$. Moreover, the following condition can be satisfied: $-0.80<f/f4<0.80$.

The focal length of the imaging optical lens assembly is f, and a focal length of the third lens element is f3. When the following condition is satisfied: $-2.80<f/f3<-1.20$, the third lens element has sufficient refractive power to provide significant diverging capability of the imaging optical lens assembly.

A maximum among refractive indices of the five lens elements of the imaging optical lens assembly is Nmax. When the following condition is satisfied: $1.67<Nmax<1.75$, the five lens elements can have sufficient optical path refraction capability, while controlling the manufacturing costs and stabilizing the yield rate.

The focal length of the imaging optical lens assembly is f, and a focal length of the fifth lens element is f5. When the following condition is satisfied: $-0.60<f/f5<0.80$, the incident angle of light on the image surface can be controlled to maintain adequate brightness at the peripheral field.

A maximum effective radius on the object-side surface of the first lens element is Y11, and a maximum effective radius on the object-side surface of the third lens element is Y31. When the following condition is satisfied: $1.50<Y11/Y31<2.80$, it can ensure enough incoming light with light converging at the middle section of the imaging optical lens assembly, so that the needs for both telephoto features and illumination can be fulfilled. Moreover, the following condition can be satisfied: $1.80<Y11/Y31<2.30$.

The central thickness of the fourth lens element is CT4, a central thickness of the fifth lens element is CT5, and the axial distance between the fourth lens element and the fifth lens element is T45. When the following condition is satisfied: $0.20<(CT4+T45)/CT5<2.50$, the space distribution at the back section of the imaging optical lens assembly can be balanced to improve image quality. Moreover, the following condition can be satisfied: $0.50<(CT4+T45)/CT5<1.50$.

The central thickness of the first lens element is CT1, the axial distance between the second lens element and the third lens element is T23, and the axial distance between the image-side surface of the fifth lens element and the image surface is BL. When the following condition is satisfied: $3.50<(CT1+T23)/BL<13.0$, the space distribution of the system can be balanced to facilitate a miniaturized telephoto structure. Moreover, the following condition can be satisfied: $4.50<(CT1+T23)/BL<10.0$.

A field of view of the imaging optical lens assembly is FOV. When the following condition is satisfied: $0.10<\tan(FOV)<0.55$, it favorably facilitates the telephoto configuration so as to improve the image quality of distant objects.

The central thickness of the fifth lens element is CT5, and a distance in parallel with the optical axis from an effective radius position on the object-side surface of the fifth lens element to an effective radius position on the image-side surface of the fifth lens element is ET5. When the following condition is satisfied: $1.20<CT5/ET5<4.50$, the thickness ratio between the center and the periphery of the fifth lens element can be optimized to improve the resolving power control at the image center. Moreover, the following condition can be satisfied: $1.60<CT5/ET5<3.80$.

The focal length of the imaging optical lens assembly is f, the focal length of the third lens element is f3, the focal length of the fourth lens element is f4, and the focal length of the fifth lens element is f5. When the following condition is satisfied: $(|f/f4|+|f/f5|)/|f/f3|<1.0$, the fourth lens element and the fifth lens element can be correction lenses to correct off-axis aberrations. Moreover, the following condition can be satisfied: $(|f/f4|+|f/f5|)/|f/f3|<0.70$. Moreover, the following condition can be satisfied: $(|f/f4|+|f/f5|)/|f/f3|<0.50$.

An Abbe number of the i-th lens element is Vi, and a refractive index of the i-th lens element is Ni. When the following condition is satisfied: $(Vi/Ni)min<11.2$, wherein $i=1\sim5$, it is favorable for improving the optical path controlling capability to correct chromatic aberrations. Moreover, the following condition can be satisfied: $(Vi/Ni)min<11.0$, wherein $i=1\sim5$.

The present disclosure further provides an imaging apparatus comprising the aforementioned imaging optical lens assembly, a reflective element, and an image sensor. The imaging optical lens assembly can have optical paths with various directions, so as to provide flexible usage of the lens space, for more demanding specifications.

In the imaging optical lens assembly according to the present disclosure, at least one reflective element capable of altering the optical path, such as a prism or a reflective mirror, can be optionally provided on the imaging optical path between the imaged object and the image surface. Then, the imaging optical lens assembly can be provided with more flexibility for its space arrangement, so that minimization of electronic devices is not limited by the total track length of the imaging optical lens assembly.

Figure 18A:
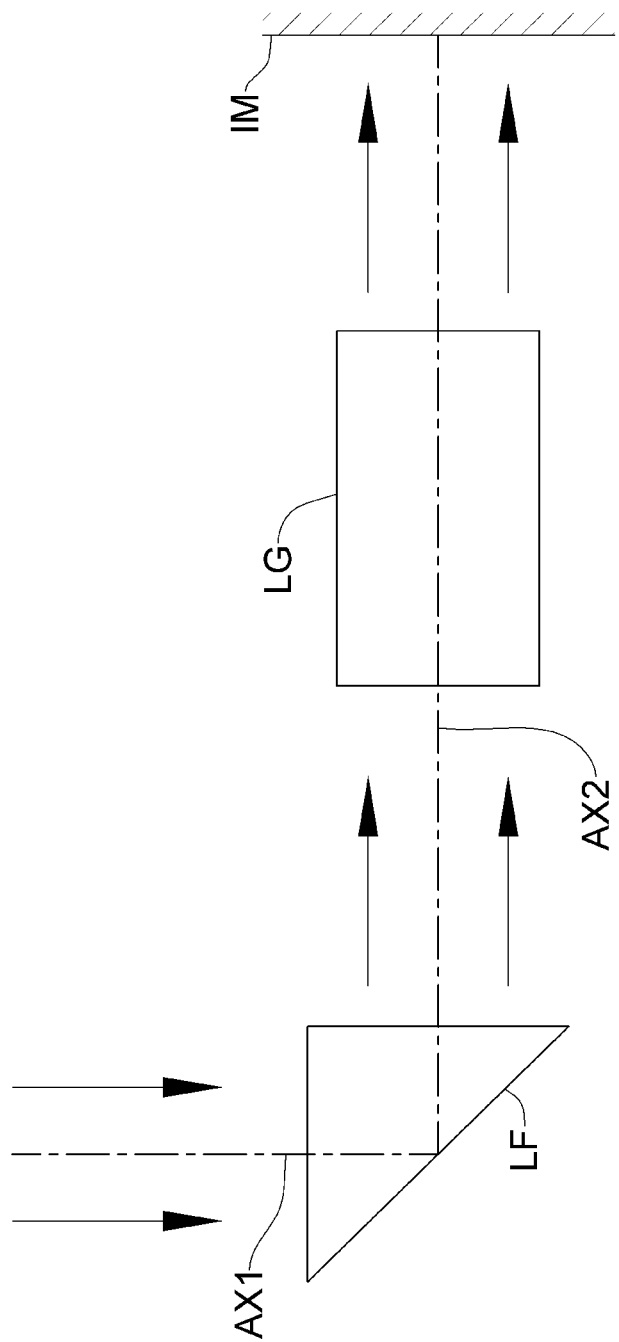
FIG. 18A is a schematic view of an imaging apparatus according to the 1st embodiment of the present disclosure as an example, where the imaging apparatus includes one reflective element.

Please refer to FIG. 18A, which is a schematic view of the imaging apparatus according to the 1st embodiment of the present disclosure as an example, where the imaging apparatus includes one reflective surface. As shown in the figure, the optical element LF is a prism including a reflective surface, so that the optical axis AX1 and the optical axis AX2 form an angle of 90 degrees. The optical path goes along the optical axis AX2 through the imaging optical lens assembly LG and forms an image on the image surface IM, which is perpendicular to the optical axis AX2.

Figure 18B:
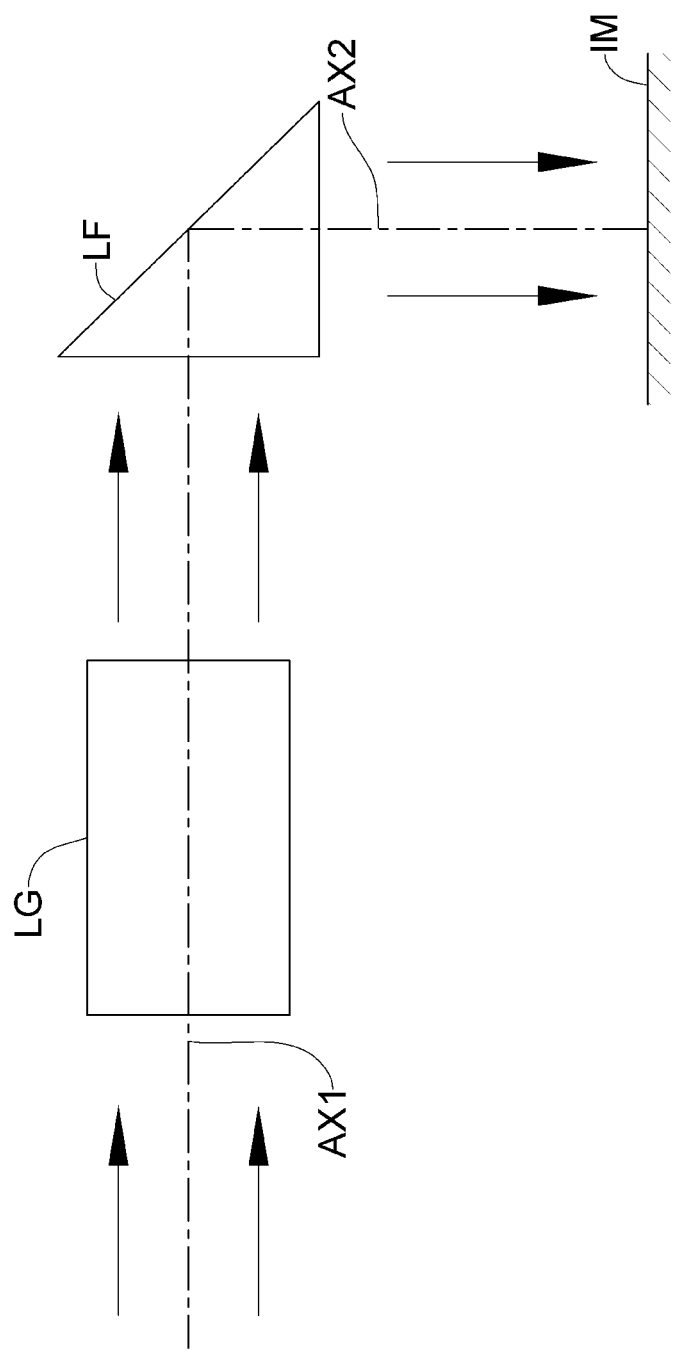
FIG. 18B is a schematic view of another imaging apparatus according to the 1st embodiment of the present disclosure as an example, where the imaging apparatus includes one reflective element.

Please refer to FIG. 18B, which is a schematic view of the imaging apparatus according to the 1st embodiment of the present disclosure as an example, where the imaging apparatus includes one reflective surface. As shown in the figure, the optical element LF is a prism including a reflective surface, so that the optical axis AX1 and the optical axis AX2 form an angle of 90 degrees. The optical path goes along the optical axis AX1 through the imaging optical lens assembly LG and forms an image on the image surface IM, which is perpendicular to the optical axis AX2.

Figure 18C:
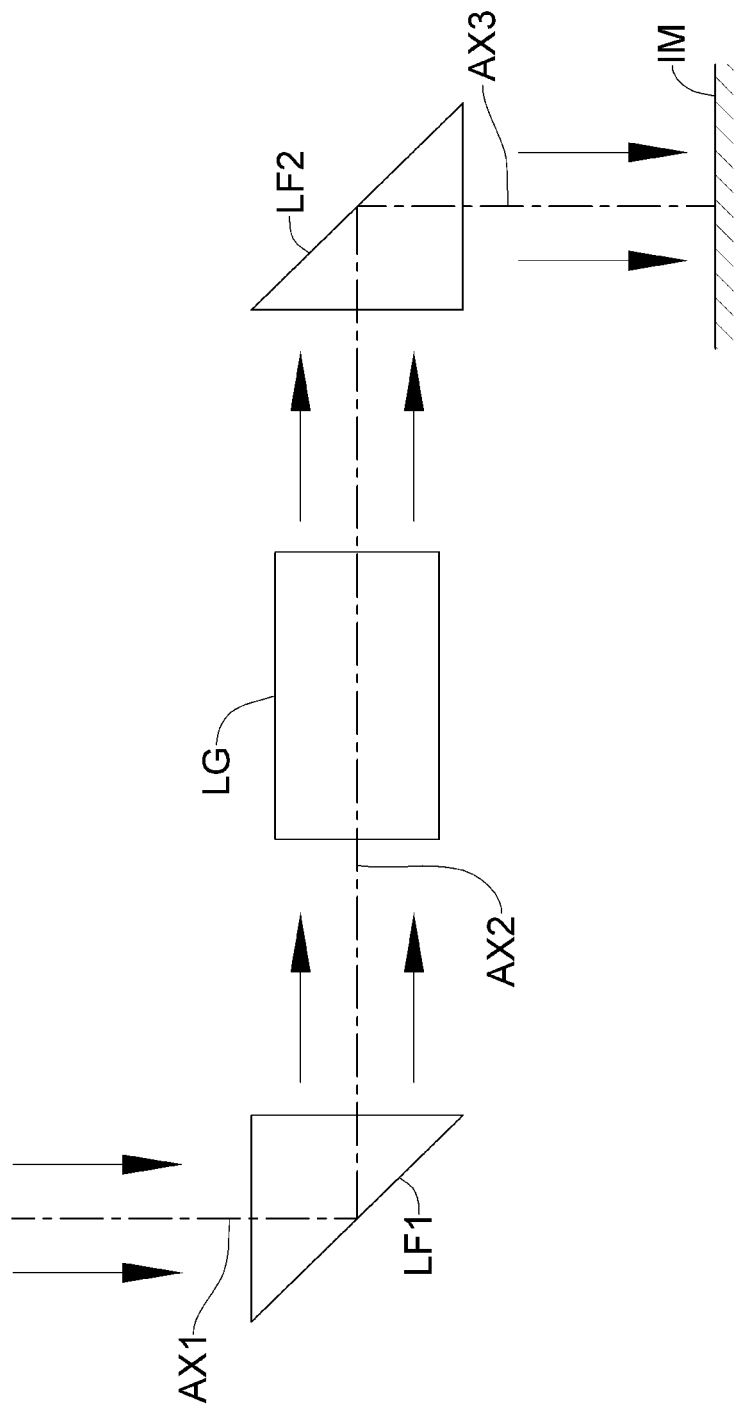
FIG. 18C is a schematic view of yet another imaging apparatus according to the 1st embodiment of the present disclosure as an example, where the imaging apparatus includes two reflective elements.

Please refer to FIG. 18C, which is a schematic view of another imaging apparatus according to the 1st embodiment of the present disclosure as an example, where the imaging apparatus includes two reflective surfaces. As shown in the figure, the first optical element LF1 is a prism including a reflective surface, so that the optical axis AX1 and the optical axis AX2 form an angle of 90 degrees. The second optical element LF2 is a prism including a reflective surface, so that the optical axis AX2 and the optical axis AX3 form an angle of 90 degrees. The reflective surface of the first optical element LF1 and the reflective surface of the second optical element LF2 are parallel, so that the optical axis AX1 is parallel to the optical axis AX3 and the optical path travels in the same direction along them. The optical path travels along the optical axis AX1 to the reflective surface of the first optical element LF1 and is reflected by said reflective surface. Thereafter, the optical path goes along the optical axis AX2 through the imaging optical lens assembly LG; after the light is reflected by the reflective surface of the second optical element LF2, the optical path goes along the optical axis AX3 and then an image is formed on the image surface IM, which is perpendicular to the optical axis AX3.

The present disclosure further provides an electronic device comprising at least two imaging apparatuses disposed on the same side thereof, wherein the at least two imaging apparatuses comprise: a first imaging apparatus, comprising the aforementioned imaging optical lens assembly and a first image sensor; and a second imaging apparatus, comprising an optical lens assembly and a second image sensor, wherein a field of view of the first imaging apparatus differs from a field of view of the second imaging apparatus by at least 30 degrees, which can equip the system with different shooting experiences for users, so that the system can be used in various fields of applications.

The aforementioned features of the imaging optical lens assembly can be utilized in numerous combinations so as to achieve corresponding effects.

According to the imaging optical lens assembly of the present disclosure, the optical elements thereof can be made of glass or plastic material. When the optical elements are made of glass material, the distribution of the refractive power of the imaging lens system may be more flexible to design and the effect of external environmental temperature on imaging can be reduced. Technologies such as grinding or molding can be used for producing glass optical elements. When the optical elements are made of plastic material, manufacturing costs can be effectively reduced. Furthermore, surfaces of each optical element can be arranged to be spherical or aspheric (ASP). Arranging the spherical surfaces can reduce difficulties in manufacturing while arranging the aspheric surfaces can result in more control variables for eliminating aberrations and to further decrease the required quantity of optical elements; also, the total track length of the imaging optical lens assembly can be effectively reduced. Processes such as plastic injection molding or molded glass lens can be used for making the aspheric surfaces.

According to the imaging optical lens assembly of the present disclosure, if a surface of an optical element is aspheric, it means that the surface has an aspheric shape throughout its optical effective area, or a portion(s) thereof.

According to the imaging optical lens assembly of the present disclosure, additives may be selectively added to the material of any one (or more) optical element to change the transmittance of said optical element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, additives can prevent unwanted disrupting light in particular wavelength ranges affecting the final image. In addition, additives may be evenly mixed in the plastic material for manufacturing optical elements with an injection molding process.

According to the imaging optical lens assembly of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

According to the imaging optical lens assembly of the present disclosure, the critical point is a non-axial point on the surface of the lens element where a tangential plane of the point is perpendicular to the optical axis.

According to the imaging optical lens assembly of the present disclosure, the image surface of the imaging optical lens assembly, based on the corresponding image sensor, can be a plane or a curved surface with an arbitrary curvature, especially a curved surface being concave facing the object side. Meanwhile, the imaging optical lens assembly of the present disclosure may optionally include one or more image correction components (such as a field flattener) between the image surface and the optical element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and arranged near the image surface.

According to the imaging optical lens assembly of the present disclosure, the imaging optical lens assembly can include at least one stop, such as an aperture stop, a glare stop or a field stop, so as to favorably reduce the amount of stray light and thereby improving the image quality.

According to the imaging optical lens assembly of the present disclosure, an aperture stop can be configured as a front stop or a middle stop. The front stop disposed between an imaged object and the first optical element can provide a longer distance between an exit pupil of the optical lens assembly and the image surface, so that the generated telecentric effect can improve the image-sensing efficiency of an image sensor, such as a CCD or CMOS sensor. The middle stop disposed between the first optical element and the image surface is favorable for enlarging the field of view of the imaging optical lens assembly, thereby providing the optical lens assembly with the advantage of a wide-angle lens.

An aperture control unit may be disposed in the imaging optical lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the imaging optical lens assembly.

According to the above description of the present disclosure, the following specific embodiments are provided for further explanation.

1st Embodiment

Figure 1A:
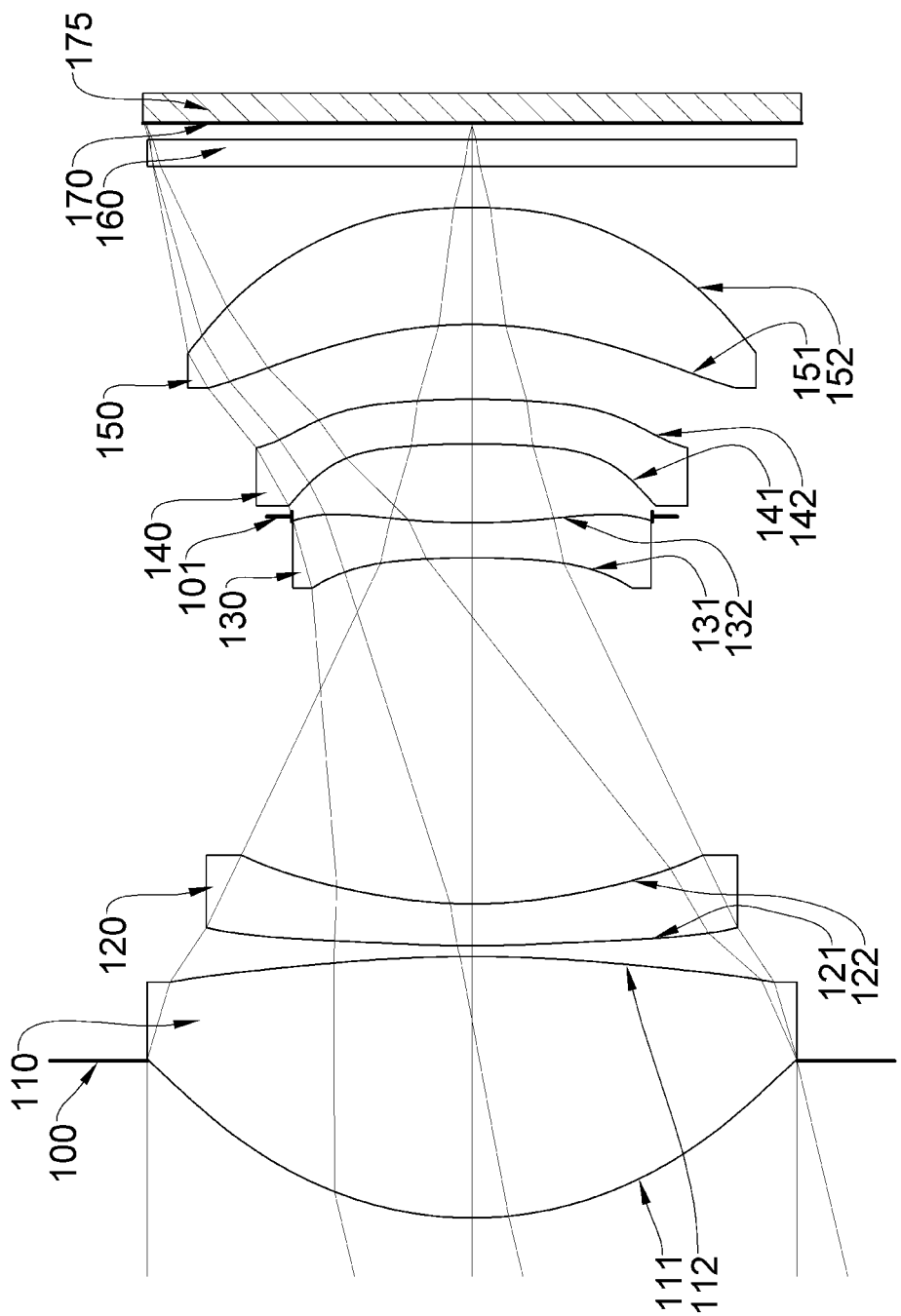
FIG. 1A is a schematic view of an imaging apparatus according to the 1st embodiment of the present disclosure.
Figure 1B:
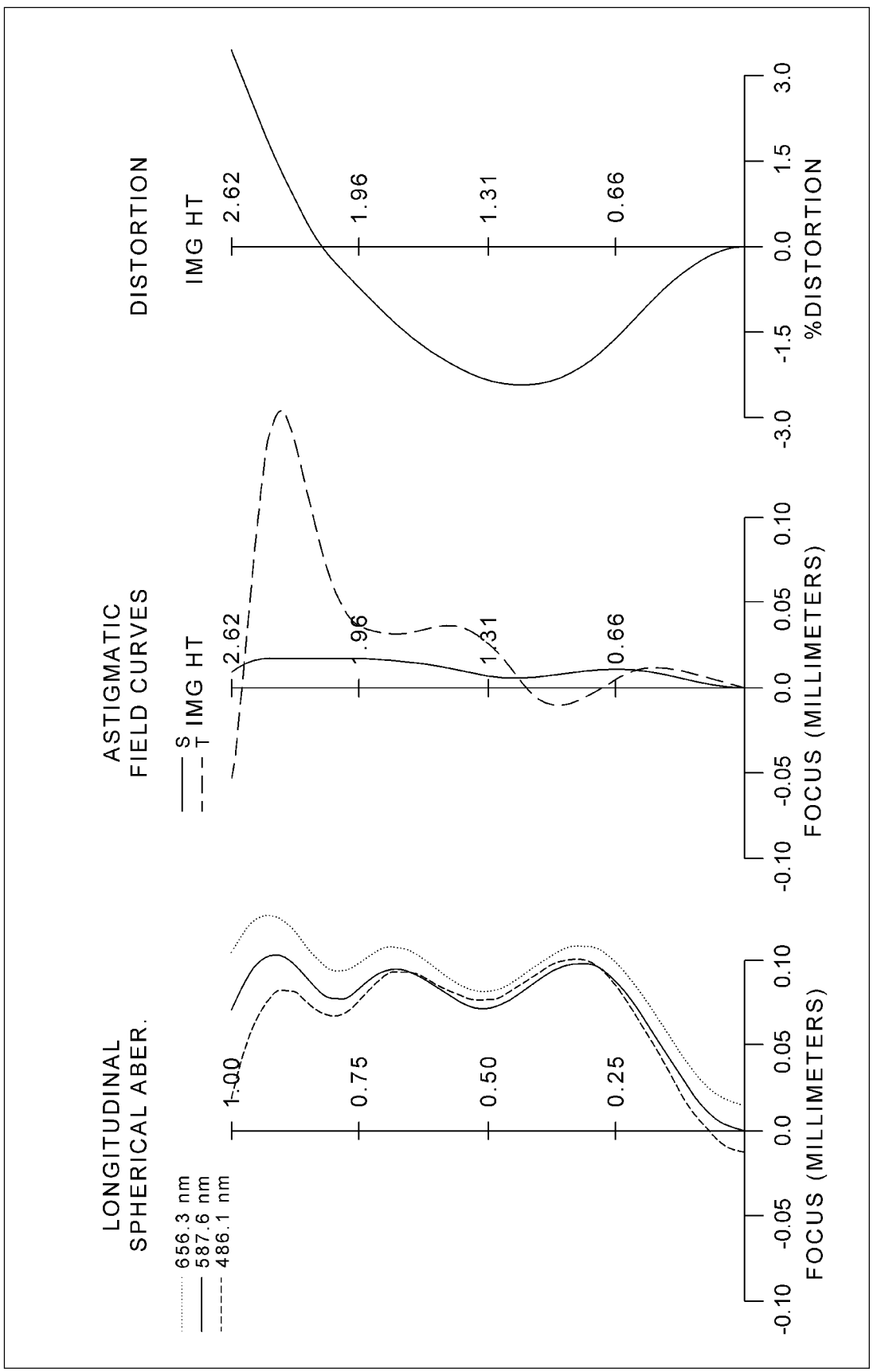
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an imaging optical lens assembly (not otherwise herein labeled) of the present disclosure and an image sensor 175. The imaging optical lens assembly includes, in order from an object side to an image side along an optical path, an aperture stop 100, a first lens element 110, a second lens element 120, a third lens element 130, a stop 101, a fourth lens element 140, a fifth lens element 150, a filter 160, and an image surface 170. The image sensor 175 is disposed on or near the image surface 170. There is an air gap between each of adjacent lens elements of the first lens element 110, the second lens element 120, the third lens element 130, the fourth lens element 140, and the fifth lens element 150, and there is no additional lens element inserted between the five lens elements.

The first lens element 110 has positive refractive power and is made of plastic material. The first lens element 110 has an object-side surface 111 being convex in a paraxial region thereof, and an image-side surface 112 being convex in a paraxial region thereof. Both the object-side surface 111 and the image-side surface 112 are aspheric, and there is one inflection point on the object-side surface 111.

The second lens element 120 has negative refractive power and is made of plastic material. The second lens element 120 has an object-side surface 121 being convex in a paraxial region thereof, and an image-side surface 122 being concave in a paraxial region thereof. Both the object-side surface 121 and the image-side surface 122 are aspheric, and there are two inflection points on the object-side surface 121.

The third lens element 130 has negative refractive power and is made of plastic material. The third lens element 130 has an object-side surface 131 being concave in a paraxial region thereof, and an image-side surface 132 being concave in a paraxial region thereof. Both the object-side surface 131 and the image-side surface 132 are aspheric, and there are two inflection points and one critical point on the image-side surface 132.

The fourth lens element 140 has positive refractive power and is made of plastic material. The fourth lens element 140 has an object-side surface 141 being concave in a paraxial region thereof, and an image-side surface 142 being convex in a paraxial region thereof. Both the object-side surface 141 and the image-side surface 142 are aspheric, and there are one inflection point on the object-side surface 141 and two inflection points on the image-side surface 142.

The fifth lens element 150 has negative refractive power and is made of plastic material. The fifth lens element 150 has an object-side surface 151 being concave in a paraxial region thereof, and an image-side surface 152 being convex in a paraxial region thereof. Both the object-side surface 151 and the image-side surface 152 are aspheric, and there are two inflection points on the object-side surface 151.

The filter 160 is disposed between the fifth lens element 150 and the image surface 170. The filter 160 is made of glass material and does not affect the focal length of the imaging optical lens assembly.

The detailed optical data of the 1st embodiment are shown in TABLE 1, wherein the units of the curvature radius, the thickness and the focal length are expressed in mm, f is a focal length of the imaging optical lens assembly, Fno is an f-number of the imaging optical lens assembly, HFOV is half of the maximal field of view, and surfaces #0 to #15 refer to the surfaces in order from the object side to the image side. The aspheric surface data are shown in TABLE 2, wherein k is the conic coefficient in the equation of the aspheric surface profiles, and A4-A20 refer to the 4th to 20th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 10.64 mm, Fno = 2.05, HFOV = 13.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.256 | | | | |
| 2 | Lens 1 | 2.938 | ASP | 2.090 | Plastic | 1.545 | 56.1 | 4.61 |
| 3 | | −12.898 | ASP | 0.087 | | | | |
| 4 | Lens 2 | 8.970 | ASP | 0.334 | Plastic | 1.686 | 18.4 | −9.35 |
| 5 | | 3.684 | ASP | 2.768 | | | | |
| 6 | Lens 3 | −8.694 | ASP | 0.280 | Plastic | 1.544 | 56.0 | −5.97 |
| 7 | | 5.242 | ASP | 0.051 | | | | |
| 8 | Stop | Plano | | 0.579 | | | | |
| 9 | Lens 4 | −16.102 | ASP | 0.358 | Plastic | 1.686 | 18.4 | 358.12 |
| 10 | | −15.248 | ASP | 0.600 | | | | |
| 11 | Lens 5 | −4.027 | ASP | 0.935 | Plastic | 1.705 | 17.0 | −39.84 |
| 12 | | −5.152 | ASP | 0.331 | | | | |
| 13 | Filter | Plano | | 0.210 | Glass | 1.517 | 64.2 | — |
| 14 | | Plano | | 0.134 | | | | |
| 15 | Image Surface | Plano | | — | | | | |

Remark: Reference wavelength is d-line 587.6 nm.
* The effective radius of Surface 8 (Stop) is 1.440 mm.

TABLE 2

Aspheric Coefficient

| Surface # | 2 | 3 | 4 | 5 | 6 |
|---|---|---|---|---|---|
| k = | −4.2839E−01 | 2.3682E+01 | −5.3976E+01 | −1.9569E+01 | 2.7782E+01 |
| A4 = | −5.4892E−04 | −8.0833E−03 | −2.2873E−02 | 2.3809E−02 | −3.2273E−03 |
| A6 = | 9.5740E−04 | 8.9242E−03 | 1.0490E−02 | −2.3403E−02 | −1.0498E−01 |
| A8 = | −4.1157E−04 | −3.1760E−03 | −1.3475E−03 | 1.7620E−02 | 1.3486E−01 |
| A10 = | 8.5576E−05 | 6.3057E−04 | −2.4192E−04 | −7.2074E−03 | −1.1627E−01 |
| A12 = | −8.0394E−06 | −6.8589E−05 | 8.9532E−05 | 1.6114E−03 | 6.6637E−02 |
| A14 = | 5.5999E−08 | 3.2666E−06 | −6.9512E−06 | −1.7676E−04 | −2.2785E−02 |
| A16 = | 1.5148E−08 | | | 6.8738E−06 | 3.4278E−03 |

| Surface # | 7 | 9 | 10 | 11 | 12 |
|---|---|---|---|---|---|
| k = | −1.7596E+01 | 4.7662E+01 | 4.8552E+01 | −1.6220E+01 | −3.1122E+00 |
| A4 = | 7.8118E−03 | −1.9944E−01 | −1.7884E−01 | −1.0008E−01 | −1.3364E−01 |
| A6 = | −2.1292E−02 | 5.2137E−01 | 4.2954E−01 | 1.2025E−01 | 1.0467E−01 |
| A8 = | −3.6901E−02 | −8.5163E−01 | −6.0271E−01 | −7.8992E−02 | −5.6273E−02 |
| A10 = | 5.6641E−02 | 7.0334E−01 | 4.6265E−01 | 2.4231E−02 | 2.0665E−02 |
| A12 = | −3.0065E−02 | −3.1599E−01 | −2.1118E−01 | 2.6471E−04 | −5.4504E−03 |
| A14 = | 5.5488E−03 | 6.9241E−02 | 5.7774E−02 | −2.5868E−03 | 1.0747E−03 |
| A16 = | | −3.8294E−03 | −8.7014E−03 | 8.0285E−04 | −1.5802E−04 |
| A18 = | | −5.4761E−04 | 5.5027E−04 | −1.0595E−04 | 1.5228E−05 |
| A20 = | | | | 5.3479E−06 | −6.7986E−07 |

The equation of the aspheric surface profiles is expressed as follows:

$$X(Y) = (Y^2/R) \bigg/ \left(1 + sqrt(1-(1+k)*(Y/R)^2)\right) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, the focal length of the imaging optical lens assembly is f, the f-number of the imaging optical lens assembly is Fno, and half of the maximal field of view of the imaging optical lens assembly is HFOV. These parameters have the following values: f=10.64 mm; Fno=2.05; and HFOV=13.2 degrees.

In the 1st embodiment, the maximum among refractive indices of the five lens elements of the imaging optical lens assembly is Nmax, and the following condition is satisfied: Nmax=1.705.

In the 1st embodiment, a minimum among Abbe numbers of the lens elements of the imaging optical lens assembly is Vdmin, and the following condition is satisfied: Vdmin=17.0.

In the 1st embodiment, the Abbe number of the i-th lens element is Vi, the refractive index of the i-th lens element is Ni, and the following condition is satisfied: (Vi/Ni)min=10.0.

In the 1st embodiment, the Abbe number of the fourth lens element 140 is V4, the Abbe number of the fourth lens element 150 is V5, and the following condition is satisfied: V4+V5=35.4.

In the 1st embodiment, the central thickness of the first lens element 110 is CT1, the central thickness of the fourth lens element 140 is CT4, and the following condition is satisfied: CT4/CT1=0.17

In the 1st embodiment, the central thickness of the fifth lens element 150 is CT5, a distance in parallel with the optical axis from an effective radius position on the object-side surface of the fifth lens element to an effective radius position on the image-side surface of the fifth lens element is ET5, and the following condition is satisfied: CT5/ET5=3.33.

In the 1st embodiment, the central thickness of the fourth lens element 140 is CT4, the central thickness of the fifth lens element 150 is CT5, the axial distance between the fourth lens element 140 and the fifth lens element 150 is T45, and the following condition is satisfied: (CT4+T45)/CT5=1.02.

In the 1st embodiment, the central thickness of the second lens element 120 is CT2, the central thickness of the third lens element 130 is CT3, the central thickness of the fourth lens element 140 is CT4, the axial distance between the second lens element 120 and the third lens element 130 is T23, and the following condition is satisfied: (CT2+CT3+CT4)/T23=0.35.

In the 1st embodiment, the axial distance between the first lens element 110 and the second lens element 120 is T12, the axial distance between the second lens element 120 and the third lens element 130 is T23, the axial distance between the third lens element 130 and the fourth lens element 140 is T34, the axial distance between the fourth lens element 140 and the fifth lens element 150 is T45, and the following condition is satisfied: T23/(T12+T34+T45)=2.10.

In the 1st embodiment, the central thickness of the first lens element 110 is CT1, the axial distance between the second lens element 120 and the third lens element 130 is T23, the axial distance between the image-side surface of the fifth lens element 150 and the image surface is BL, and the following condition is satisfied: (CT1+T23)/BL=7.19.

In the 1st embodiment, the curvature radius of the image-side surface 112 of the first lens element 110 is R2, the curvature radius of the object-side surface 121 of the second lens element 120 is R3, and the following condition is satisfied: (R2+R3)/(R2−R3)=0.18.

In the 1st embodiment, the curvature radius of the object-side surface 131 of the third lens element 130 is R5, the curvature radius of the image-side surface 132 of the third lens element 130 is R6, and the following condition is satisfied: (R5+R6)/(R5−R6)=0.25.

In the 1st embodiment, the focal length of the imaging optical lens assembly is f, the focal length of the third lens element 130 is f3, and the following condition is satisfied: f/f3=−1.78.

In the 1st embodiment, the focal length of the imaging optical lens assembly is f, the focal length of the fourth lens element 140 is f4, and the following condition is satisfied: f/f4=0.03.

In the 1st embodiment, the focal length of the imaging optical lens assembly is f, the focal length of the fifth lens element 150 is f5, and the following condition is satisfied: f/f5=−0.27.

In the 1st embodiment, the focal length of the imaging optical lens assembly is f, the focal length of the third lens element 130 is f3, the focal length of the fourth lens element 140 is f4, the focal length of the fifth lens element 150 is f5, and the following condition is satisfied: (|f/f4|+|f/f5|)/|f/f3|=0.17.

In the 1st embodiment, the maximal image height of the imaging optical lens assembly is ImgH, the focal length of the imaging optical lens assembly is f, and the following condition is satisfied: ImgH/f=0.25.

In the 1st embodiment, the entrance pupil diameter of the imaging optical lens assembly is EPD, the maximal image height of the imaging optical lens assembly is ImgH, and the following condition is satisfied: EPD/ImgH=1.98.

In the 1st embodiment, the field of view of the imaging optical lens assembly is FOV, and the following condition is satisfied: tan(FOV)=0.50.

In the 1st embodiment, the focal length of the imaging optical lens assembly is f, the entrance pupil diameter of the imaging optical lens assembly is EPD, and the following condition is satisfied: f/EPD=2.05.

In the 1st embodiment, the axial distance between the object-side surface 111 of the first lens element 110 and the image surface 170 is TL, the focal length of the imaging optical lens assembly is f, and the following condition is satisfied: TL/f=0.82.

In the 1st embodiment, the axial distance between the aperture stop 100 and the image surface 170 is SL, the axial distance between the object-side surface 111 of the first lens element 110 and the image surface 170 is TL, and the following condition is satisfied: SL/TL=0.86.

In the 1st embodiment, the axial distance between the image-side surface 151 of the fifth lens element 150 and the image surface 170 is BL, the axial distance between the object-side surface 111 of the first lens element 110 and the image-side surface 152 of the fifth lens element 150 is TD, and the following condition is satisfied: BL/TD=0.08.

In the 1st embodiment, the maximum effective radius on the object-side surface 111 of the first lens element 110 is Y11, the maximum effective radius on the object-side surface 131 of the third lens element 130 is Y31, and the following condition is satisfied: Y11/Y31=2.03.

In the 1st embodiment, the maximum effective radius on the object-side surface 111 of the first lens element 110 is Y11, the maximum effective radius on the image-side surface 152 of the fifth lens element 150 is Y52, and the following condition is satisfied: Y11/Y52=1.14.

2nd Embodiment

Figure 2A:
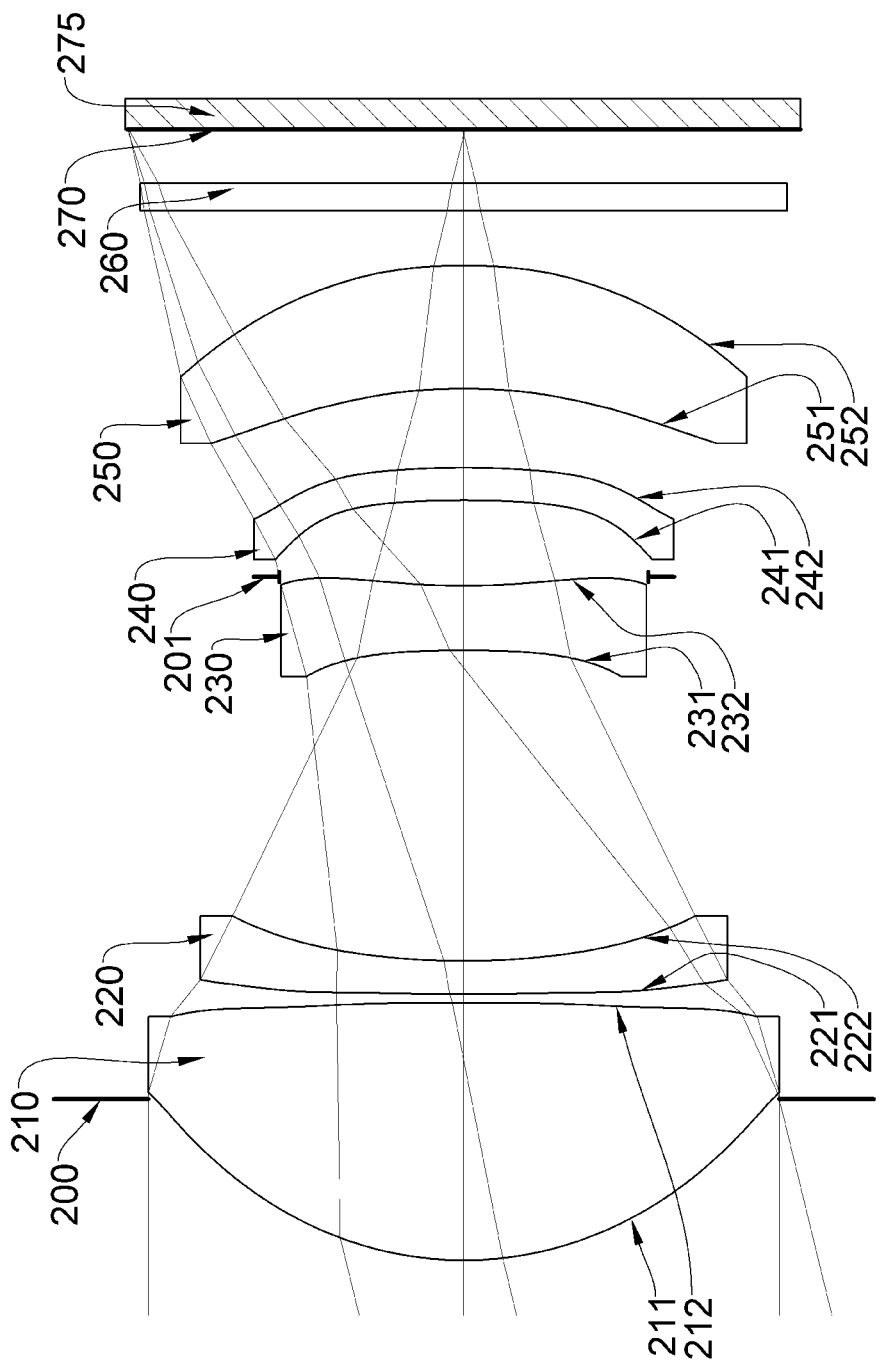
FIG. 2A is a schematic view of an imaging apparatus according to the 2nd embodiment of the present disclosure.
Figure 2B:
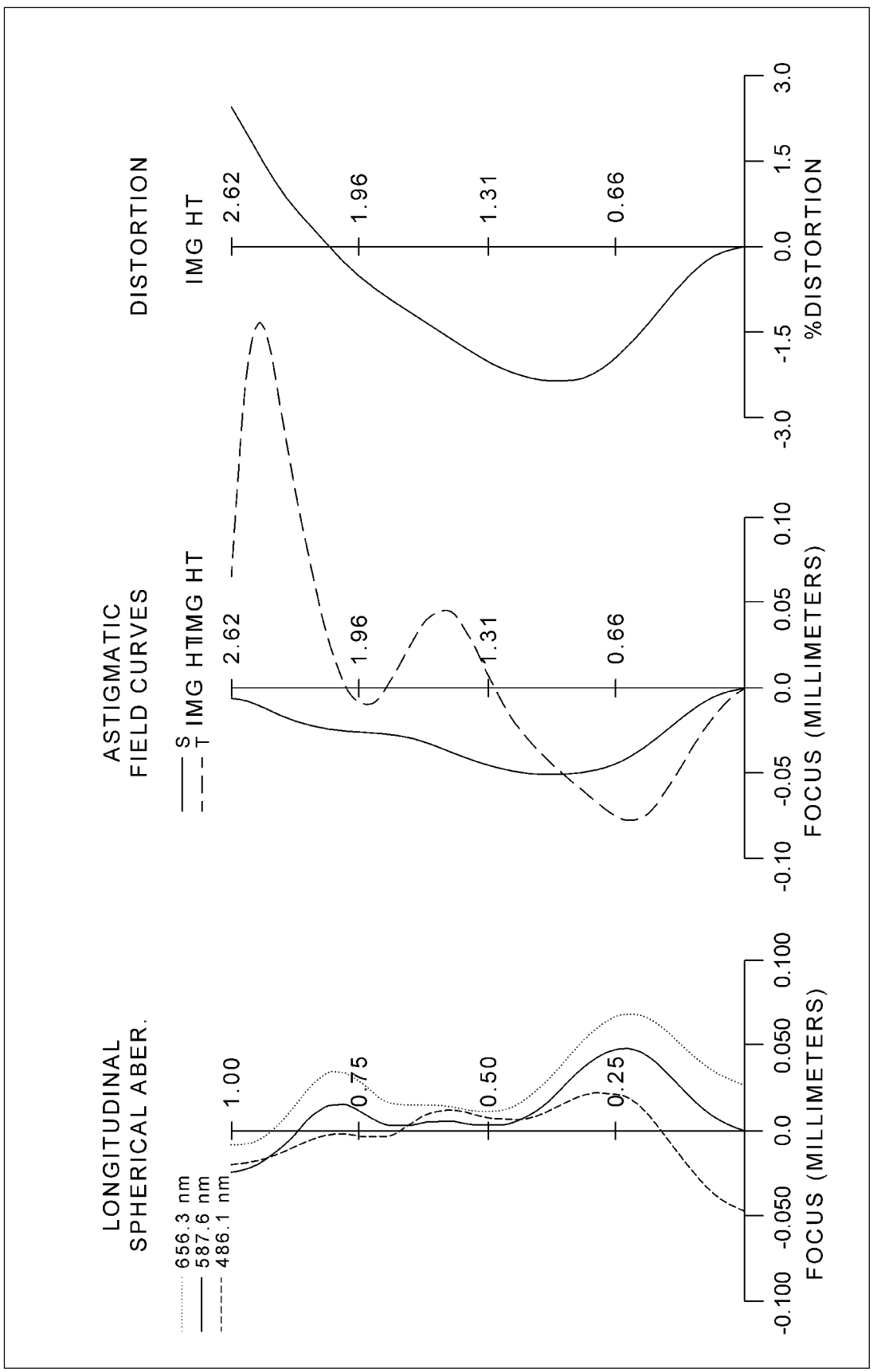
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an imaging optical lens assembly (not otherwise herein labeled) of the present disclosure and an image sensor 275. The imaging optical lens assembly includes, in order from an object side to an image side along an optical path, an aperture stop 200, a first lens element 210, a second lens element 220, a third lens element 230, a stop 201, a fourth lens element 240, a fifth lens element 250, a filter 260, and an image surface 270. The image sensor 275 is disposed on or near the image surface 270. There is an air gap between each of adjacent lens elements of the first lens element 210, the second lens element 220, the third lens element 230, the fourth lens element 240, and the fifth lens element 250, and there is no additional lens element inserted between the five lens elements.

The first lens element 210 has positive refractive power and is made of plastic material. The first lens element 210 has an object-side surface 211 being convex in a paraxial region thereof, and an image-side surface 212 being concave in a paraxial region thereof. Both the object-side surface 211 and the image-side surface 212 are aspheric, and there are one inflection point on the object-side surface 211 and three inflection points on the image-side surface 212.

The second lens element 220 has negative refractive power and is made of plastic material. The second lens element 220 has an object-side surface 221 being convex in a paraxial region thereof, and an image-side surface 222 being concave in a paraxial region thereof. Both the object-side surface 221 and the image-side surface 222 are aspheric. There are four inflection points on the object-side surface 221.

The third lens element 230 has negative refractive power and is made of plastic material. The third lens element 230 has an object-side surface 231 being concave in a paraxial region thereof, and an image-side surface 232 being concave in a paraxial region thereof. Both the object-side surface 231 and the image-side surface 232 are aspheric, and there are one inflection point and one critical point on the image-side surface 232.

The fourth lens element 240 has negative refractive power and is made of plastic material. The fourth lens element 240 has an object-side surface 241 being concave in a paraxial region thereof, and an image-side surface 242 being convex in a paraxial region thereof. Both the object-side surface 241 and the image-side surface 242 are aspheric, and there are one inflection point on the object-side surface 241 and one inflection point on the image-side surface 242.

The fifth lens element 250 has positive refractive power and is made of plastic material. The fifth lens element 250 has an object-side surface 251 being concave in a paraxial region thereof, and an image-side surface 252 being convex in a paraxial region thereof. Both the object-side surface 251 and the image-side surface 252 are aspheric, and there are one inflection point on the object-side surface 251 and one inflection point on the image-side surface 252.

The filter 260 is disposed between the fifth lens element 250 and the image surface 270. The filter 260 is made of glass material and does not affect the focal length of the imaging optical lens assembly.

The detailed optical data of the 2nd embodiment are shown in TABLE 3, and the aspheric surface data are shown in TABLE 4.

TABLE 3

(2nd Embodiment)
f= 10.47 mm, Fno = 2.13, HFOV = 13.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.256 | | | | |
| 2 | Lens 1 | 2.703 | ASP | 2.006 | Plastic | 1.545 | 56.1 | 4.98 |
| 3 | | 468.362 | ASP | 0.067 | | | | |
| 4 | Lens 2 | 15.061 | ASP | 0.259 | Plastic | 1.686 | 18.4 | −13.27 |
| 5 | | 5.635 | ASP | 2.423 | | | | |
| 6 | Lens 3 | −9.506 | ASP | 0.503 | Plastic | 1.544 | 56.0 | −6.23 |
| 7 | | 5.366 | ASP | 0.071 | | | | |
| 8 | Stop | Plano | | 0.595 | | | | |
| 9 | Lens 4 | −13.181 | ASP | 0.254 | Plastic | 1.686 | 18.4 | −126.41 |
| 10 | | −15.664 | ASP | 0.617 | | | | |
| 11 | Lens 5 | −5.282 | ASP | 0.960 | Plastic | 1.705 | 17.0 | 35.39 |
| 12 | | −4.687 | ASP | 0.430 | | | | |
| 13 | Filter | Plano | | 0.210 | Glass | 1.517 | 64.2 | — |
| 14 | | Plano | | 0.422 | | | | |
| 15 | Image Surface | Plano | | — | | | | |

Remark: Reference wavelength is d-line 587.6 nm.
* The effective radius of Surface 8 (Stop) is 1.438 mm.

TABLE 4

Aspheric Coefficient

| Surface # | 2 | 3 | 4 | 5 | 6 |
|---|---|---|---|---|---|
| k = | −3.7587E−01 | 3.0858E+01 | −5.5490E+01 | −1.7191E+01 | 2.8823E+01 |
| A4 = | −1.1139E−03 | −3.0904E−02 | −2.7508E−02 | 1.1158E−02 | 2.0440E−03 |
| A6 = | 2.6434E−03 | 1.2023E−02 | 2.0250E−03 | −1.2926E−02 | −1.9511E−01 |
| A8 = | −1.9070E−03 | 2.4167E−03 | 1.3795E−02 | 1.5040E−02 | 4.1113E−01 |
| A10 = | 7.9238E−04 | −2.5192E−03 | −7.5026E−03 | −5.6817E−03 | −5.0500E−01 |
| A12 = | −1.8791E−04 | 6.2408E−04 | 1.6422E−03 | 5.7041E−04 | 3.5421E−01 |
| A14 = | 2.4060E−05 | −6.8323E−05 | −1.6186E−04 | 1.0213E−04 | −1.3182E−01 |
| A16 = | −1.3079E−06 | 2.8609E−06 | 5.8023E−06 | −1.7816E−05 | 2.0074E−02 |

| Surface # | 7 | 9 | 10 | 11 | 12 |
|---|---|---|---|---|---|
| k = | −2.7861E+01 | 4.1257E+01 | 4.9928E+01 | −1.8179E+01 | −1.1628E+01 |
| A4 = | −9.0472E−06 | −1.7666E−01 | −2.1321E−01 | −7.7482E−02 | −7.0615E−02 |
| A6 = | −2.2600E−02 | 5.1246E−01 | 5.6913E−01 | −4.3847E−02 | −3.1582E−02 |
| A8 = | −6.1582E−03 | −9.1020E−01 | −8.6416E−01 | 3.1348E−01 | 1.3224E−01 |
| A10 = | 1.9912E−02 | 8.3885E−01 | 7.1744E−01 | −4.4900E−01 | −1.4829E−01 |
| A12 = | −1.2219E−02 | −4.4367E−01 | −3.5085E−01 | 3.3281E−01 | 1.0012E−01 |
| A14 = | 2.3227E−03 | 1.3297E−01 | 1.0087E−01 | −1.4732E−01 | −4.6873E−02 |
| A16 = | | −2.0449E−02 | −1.5641E−02 | 4.0373E−02 | 1.5570E−02 |
| A18 = | | 1.2160E−03 | 9.9996E−04 | −6.7182E−03 | −3.5626E−03 |
| A20 = | | | | 6.2144E−04 | 5.2759E−04 |
| A22 = | | | | −2.4464E−05 | −4.5136E−05 |
| A24 = | | | | | 1.6855E−06 |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in the table below.

| 2nd Embodiment | | | |
|---|---|---|---|
| f [mm] | 10.47 | (R5 + R6)/(R5 − R6) | 0.28 |
| Fno. | 2.13 | f/f3 | −1.68 |
| HFOV [deg.] | 13.7 | f/f4 | −0.08 |
| Nmax | 1.705 | f/f5 | 0.30 |
| Vdmin | 17.0 | (|f/f4| + |f/f5|)/|f/f3| | 0.23 |
| (Vi/Ni)min | 10.0 | ImgH/f | 0.25 |
| V4 + V5 | 35.4 | EPD/ImgH | 1.88 |
| CT4/CT1 | 0.13 | tan(FOV) | 0.52 |
| CT5/ET5 | 1.85 | f/EPD | 2.13 |
| (CT4 + T45)/CT5 | 0.91 | TL/f | 0.84 |
| (CT2 + CT3 + CT4)/T23 | 0.42 | SL/TL | 0.86 |
| T23/(T12 + T34 + T45) | 1.80 | BL/TD | 0.14 |
| (CT1 + T23)/BL | 4.17 | Y11/Y31 | 2.00 |
| (R2 + R3)/(R2 − R3) | 1.07 | Y11/Y52 | 1.11 |

3rd Embodiment

Figure 3A:
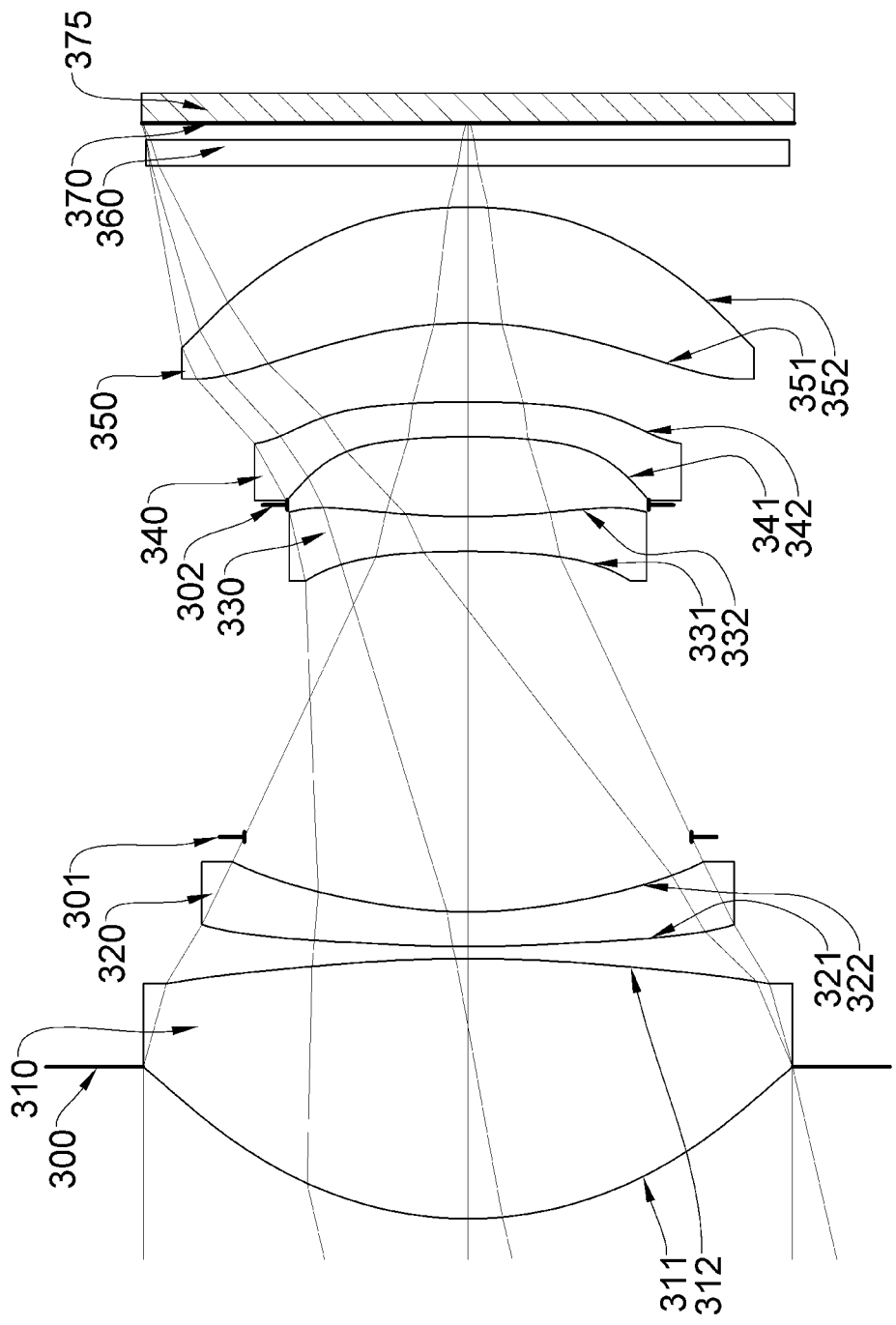
FIG. 3A is a schematic view of an imaging apparatus according to the 3rd embodiment of the present disclosure.
Figure 3B:
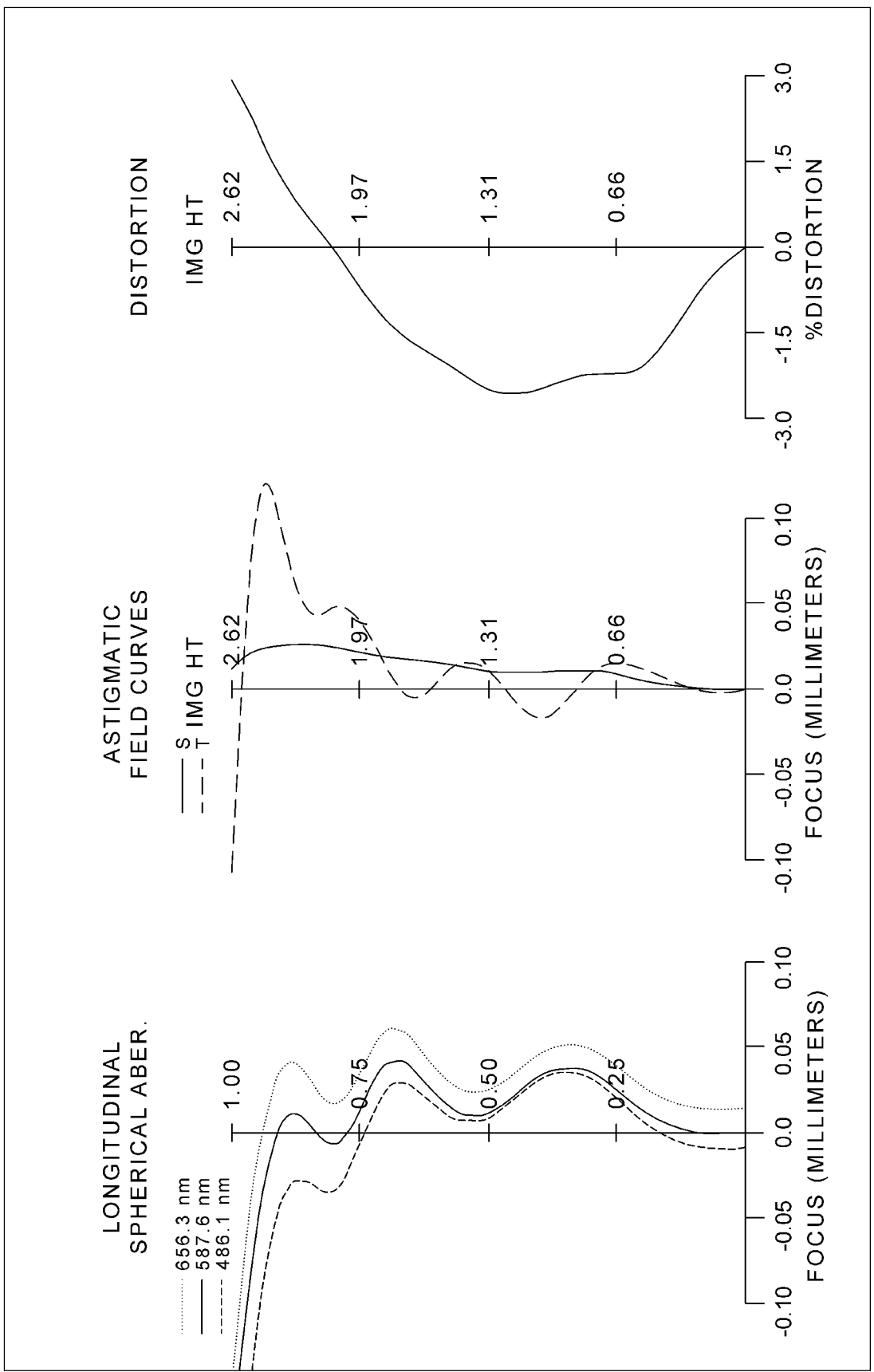
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an imaging optical lens assembly (not otherwise herein labeled) of the present disclosure and an image sensor 375. The imaging optical lens assembly includes, in order from an object side to an image side along an optical path, an aperture stop 300, a first lens element 310, a second lens element 320, a first stop 301, a third lens element 330, a second stop 302, a fourth lens element 340, a fifth lens element 350, a filter 360, and an image surface 370. The image sensor 375 is disposed on or near the image surface 370. There is an air gap between each of adjacent lens elements of the first lens element 310, the second lens element 320, the third lens element 330, the fourth lens element 340, and the fifth lens element 350, and there is no additional lens element inserted between the five lens elements.

The first lens element 310 has positive refractive power and is made of plastic material. The first lens element 310 has an object-side surface 311 being convex in a paraxial region thereof, and an image-side surface 312 being convex in a paraxial region thereof. Both the object-side surface 311 and the image-side surface 312 are aspheric, and there are one inflection point on the object-side surface 311 and one inflection point on the image-side surface 312.

The second lens element 320 has negative refractive power and is made of plastic material. The second lens element 320 has an object-side surface 321 being convex in a paraxial region thereof, and an image-side surface 322 being concave in a paraxial region thereof. Both the object-side surface 321 and the image-side surface 322 are aspheric.

The third lens element 330 has negative refractive power and is made of plastic material. The third lens element 330 has an object-side surface 331 being concave in a paraxial region thereof, and an image-side surface 332 being concave in a paraxial region thereof. Both the object-side surface 331 and the image-side surface 332 are aspheric, and there are two inflection points and one critical point on the image-side surface 332.

The fourth lens element 340 has negative refractive power and is made of plastic material. The fourth lens element 340 has an object-side surface 341 being concave in a paraxial region thereof, and an image-side surface 342 being convex in a paraxial region thereof. Both the object-side surface 341 and the image-side surface 342 are aspheric, and there are one inflection point on the object-side surface 341 and two inflection points on the image-side surface 342.

The fifth lens element 350 has negative refractive power and is made of plastic material. The fifth lens element 350 has an object-side surface 351 being concave in a paraxial region thereof, and an image-side surface 352 being convex in a paraxial region thereof. Both the object-side surface 351 and the image-side surface 352 are aspheric, and there are one inflection point on the object-side surface 351 and one inflection point on the image-side surface 352.

The filter 360 is disposed between the fifth lens element 350 and the image surface 370. The filter 360 is made of glass material and does not affect the focal length of the imaging optical lens assembly.

The detailed optical data of the 3rd embodiment are shown in TABLE 5, and the aspheric surface data are shown in TABLE 6.

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in the table below.

| 3rd Embodiment | | | |
|---|---|---|---|
| f [mm] | 11.07 | (R5 + R6)/(R5 − R6) | 0.17 |
| Fno. | 2.08 | f/f3 | −1.66 |

TABLE 5

(3rd Embodiment)
f = 11.07 mm, Fno = 2.08, HFOV = 12.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.220 | | | | |
| 2 | Lens 1 | 3.004 | ASP | 2.090 | Plastic | 1.545 | 56.1 | 4.66 |
| 3 | | −12.361 | ASP | 0.096 | | | | |
| 4 | Lens 2 | 8.823 | ASP | 0.280 | Plastic | 1.686 | 18.4 | −9.65 |
| 5 | | 3.733 | ASP | 0.604 | | | | |
| 6 | Stop 1 | Plano | | 2.294 | | | | |
| 7 | Lens 3 | −8.614 | ASP | 0.280 | Plastic | 1.530 | 55.8 | −6.68 |
| 8 | | 6.078 | ASP | 0.096 | | | | |
| 9 | Stop 2 | Plano | | 0.545 | | | | |
| 10 | Lens 4 | −9.478 | ASP | 0.280 | Plastic | 1.705 | 17.0 | −25.18 |
| 11 | | −20.587 | ASP | 0.634 | | | | |
| 12 | Lens 5 | −3.809 | ASP | 0.931 | Plastic | 1.715 | 16.5 | −310.71 |
| 13 | | −4.270 | ASP | 0.331 | | | | |
| 14 | Filter | Plano | | 0.210 | Glass | 1.517 | 64.2 | — |
| 15 | | Plano | | 0.135 | | | | |
| 16 | Image Surface | Plano | | — | | | | |

Remark: Reference wavelength is d-line 587.6 nm.
* The effective radius of Surface 6 (Stop 1) is 1.795 mm
* The effective radius of Surface 9 (Stop 2) is 1.450 mm

TABLE 6

Aspheric Coefficient

| Surface # | 2 | 3 | 4 | 5 | 7 |
|---|---|---|---|---|---|
| k = | −4.5095E−01 | 1.9389E+01 | −4.5279E+01 | −2.0482E+01 | 2.6929E+01 |
| A4 = | −4.8008E−04 | −8.0748E−04 | −1.6961E−02 | 2.0390E−02 | −3.5877E−02 |
| A6 = | 7.5827E−04 | 2.2591E−03 | 2.1587E−03 | −1.7673E−02 | 3.5252E−02 |
| A8 = | −2.1606E−04 | −2.4477E−04 | 4.1790E−03 | 9.7514E−03 | −7.4548E−02 |
| A10 = | −2.8556E−05 | −4.7602E−05 | −1.9987E−03 | −9.8573E−04 | 5.4104E−02 |
| A12 = | 2.2927E−05 | 9.7320E−06 | 3.5360E−04 | −9.5073E−04 | −1.0868E−02 |
| A14 = | −3.8625E−06 | −3.4048E−07 | −2.1867E−05 | 3.3662E−04 | −4.8448E−03 |
| A16 = | 2.0360E−07 | | | −3.2663E−05 | 1.9022E−03 |

| Surface # | 8 | 10 | 11 | 12 | 13 |
|---|---|---|---|---|---|
| k = | −5.9571E+00 | −3.6099E+01 | 2.6407E+01 | −1.4659E+01 | −3.3934E+00 |
| A4 = | −1.7292E−02 | −2.1360E−01 | −1.9174E−01 | −8.2353E−02 | −1.9703E−01 |
| A6 = | 5.2059E−02 | 6.1700E−01 | 5.0192E−01 | 4.4283E−02 | 3.7203E−01 |
| A8 = | −1.1224E−01 | −1.1432E+00 | −7.5256E−01 | 7.0513E−02 | −5.0592E−01 |
| A10 = | 9.7469E−02 | 1.1372E+00 | 6.2260E−01 | −1.2869E−01 | 4.4818E−01 |
| A12 = | −4.1773E−02 | −6.6973E−01 | −3.0775E−01 | 9.2929E−02 | −2.5985E−01 |
| A14 = | 6.9513E−03 | 2.3066E−01 | 9.1040E−02 | −3.7808E−02 | 1.0005E−01 |
| A16 = | | −4.2378E−02 | −1.4787E−02 | 9.3234E−03 | −2.5705E−02 |
| A18 = | | 3.1887E−03 | 1.0079E−03 | −1.3843E−03 | 4.3491E−03 |
| A20 = | | | | 1.1408E−04 | −4.6471E−04 |
| A22 = | | | | −4.0166E−06 | 2.8404E−05 |
| A24 = | | | | | −7.5671E−07 |

-continued

| 3rd Embodiment | | | |
|---|---|---|---|
| HFOV [deg.] | 12.9 | f/f4 | −0.44 |
| Nmax | 1.715 | f/f5 | −0.04 |
| Vdmin | 16.5 | (|f/f4| + |f/f5|)/|f/f3| | 0.29 |
| (Vi/Ni)min | 9.6 | ImgH/f | 0.24 |
| V4 + V5 | 33.5 | EPD/ImgH | 2.03 |
| CT4/CT1 | 0.13 | tan(FOV) | 0.48 |
| CT5/ET5 | 3.66 | f/EPD | 2.08 |
| (CT4 + T45)/CT5 | 0.98 | TL/f | 0.80 |
| (CT2 + CT3 + CT4)/T23 | 0.29 | SL/TL | 0.86 |
| T23/(T12 + T34 + T45) | 2.11 | BL/TD | 0.08 |
| (CT1 + T23)/BL | 7.37 | Y11/Y31 | 2.03 |
| (R2 + R3)/(R2 − R3) | 0.17 | Y11/Y52 | 1.16 |

4th Embodiment

Figure 4A:
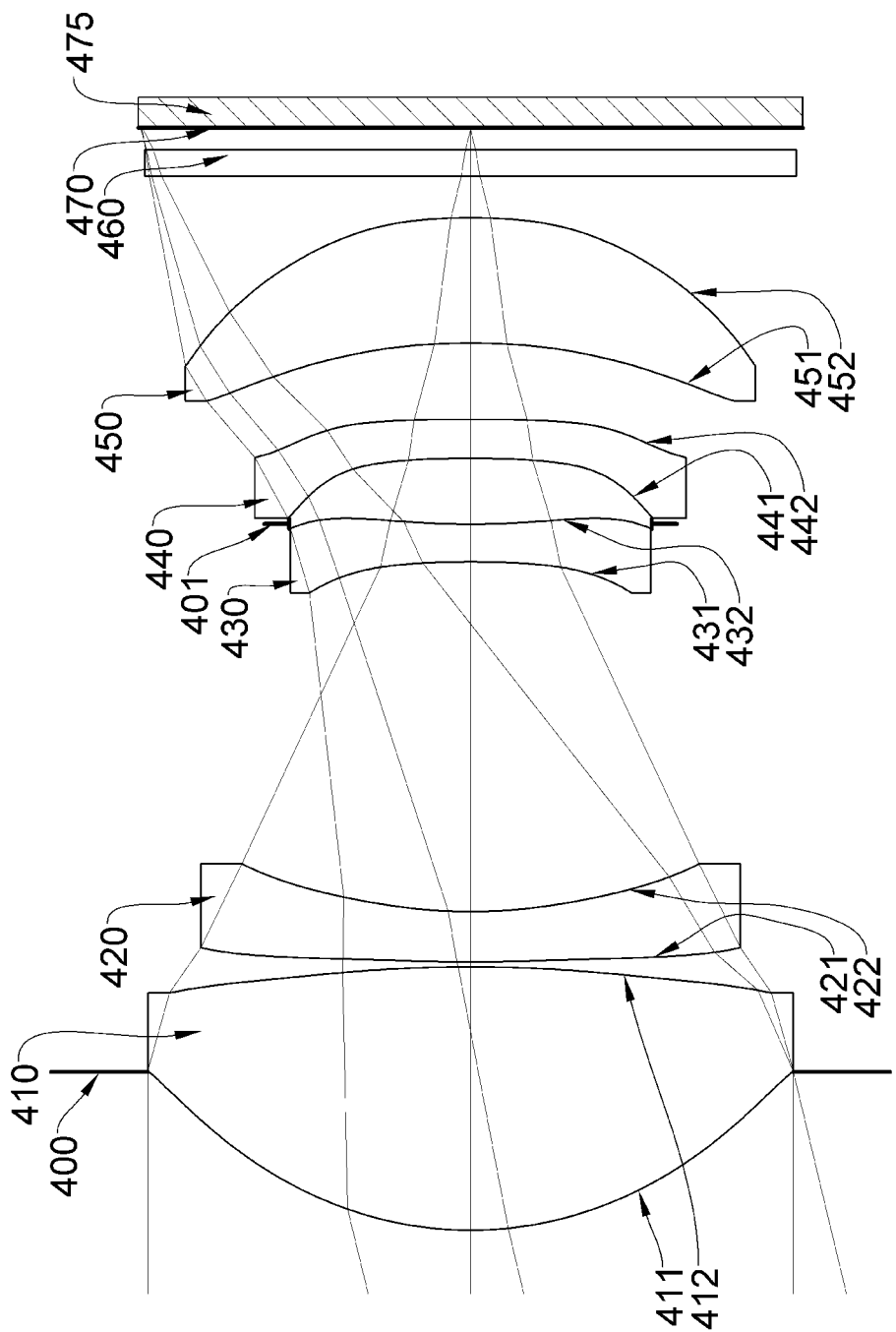
FIG. 4A is a schematic view of an imaging apparatus according to the 4th embodiment of the present disclosure.
Figure 4B:
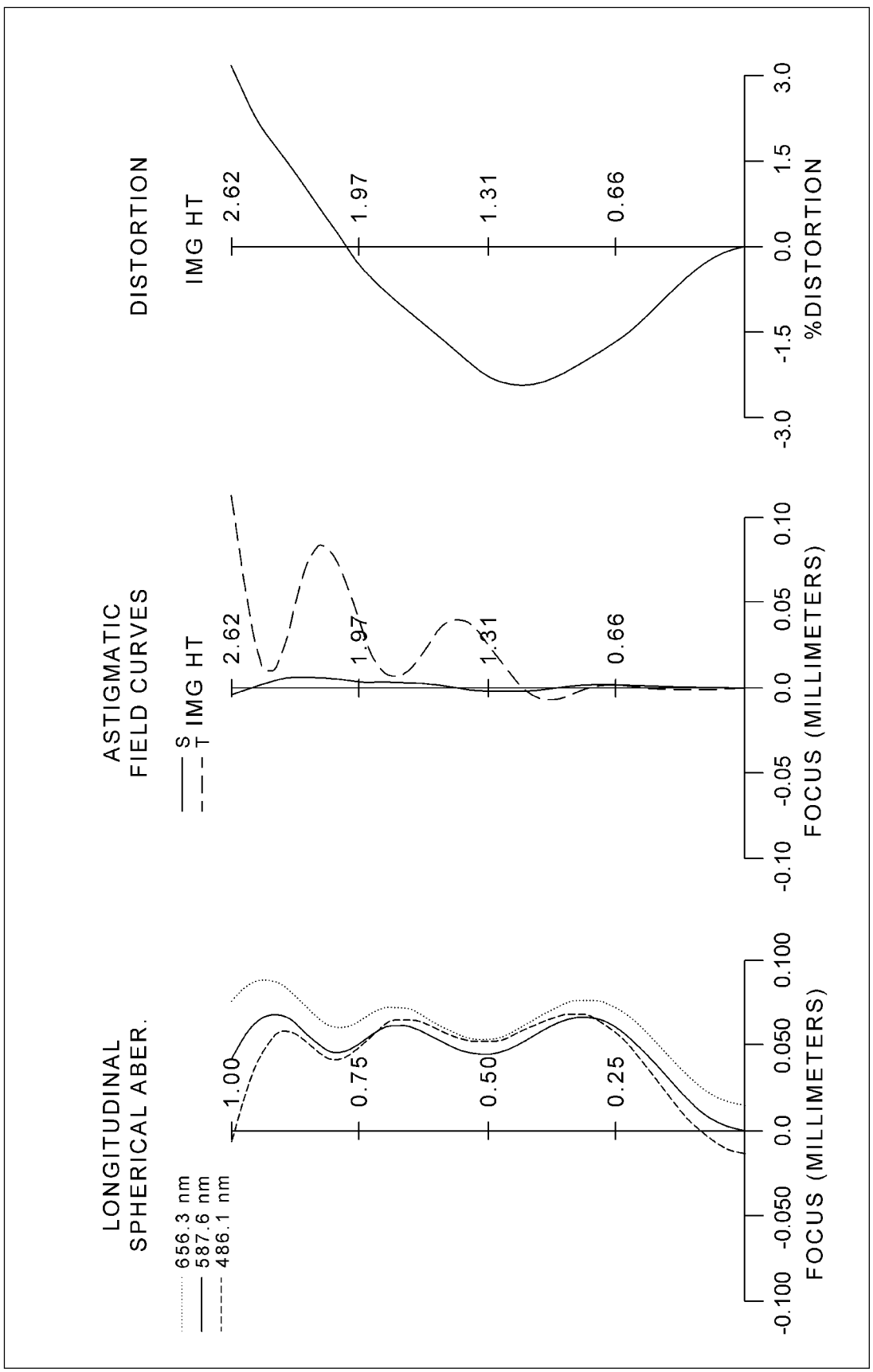
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an imaging optical lens assembly (not otherwise herein labeled) of the present disclosure and an image sensor 475. The imaging optical lens assembly includes, in order from an object side to an image side along an optical path, an aperture stop 400, a first lens element 410, a second lens element 420, a third lens element 430, a stop 401, a fourth lens element 440, a fifth lens element 450, a filter 460, and an image surface 470. The image sensor 475 is disposed on or near the image surface 470. There is an air gap between each of adjacent lens elements of the first lens element 410, the second lens element 420, the third lens element 430, the fourth lens element 440, and the fifth lens element 450, and there is no additional lens element inserted between the five lens elements.

The first lens element 410 has positive refractive power and is made of plastic material. The first lens element 410 has an object-side surface 411 being convex in a paraxial region thereof, and an image-side surface 412 being convex in a paraxial region thereof. Both the object-side surface 411 and the image-side surface 412 are aspheric, and there are one inflection point on the object-side surface 411 and one inflection point on the image-side surface 412.

The second lens element 420 has negative refractive power and is made of plastic material. The second lens element 420 has an object-side surface 421 being convex in a paraxial region thereof, and an image-side surface 422 being concave in a paraxial region thereof. Both the object-side surface 421 and the image-side surface 422 are aspheric.

The third lens element 430 has negative refractive power and is made of plastic material. The third lens element 430 has an object-side surface 431 being concave in a paraxial region thereof, and an image-side surface 432 being concave in a paraxial region thereof. Both the object-side surface 431 and the image-side surface 432 are aspheric, and there are two inflection points and one critical point on the image-side surface 432.

The fourth lens element 440 has negative refractive power and is made of plastic material. The fourth lens element 440 has an object-side surface 441 being concave in a paraxial region thereof, and an image-side surface 442 being concave in a paraxial region thereof. Both the object-side surface 441 and the image-side surface 442 are aspheric, and there are one inflection point on the object-side surface 441 and two inflection points on the image-side surface 442.

The fifth lens element 450 has positive refractive power and is made of plastic material. The fifth lens element 450 has an object-side surface 451 being concave in a paraxial region thereof, and an image-side surface 452 being convex in a paraxial region thereof. Both the object-side surface 451 and the image-side surface 452 are aspheric, and there are one inflection point on the object-side surface 451 and one inflection point on the image-side surface 452.

The filter 460 is disposed between the fifth lens element 450 and the image surface 470. The filter 460 is made of glass material and does not affect the focal length of the imaging optical lens assembly.

The detailed optical data of the 4th embodiment are shown in TABLE 7, and the aspheric surface data are shown in TABLE 8.

TABLE 7

(4th Embodiment)
f = 10.50 mm, Fno = 2.05, HFOV = 13.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.256 | | | | |
| 2 | Lens 1 | 2.903 | ASP | 2.090 | Plastic | 1.545 | 56.1 | 4.58 |
| 3 | | −13.220 | ASP | 0.040 | | | | |
| 4 | Lens 2 | 11.569 | ASP | 0.400 | Plastic | 1.669 | 19.5 | −9.10 |
| 5 | | 3.935 | ASP | 2.777 | | | | |
| 6 | Lens 3 | −9.162 | ASP | 0.300 | Plastic | 1.544 | 56.0 | −6.76 |
| 7 | | 6.219 | ASP | 0.002 | | | | |
| 8 | Stop | Plano | | 0.520 | | | | |
| 9 | Lens 4 | −14.286 | ASP | 0.309 | Plastic | 1.686 | 18.4 | −18.71 |
| 10 | | 127.861 | ASP | 0.606 | | | | |
| 11 | Lens 5 | −6.934 | ASP | 0.996 | Plastic | 1.705 | 17.0 | 35.35 |
| 12 | | −5.747 | ASP | 0.331 | | | | |
| 13 | Filter | Plano | | 0.210 | Glass | 1.517 | 64.2 | — |
| 14 | | Plano | | 0.174 | | | | |
| 15 | Image Surface | Plano | | — | | | | |

Remark: Reference wavelength is d-line 587.6 nm.
* The effective radius of Surface 8 (Stop) is 1.438 mm.

TABLE 8

Aspheric Coefficient

| Surface # | 2 | 3 | 4 | 5 | 6 |
|---|---|---|---|---|---|
| k = | −4.0186E−01 | 2.3791E+01 | −5.8306E+01 | −1.9517E+01 | 2.6866E+01 |
| A4 = | 1.3844E−04 | −9.8872E−03 | −2.3916E−02 | 2.1705E−02 | −2.1245E−02 |
| A6 = | 5.3994E−04 | 8.6828E−03 | 8.6894E−03 | −2.1483E−02 | −8.5721E−02 |
| A8 = | −2.2139E−04 | −2.4001E−03 | 3.1341E−02 | 1.7029E−02 | 1.2330E−01 |
| A10 = | 3.5761E−05 | 3.3590E−04 | −7.8355E−04 | −7.2813E−03 | −1.1412E−01 |
| A12 = | −5.4971E−07 | −2.4298E−05 | 1.6760E−04 | 1.7485E−03 | 6.6576E−02 |
| A14 = | −4.3147E−07 | 7.8204E−07 | −1.1107E−05 | −2.1644E−04 | −2.2109E−02 |
| A16 = | 1.4033E−08 | | | 1.0786E−05 | 3.1494E−03 |

| Surface # | 7 | 9 | 10 | 11 | 12 |
|---|---|---|---|---|---|
| k = | −4.2024E+01 | 3.8776E+01 | −5.9000E+01 | −1.1533E+01 | −8.3562E−02 |
| A4 = | 3.3502E−03 | −1.7283E−01 | −1.8102E−01 | −8.5203E−02 | −1.3648E−01 |
| A6 = | −1.0303E−02 | 4.3857E−01 | 4.1262E−01 | 7.3900E−02 | 1.3691E−01 |
| A8 = | −4.9246E−02 | −6.9245E−01 | −5.6637E−01 | −1.1976E−02 | −1.2778E−01 |
| A10 = | 6.1019E−02 | 5.2827E−01 | 4.2527E−01 | −2.8655E−02 | 8.9307E−02 |
| A12 = | −2.9983E−02 | −2.0607E−01 | −1.8978E−01 | 2.4575E−02 | −4.1219E−02 |
| A14 = | 5.3082E−03 | 3.0033E−02 | 5.0785E−02 | −9.2721E−03 | 1.1949E−02 |
| A16 = | | 3.5892E−03 | −7.4947E−03 | 1.8819E−03 | −2.0847E−03 |
| A18 = | | −1.1262E−03 | 4.6557E−04 | −1.9970E−04 | 1.9953E−04 |
| A20 = | | | | 8.7077E−06 | −8.0358E−06 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in the table below.

| 4th Embodiment | | | |
|---|---|---|---|
| f [mm] | 10.50 | (R5 + R6)/(R5 − R6) | 0.19 |
| Fno. | 2.05 | f/f3 | −1.55 |
| HFOV [deg.] | 13.5 | f/f4 | −0.56 |
| Nmax | 1.705 | f/f5 | 0.30 |
| Vdmin | 17.0 | (|f/f4| + |f/f5|)/|f/f3| | 0.55 |
| (Vi/Ni)min | 10.0 | ImgH/f | 0.25 |
| V4 + V5 | 35.4 | EPD/ImgH | 1.96 |
| CT4/CT1 | 0.15 | tan(FOV) | 0.51 |
| CT5/ET5 | 3.56 | f/EPD | 2.05 |
| (CT4 + T45)/CT5 | 0.92 | TL/f | 0.83 |
| (CT2 + CT3 + CT4)/T23 | 0.36 | SL/TL | 0.86 |
| T23/(T12 + T34 + T45) | 2.38 | BL/TD | 0.09 |
| (CT1 + T23)/BL | 6.80 | Y11/Y31 | 2.00 |
| (R2 + R3)/(R2 − R3) | 0.07 | Y11/Y52 | 1.13 |

5th Embodiment

Figure 5A:
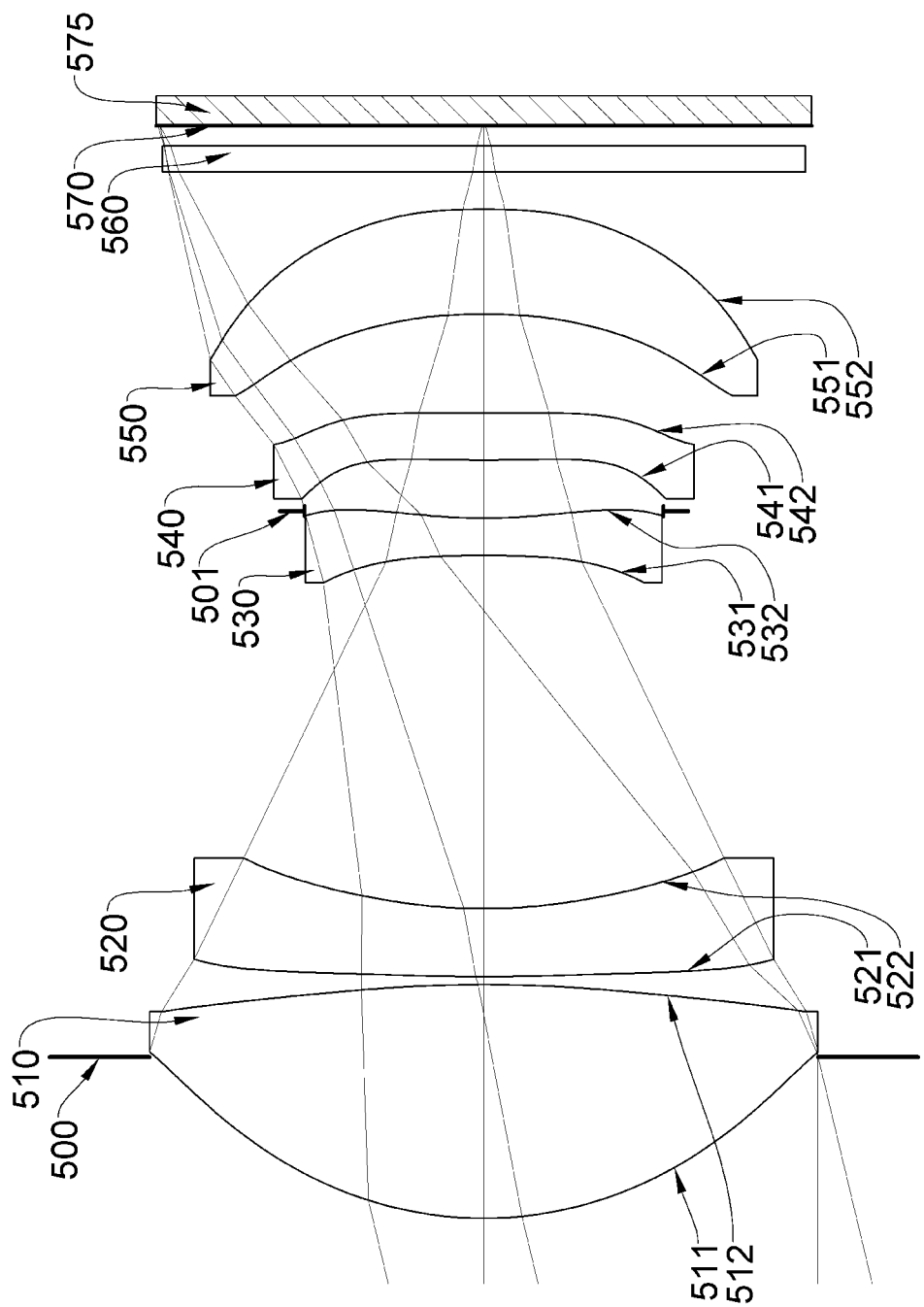
FIG. 5A is a schematic view of an imaging apparatus according to the 5th embodiment of the present disclosure.
Figure 5B:
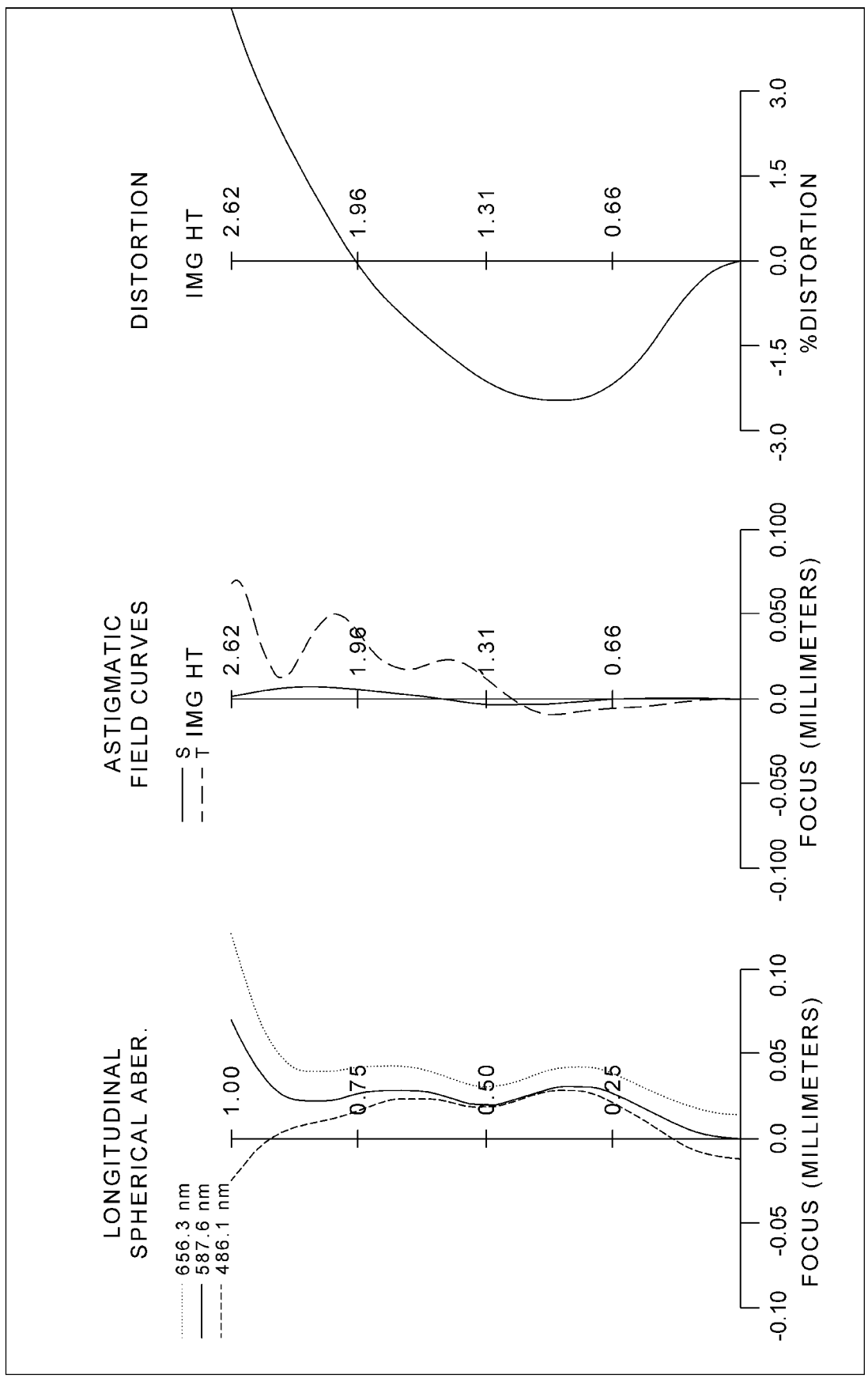
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an imaging optical lens assembly (not otherwise herein labeled) of the present disclosure and an image sensor 575. The imaging optical lens assembly includes, in order from an object side to an image side along an optical path, an aperture stop 500, a first lens element 510, a second lens element 520, a third lens element 530, a stop 501, a fourth lens element 540, a fifth lens element 550, a filter 560, and an image surface 570. The image sensor 575 is disposed on or near the image surface 570. There is an air gap between each of adjacent lens elements of the first lens element 510, the second lens element 520, the third lens element 530, the fourth lens element 540, and the fifth lens element 550, and there is no additional lens element inserted between the five lens elements.

The first lens element 510 has positive refractive power and is made of plastic material. The first lens element 510 has an object-side surface 511 being convex in a paraxial region thereof, and an image-side surface 512 being convex in a paraxial region thereof. Both the object-side surface 511 and the image-side surface 512 are aspheric, and there are one inflection point on the object-side surface 511 and two inflection points on the image-side surface 512.

The second lens element 520 has negative refractive power and is made of plastic material. The second lens element 520 has an object-side surface 521 being convex in a paraxial region thereof, and an image-side surface 522 being concave in a paraxial region thereof. Both the object-side surface 521 and the image-side surface 522 are aspheric, and there is one inflection point on the object-side surface 521.

The third lens element 530 has negative refractive power and is made of plastic material. The third lens element 530 has an object-side surface 531 being concave in a paraxial region thereof, and an image-side surface 532 being convex in a paraxial region thereof. Both the object-side surface 531 and the image-side surface 532 are aspheric, and there are two inflection points and one critical point on the image-side surface 532.

The fourth lens element 540 has positive refractive power and is made of plastic material. The fourth lens element 540 has an object-side surface 541 being convex in a paraxial region thereof, and an image-side surface 542 being concave in a paraxial region thereof. Both the object-side surface 541 and the image-side surface 542 are aspheric, and there are one inflection point on the object-side surface 541 and two inflection points on the image-side surface 542.

The fifth lens element 550 has negative refractive power and is made of plastic material. The fifth lens element 550 has an object-side surface 551 being concave in a paraxial region thereof, and an image-side surface 552 being convex in a paraxial region thereof. Both the object-side surface 551 and the image-side surface 552 are aspheric, and there are two inflection points on the object-side surface 551, and there is one inflection point on the image-side surface 552.

The filter 560 is disposed between the fifth lens element 550 and the image surface 570. The filter 560 is made of glass material and does not affect the focal length of the imaging optical lens assembly.

The detailed optical data of the 5th embodiment are shown in TABLE 9, and the aspheric surface data are shown in TABLE 10.

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in the table below.

| 5th Embodiment | | | |
|---|---|---|---|
| f [mm] | 10.41 | (R5 + R6)/(R5 − R6) | 0.48 |
| Fno. | 1.94 | f/f3 | −1.85 |

TABLE 9

(5th Embodiment)
f = 10.41 mm, Fno = 1.94, HFOV = 13.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.294 | | | | |
| 2 | Lens 1 | 3.016 | ASP | 1.877 | Plastic | 1.545 | 56.1 | 4.63 |
| 3 | | −12.045 | ASP | 0.064 | | | | |
| 4 | Lens 2 | 14.627 | ASP | 0.547 | Plastic | 1.669 | 19.5 | −9.10 |
| 5 | | 4.234 | ASP | 2.839 | | | | |
| 6 | Lens 3 | −11.801 | ASP | 0.300 | Plastic | 1.544 | 56.0 | −5.63 |
| 7 | | 4.174 | ASP | 0.057 | | | | |
| 8 | Stop | Plano | | 0.410 | | | | |
| 9 | Lens 4 | 11.944 | ASP | 0.380 | Plastic | 1.686 | 18.4 | 31.95 |
| 10 | | 25.901 | ASP | 0.793 | | | | |
| 11 | Lens 5 | −5.740 | ASP | 0.842 | Plastic | 1.705 | 17.0 | −24.07 |
| 12 | | −9.200 | ASP | 0.300 | | | | |
| 13 | Filter | Plano | | 0.210 | Glass | 1.517 | 64.2 | — |
| 14 | | Plano | | 0.163 | | | | |
| 15 | Image Surface | Plano | | — | | | | |

Remark: Reference wavelength is d-line 587.6 nm.
* The effective radius of Surface 8 (Stop) is 1.440 mm.

TABLE 10

Aspheric Coefficient

| Surface # | 2 | 3 | 4 | 5 | 6 |
|---|---|---|---|---|---|
| k = | −3.9857E−01 | 1.7708E+01 | −4.2155E+01 | −1.9887E+01 | 3.0366E+01 |
| A4 = | 4.4621E−04 | −3.7706E−03 | −1.5531E−02 | 1.9686E−02 | −4.5947E−02 |
| A6 = | 6.2624E−05 | 5.3378E−03 | 5.5312E−03 | −1.4456E−02 | −5.4404E−02 |
| A8 = | 9.7213E−05 | −1.6245E−03 | −2.5901E−04 | 9.0735E−03 | 8.5100E−02 |
| A10 = | −7.5316E−05 | 2.6328E−04 | −2.7765E−04 | −3.0876E−03 | −5.2072E−02 |
| A12 = | 2.1853E−05 | −2.3248E−05 | 6.7679E−05 | 5.1169E−04 | 1.3151E−02 |
| A14 = | −2.9459E−06 | 9.4899E−07 | −4.5687E−06 | −1.9991E−05 | −6.2697E−04 |
| A16 = | 1.4026E−07 | | | −2.4956E−06 | −1.4547E−04 |

| Surface # | 7 | 9 | 10 | 11 | 12 |
|---|---|---|---|---|---|
| k = | −3.6425E+01 | 2.0199E+01 | −5.9000E+01 | −9.6681E+00 | 9.9798E−01 |
| A4 = | 1.3158E−02 | −1.1529E−01 | −1.3109E−01 | −1.6093E−01 | −2.3604E−01 |
| A6 = | −7.4095E−02 | 2.4515E−01 | 2.9431E−01 | 2.3813E−01 | 2.8848E−01 |
| A8 = | 5.3701E−02 | −4.4186E−01 | −4.4135E−01 | −2.1907E−01 | −2.4694E−01 |
| A10 = | −1.2002E−02 | 3.9098E−01 | 3.6149E−01 | 1.2531E−01 | 1.4335E−01 |
| A12 = | −3.7493E−03 | −1.9969E−01 | −1.7686E−01 | −4.6899E−02 | −5.6330E−02 |
| A14 = | 1.4312E−03 | 5.8242E−02 | 5.1583E−02 | 1.1643E−02 | 1.4603E−02 |
| A16 = | | −8.6936E−03 | −8.1554E−03 | −1.8789E−03 | −2.3752E−03 |
| A18 = | | 4.9660E−04 | 5.3076E−04 | 1.8238E−04 | 2.1833E−04 |
| A20 = | | | | −8.2084E−06 | −8.6099E−06 |

-continued

5th Embodiment

| HFOV [deg.] | 13.4 | f/f4 | 0.33 |
|---|---|---|---|
| Nmax | 1.705 | f/f5 | −0.43 |
| Vdmin | 17.0 | (|f/f4| + |f/f5|)/|f/f3| | 0.41 |
| (Vi/Ni)min | 10.0 | ImgH/f | 0.25 |
| V4 + V5 | 35.4 | EPD/ImgH | 2.05 |
| CT4/CT1 | 0.20 | tan(FOV) | 0.51 |
| CT5/ET5 | 2.89 | f/EPD | 1.94 |
| (CT4 + T45)/CT5 | 1.39 | TL/f | 0.84 |
| (CT2 + CT3 + CT4)/T23 | 0.43 | SL/TL | 0.85 |
| T23/(T12 + T34 + T45) | 2.14 | BL/TD | 0.08 |
| (CT1 + T23)/BL | 7.01 | Y11/Y31 | 2.08 |
| (R2 + R3)/(R2 − R3) | −0.10 | Y11/Y52 | 1.22 |

6th Embodiment

Figure 6A:
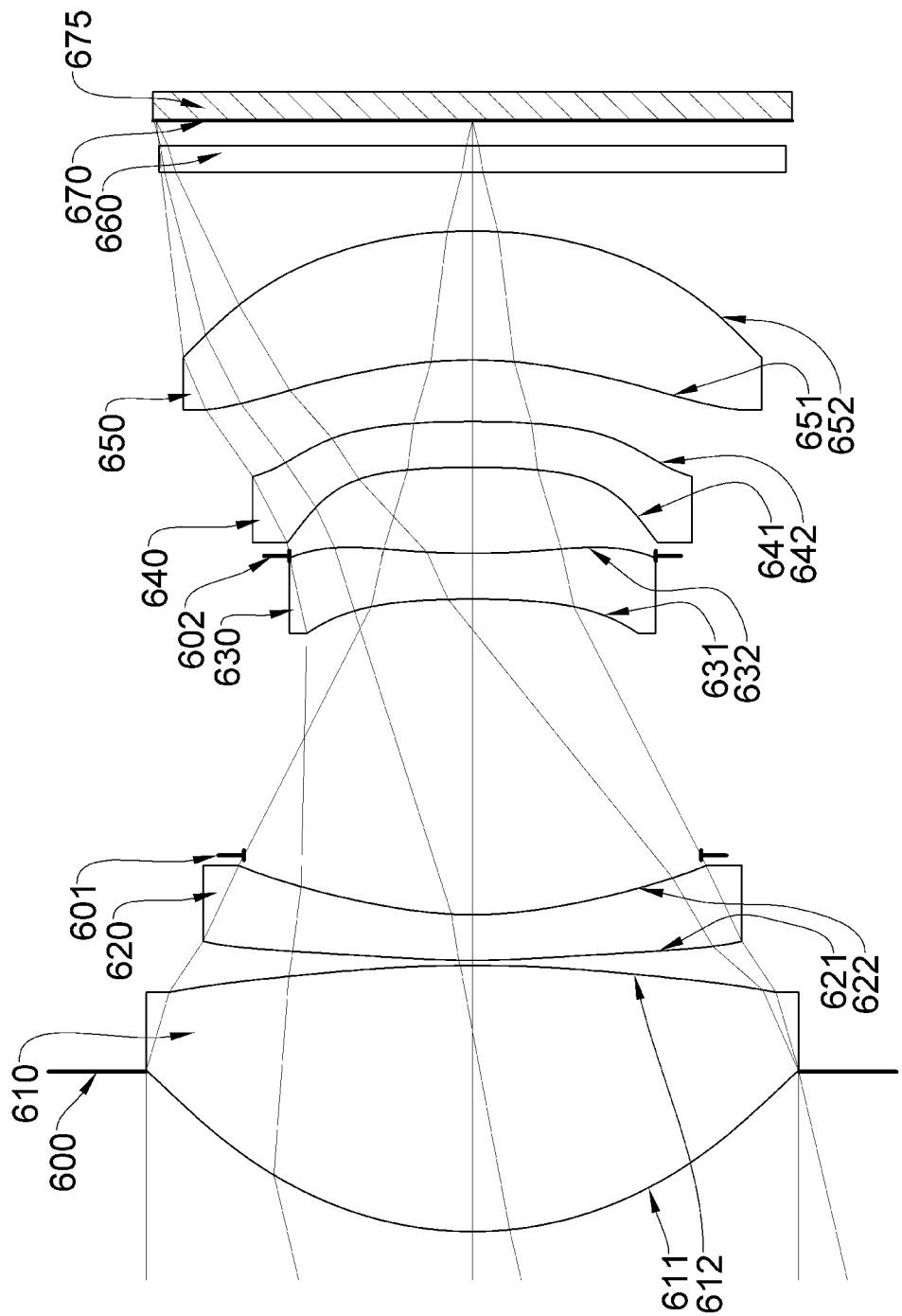
FIG. 6A is a schematic view of an imaging apparatus according to the 6th embodiment of the present disclosure.
Figure 6B:
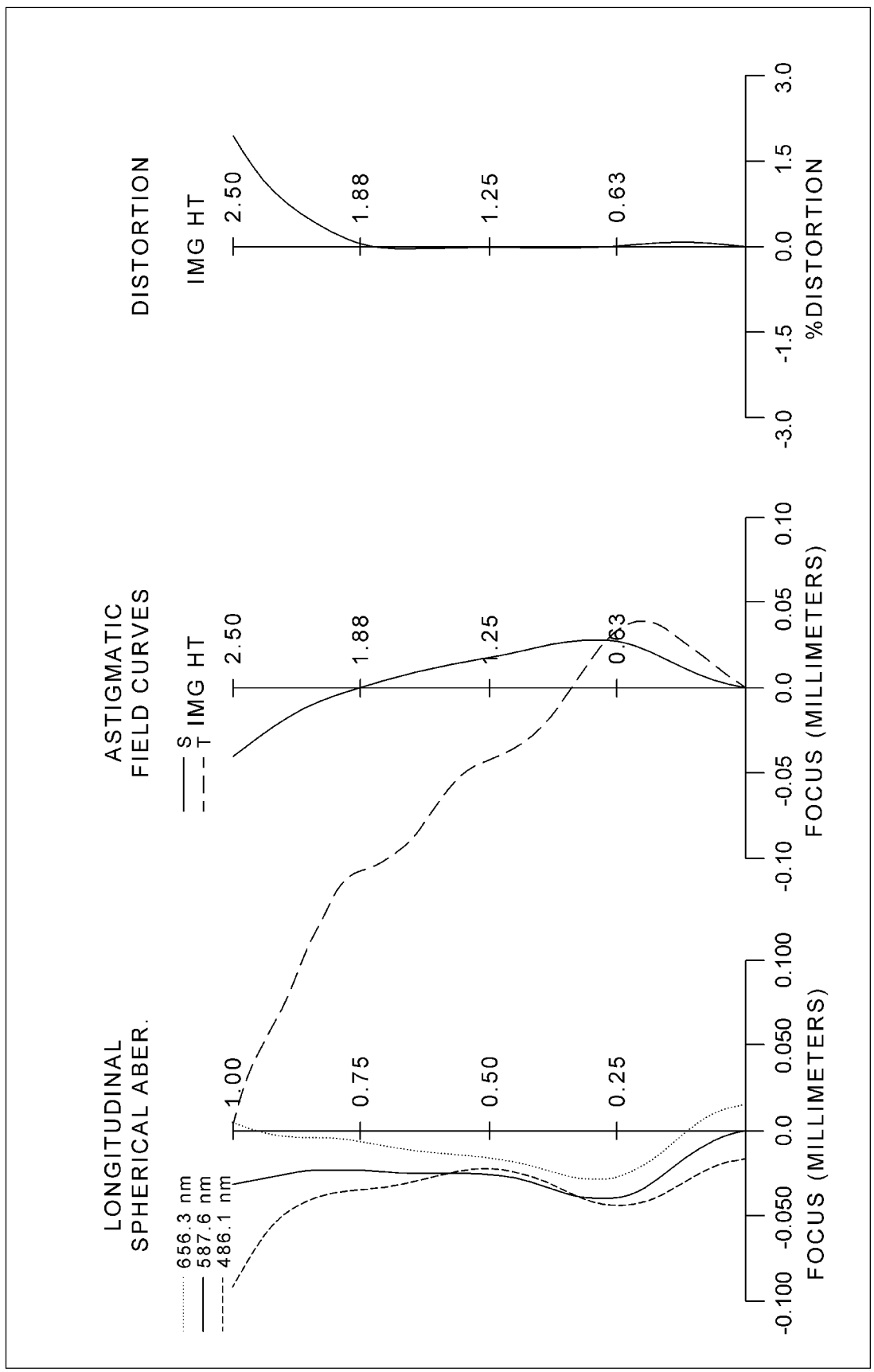
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an imaging optical lens assembly (not otherwise herein labeled) of the present disclosure and an image sensor 675. The imaging optical lens assembly includes, in order from an object side to an image side along an optical path, an aperture stop 600, a first lens element 610, a second lens element 620, a first stop 601, a third lens element 630, a second stop 602, a fourth lens element 640, a fifth lens element 650, a filter 660, and an image surface 670. The image sensor 675 is disposed on or near the image surface 670. There is an air gap between each of adjacent lens elements of the first lens element 610, the second lens element 620, the third lens element 630, the fourth lens element 640, and the fifth lens element 650, and there is no additional lens element inserted between the five lens elements.

The first lens element 610 has positive refractive power and is made of plastic material. The first lens element 610 has an object-side surface 611 being convex in a paraxial region thereof, and an image-side surface 612 being convex in a paraxial region thereof. Both the object-side surface 611 and the image-side surface 612 are aspheric, and there is one inflection point on the object-side surface 611.

The second lens element 620 has negative refractive power and is made of plastic material. The second lens element 620 has an object-side surface 621 being convex in a paraxial region thereof, and an image-side surface 622 being concave in a paraxial region thereof. Both the object-side surface 621 and the image-side surface 622 are aspheric, and there are two inflection points on the object-side surface 621.

The third lens element 630 has negative refractive power and is made of plastic material. The third lens element 630 has an object-side surface 631 being concave in a paraxial region thereof, and an image-side surface 632 being concave in a paraxial region thereof. Both the object-side surface 631 and the image-side surface 632 are aspheric, and there are one inflection point and one critical point on the image-side surface 632.

The fourth lens element 640 has negative refractive power and is made of plastic material. The fourth lens element 640 has an object-side surface 641 being concave in a paraxial region thereof, and an image-side surface 642 being convex in a paraxial region thereof. Both the object-side surface 641 and the image-side surface 642 are aspheric, and there are one inflection point on the object-side surface 641 and two inflection points on the image-side surface 642.

The fifth lens element 650 has positive refractive power and is made of plastic material. The fifth lens element 650 has an object-side surface 651 being concave in a paraxial region thereof, and an image-side surface 652 being convex in a paraxial region thereof. Both the object-side surface 651 and the image-side surface 652 are aspheric, and there is one inflection point on the object-side surface 651.

The filter 660 is disposed between the fifth lens element 650 and the image surface 670. The filter 660 is made of glass material and does not affect the focal length of the imaging optical lens assembly.

The detailed optical data of the 6th embodiment are shown in TABLE 11, and the aspheric surface data are shown in TABLE 12.

TABLE 11

(6th Embodiment)
f = 10.50 mm, Fno = 2.05, HFOV = 13.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.256 | | | | |
| 2 | Lens 1 | 2.895 | ASP | 2.090 | Plastic | 1.545 | 56.1 | 4.57 |
| 3 | | −13.355 | ASP | 0.040 | | | | |
| 4 | Lens 2 | 6.119 | ASP | 0.360 | Plastic | 1.686 | 18.4 | −9.33 |
| 5 | | 3.054 | ASP | 0.468 | | | | |
| 6 | Stop 1 | Plano | | 2.011 | | | | |
| 7 | Lens 3 | −8.624 | ASP | 0.360 | Plastic | 1.544 | 56.0 | −6.29 |
| 8 | | 5.762 | ASP | −0.019 | | | | |
| 9 | Stop 2 | Plano | | 0.694 | | | | |
| 10 | Lens 4 | −11.787 | ASP | 0.360 | Plastic | 1.686 | 18.4 | −87.82 |
| 11 | | −14.836 | ASP | 0.484 | | | | |
| 12 | Lens 5 | −4.275 | ASP | 1.014 | Plastic | 1.686 | 18.4 | 43.98 |
| 13 | | −4.106 | ASP | 0.462 | | | | |
| 14 | Filter | Plano | | 0.210 | Glass | 1.517 | 64.2 | — |
| 15 | | Plano | | 0.194 | | | | |
| 16 | Image Surface | Plano | | — | | | | |

Remark: Reference wavelength is d-line 587.6 nm.
* The effective radius of Surface 6 (Stop 1) is 1.795 mm
The effective radius of Surface 9 (Stop 2) is 1.438 mm

TABLE 12

| Aspheric Coefficient | | | | | |
|---|---|---|---|---|---|
| Surface # | 2 | 3 | 4 | 5 | 7 |
| k = | −3.9854E−01 | 2.6202E+01 | −7.7665E+01 | −2.1083E+01 | 2.6384E+01 |
| A4 = | 1.1014E−03 | −1.5201E−02 | −2.2094E−02 | 2.4252E−02 | −4.9321E−02 |
| A6 = | −2.1121E−04 | 1.5015E−02 | 1.2125E−02 | −1.2371E−02 | 3.0400E−02 |
| A8 = | 3.5120E−05 | −5.5124E−03 | −2.7026E−03 | −4.3822E−04 | −1.0185E−01 |
| A10 = | −1.7478E−05 | 1.0863E−03 | 1.0730E−04 | 4.8410E−03 | 1.3484E−01 |
| A12 = | 8.3230E−06 | −1.1422E−04 | 5.3039E−05 | −2.5872E−03 | −9.2097E−02 |
| A14 = | −1.7178E−06 | 5.1975E−06 | −5.6490E−06 | 5.7385E−04 | 3.2302E−02 |
| A16 = | 1.0170E−07 | | | −4.7524E−05 | −4.6213E−03 |
| Surface # | 8 | 10 | 11 | 12 | 13 |
| k = | −6.0246E+01 | 4.3157E+01 | 5.2236E+01 | −3.3083E+01 | −6.6995E+01 |
| A4 = | 1.4114E−02 | −1.9005E−01 | −1.8906E−01 | −1.4653E−01 | −1.7491E−01 |
| A6 = | −3.9610E−02 | 4.4867E−01 | 4.0427E−01 | 2.5637E−01 | 2.1796E−01 |
| A8 = | −2.6480E−03 | −7.9108E−01 | −5.3415E−01 | −2.4592E−01 | −1.9894E−01 |
| A10 = | 1.9726E−02 | 7.5694E−01 | 3.8840E−01 | 1.3698E−01 | 1.2698E−01 |
| A12 = | −1.1972E−02 | −4.4754E−01 | −1.6877E−01 | −4.5603E−02 | −5.7625E−02 |
| A14 = | 2.3499E−03 | 1.5925E−01 | 4.4507E−02 | 8.8632E−03 | 1.8441E−02 |
| A16 = | | −3.0399E−02 | −6.5517E−03 | −8.6495E−04 | −4.0753E−03 |
| A18 = | | 2.3675E−03 | 4.0908E−04 | 9.5805E−06 | 6.0162E−04 |
| A20 = | | | | 5.3240E−06 | −5.6084E−05 |
| A22 = | | | | −3.1932E−07 | 2.9596E−06 |
| A24 = | | | | | −6.6850E−08 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in the table below.

| 6th Embodiment | | | |
|---|---|---|---|
| f [mm] | 10.50 | (R5 + R6)/(R5 − R6) | 0.20 |
| Fno. | 2.05 | f/f3 | −1.67 |
| HFOV [deg.] | 13.2 | f/f4 | −0.12 |
| Nmax | 1.686 | f/f5 | 0.24 |
| Vdmin | 18.4 | (|f/f4| + |f/f5|)/|f/f3| | 0.21 |
| (Vi/Ni)min | 10.9 | ImgH/f | 0.24 |
| V4 + V5 | 36.8 | EPD/ImgH | 2.05 |
| CT4/CT1 | 0.17 | tan(FOV) | 0.50 |
| CT5/ET5 | 2.46 | f/EPD | 2.05 |
| (CT4 + T45)/CT5 | 0.83 | TL/f | 0.83 |
| (CT2 + CT3 + CT4)/T23 | 0.44 | SL/TL | 0.86 |
| T23/(T12 + T34 + T45) | 2.07 | BL/TD | 0.11 |
| (CT1 + T23)/BL | 5.28 | Y11/Y31 | 1.97 |
| (R2 + R3)/(R2 − R3) | 0.37 | Y11/Y52 | 1.13 |

7th Embodiment

Figure 7A:
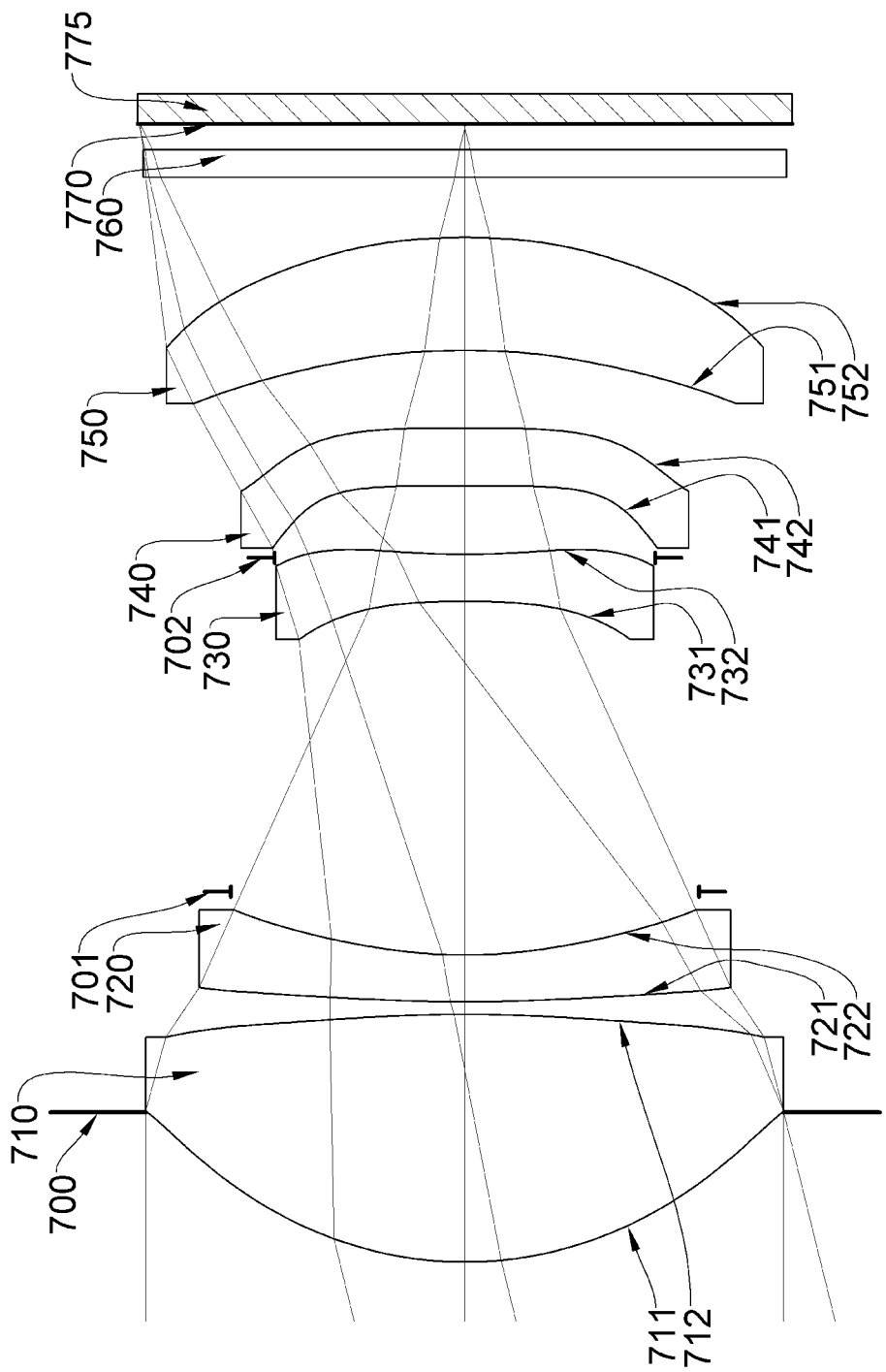
FIG. 7A is a schematic view of an imaging apparatus according to the 7th embodiment of the present disclosure.
Figure 7B:
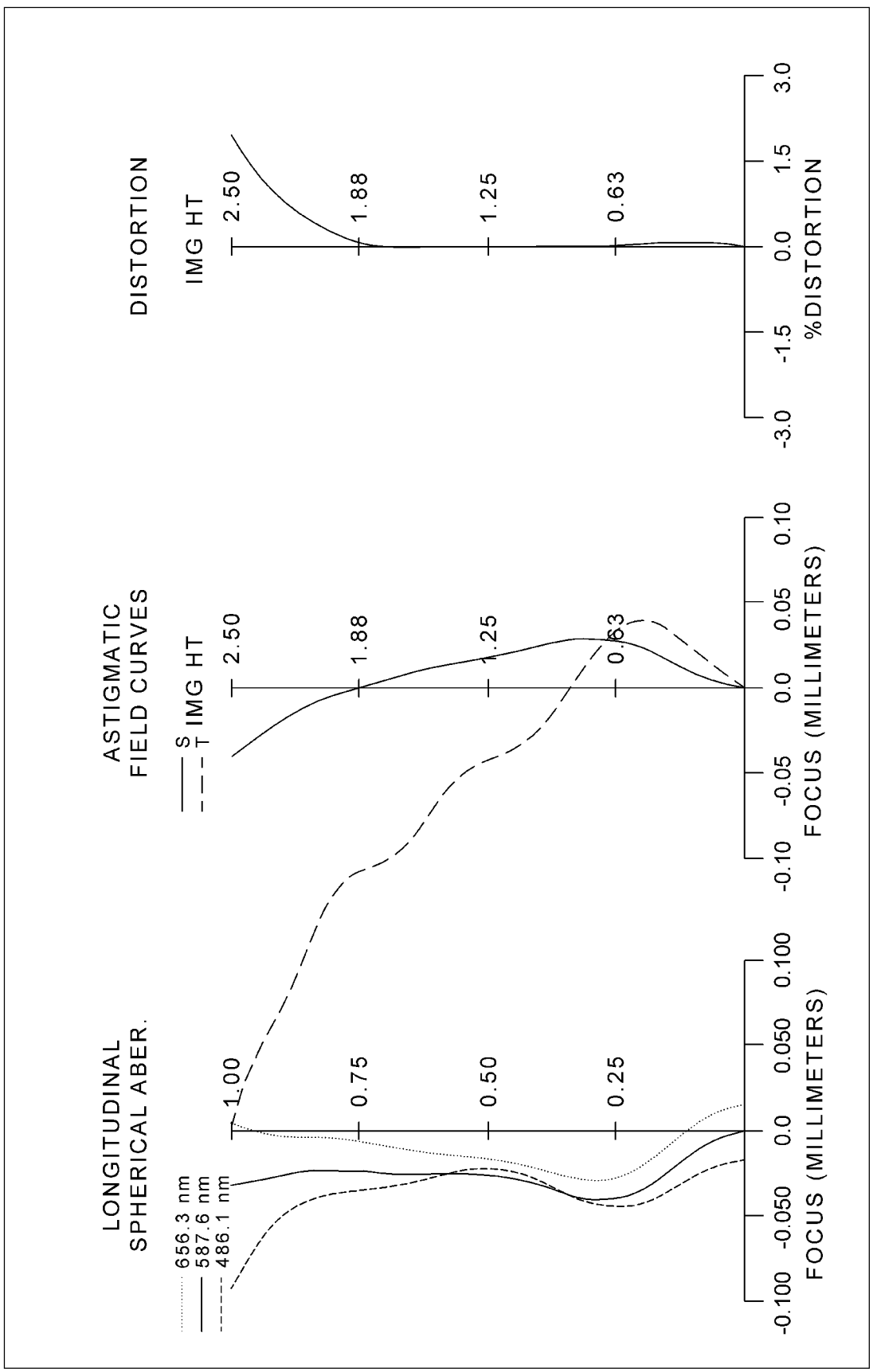
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an imaging optical lens assembly (not otherwise herein labeled) of the present disclosure and an image sensor 775. The imaging optical lens assembly includes, in order from an object side to an image side along an optical path, an aperture stop 700, a first lens element 710, a second lens element 720, a first stop 701, a third lens element 730, a second stop 702, a fourth lens element 740, a fifth lens element 750, a filter 760, and an image surface 770. The image sensor 775 is disposed on or near the image surface 770. There is an air gap between each of adjacent lens elements of the first lens element 710, the second lens element 720, the third lens element 730, the fourth lens element 740, and the fifth lens element 750, and there is no additional lens element inserted between the five lens elements.

The first lens element 710 has positive refractive power and is made of plastic material. The first lens element 710 has an object-side surface 711 being convex in a paraxial region thereof, and an image-side surface 712 being convex in a paraxial region thereof. Both the object-side surface 711 and the image-side surface 712 are aspheric, and there are one inflection point on the object-side surface 711 and two inflection points on the image-side surface 712.

The second lens element 720 has negative refractive power and is made of plastic material. The second lens element 720 has an object-side surface 721 being convex in a paraxial region thereof, and an image-side surface 722 being concave in a paraxial region thereof. Both the object-side surface 721 and the image-side surface 722 are aspheric, and there are two inflection points on the object-side surface 721.

The third lens element 730 has negative refractive power and is made of plastic material. The third lens element 730 has an object-side surface 731 being concave in a paraxial region thereof, and an image-side surface 732 being concave in a paraxial region thereof. Both the object-side surface 731 and the image-side surface 732 are aspheric, and there are one inflection point and one critical point on the image-side surface 732.

The fourth lens element 740 has positive refractive power and is made of plastic material. The fourth lens element 740 has an object-side surface 741 being convex in a paraxial region thereof, and an image-side surface 742 being concave in a paraxial region thereof. Both the object-side surface 741 and the image-side surface 742 are aspheric, and there are two inflection points on the object-side surface 741 and two inflection points on the image-side surface 742.

The fifth lens element 750 has positive refractive power and is made of plastic material. The fifth lens element 750 has an object-side surface 751 being concave in a paraxial region thereof, and an image-side surface 752 being convex in a paraxial region thereof. Both the object-side surface 751 and the image-side surface 752 are aspheric, and there is one inflection point on the object-side surface 751.

The filter 760 is disposed between the fifth lens element 750 and the image surface 770. The filter 760 is made of glass material and does not affect the focal length of the imaging optical lens assembly.

The detailed optical data of the 7th embodiment are shown in TABLE 13, and the aspheric surface data are shown in TABLE 14.

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in the table below.

TABLE 13

(7th Embodiment)
f = 10.03 mm, Fno = 2.05, HFOV = 13.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.149 | | | | |
| 2 | Lens 1 | 2.886 | ASP | 1.899 | Plastic | 1.545 | 56.1 | 4.55 |
| 3 | | −13.459 | ASP | 0.096 | | | | |
| 4 | Lens 2 | 9.461 | ASP | 0.360 | Plastic | 1.686 | 18.4 | −9.00 |
| 5 | | 3.678 | ASP | 0.487 | | | | |
| 6 | Stop 1 | Plano | | 2.227 | | | | |
| 7 | Lens 3 | −7.190 | ASP | 0.360 | Plastic | 1.544 | 56.0 | −5.55 |
| 8 | | 5.301 | ASP | −0.026 | | | | |
| 9 | Stop 2 | Plano | | 0.549 | | | | |
| 10 | Lens 4 | 26.667 | ASP | 0.446 | Plastic | 1.686 | 18.4 | 41.44 |
| 11 | | 426.516 | ASP | 0.595 | | | | |
| 12 | Lens 5 | −6.650 | ASP | 0.867 | Plastic | 1.686 | 18.4 | 23.47 |
| 13 | | −4.957 | ASP | 0.462 | | | | |
| 14 | Filter | Plano | | 0.210 | Glass | 1.517 | 64.2 | — |
| 15 | | Plano | | 0.200 | | | | |
| 16 | Image Surface | Plano | | — | | | | |

Remark: Reference wavelength is d-line 587.6 nm.
* The effective radius of Surface 6 (Stop 1) is 1.795 mm.
* The effective radius of Surface 9 (Stop 2) is 1.459 mm

TABLE 14

Aspheric Coefficient

| Surface # | 2 | 3 | 4 | 5 | 7 |
|---|---|---|---|---|---|
| k = | −3.9372E−01 | 2.5054E+01 | −7.0297E+01 | −2.1280E+01 | 1.8557E+01 |
| A4 = | 9.1163E−04 | −5.4138E−03 | −2.3713E−02 | 1.9482E−02 | −7.5587E−02 |
| A6 = | −2.3122E−04 | 9.3571E−03 | 1.5899E−02 | −1.4142E−02 | 4.1629E−02 |
| A8 = | 1.7970E−04 | −3.2477E−03 | −3.5474E−03 | 1.0740E−02 | −8.0199E−02 |
| A10 = | −7.8668E−05 | 4.8076E−04 | −2.7272E−04 | −4.3641E−03 | 9.3652E−02 |
| A12 = | 2.1449E−05 | −2.9192E−05 | 2.0245E−04 | 7.1583E−04 | −6.0068E−02 |
| A14 = | −3.0176E−06 | 3.9511E−07 | −1.9116E−05 | 1.4555E−05 | 1.9974E−02 |
| A16 = | 1.2805E−07 | | | −1.0583E−05 | −2.6700E−03 |

| Surface # | 8 | 10 | 11 | 12 | 13 |
|---|---|---|---|---|---|
| k = | −8.8953E+01 | 2.2223E+01 | −9.9000E+01 | −5.3298E+01 | −3.2782E+01 |
| A4 = | −5.8105E−03 | −1.0615E−01 | −1.0648E−01 | −5.7381E−02 | −5.0437E−02 |
| A6 = | −2.6776E−02 | 1.1403E−01 | 8.2381E−02 | −1.5697E−02 | −1.6688E−02 |
| A8 = | −6.1455E−03 | −1.8043E−01 | −5.6183E−02 | 9.0923E−02 | 4.6667E−02 |
| A10 = | 1.5179E−02 | 1.7106E−01 | 1.6884E−02 | −8.8004E−02 | −3.4540E−02 |
| A12 = | −7.8113E−03 | −1.2270E−01 | −4.6418E−03 | 4.3808E−02 | 1.4909E−02 |
| A14 = | 1.3669E−03 | 5.3054E−02 | 2.1103E−03 | −1.2945E−02 | −4.3815E−03 |
| A16 = | | −1.1456E−02 | −5.1334E−04 | 2.3398E−03 | 9.1649E−04 |
| A18 = | | 9.5092E−04 | 4.1702E−05 | −2.5215E−04 | −1.3453E−04 |
| A20 = | | | | 1.4742E−05 | 1.3016E−05 |
| A22 = | | | | −3.5557E−07 | −7.3342E−07 |
| A24 = | | | | | 1.7974E−08 |

| 7th Embodiment | | | |
|---|---|---|---|
| f [mm] | 10.03 | (R5 + R6)/(R5 − R6) | 0.15 |
| Fno. | 2.05 | f/f3 | −1.81 |
| HFOV [deg.] | 13.8 | f/f4 | 0.24 |
| Nmax | 1.686 | f/f5 | 0.43 |
| Vdmin | 18.4 | (|f/f4| + |f/f5|)/|f/f3| | 0.37 |
| (Vi/Ni)min | 10.9 | ImgH/f | 0.25 |
| V4 + V5 | 36.8 | EPD/ImgH | 1.96 |
| CT4/CT1 | 0.23 | tan(FOV) | 0.52 |
| CT5/ET5 | 2.02 | f/EPD | 2.05 |
| (CT4 + T45)/CT5 | 1.20 | TL/f | 0.87 |
| (CT2 + CT3 + CT4)/T23 | 0.43 | SL/TL | 0.87 |
| T23/(T12 + T34 + T45) | 2.24 | BL/TD | 0.11 |
| (CT1 + T23)/BL | 5.29 | Y11/Y31 | 1.92 |
| (R2 + R3)/(R2 − R3) | 0.17 | Y11/Y52 | 1.07 |

8th Embodiment

Figure 8A:
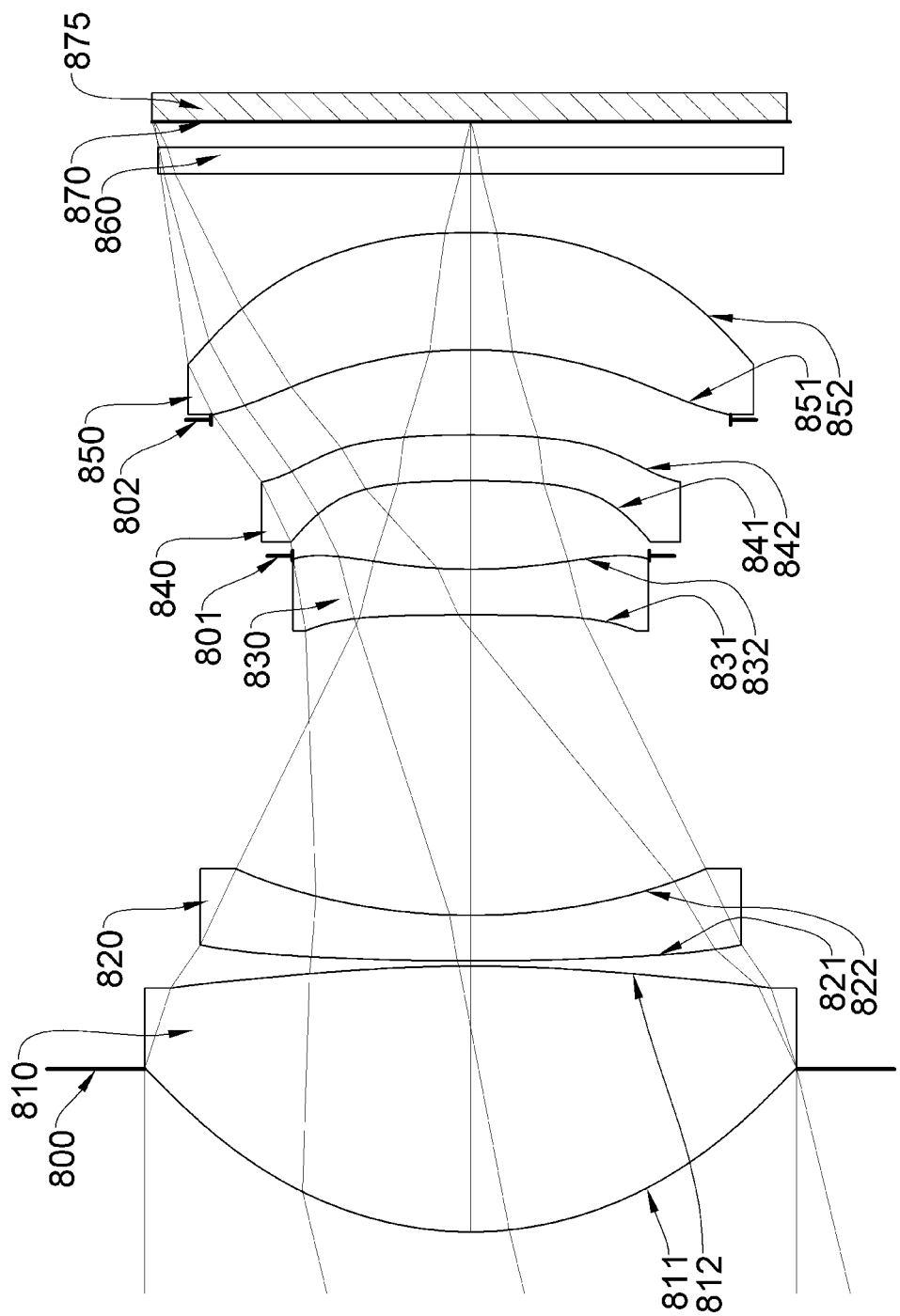
FIG. 8A is a schematic view of an imaging apparatus according to the 8th embodiment of the present disclosure.
Figure 8B:
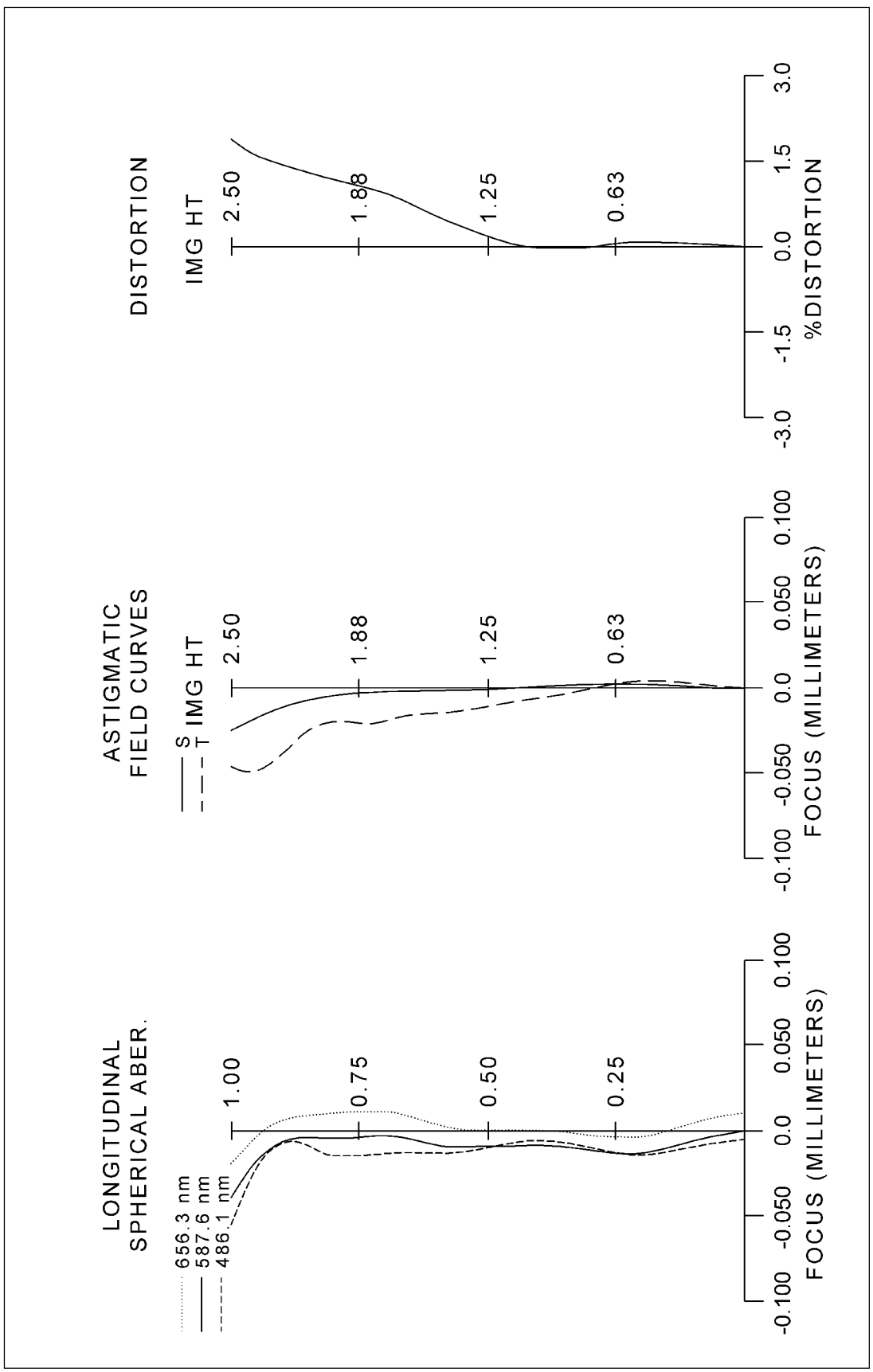
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an imaging optical lens assembly (not otherwise herein labeled) of the present disclosure and an image sensor 875. The imaging optical lens assembly includes, in order from an object side to an image side along an optical path, an aperture stop 800, a first lens element 810, a second lens element 820, a third lens element 830, a first stop 801, a fourth lens element 840, a second stop 802, a fifth lens element 850, a filter 860, and an image surface 870. The image sensor 875 is disposed on or near the image surface 870. There is an air gap between each of adjacent lens elements of the first lens element 810, the second lens element 820, the third lens element 830, the fourth lens element 840, and the fifth lens element 850, and there is no additional lens element inserted between the five lens elements.

The first lens element 810 has positive refractive power and is made of plastic material. The first lens element 810 has an object-side surface 811 being convex in a paraxial region thereof, and an image-side surface 812 being convex in a paraxial region thereof. Both the object-side surface 811 and the image-side surface 812 are aspheric, and there is one inflection point on the object-side surface 811.

The second lens element 820 has negative refractive power and is made of plastic material. The second lens element 820 has an object-side surface 821 being convex in a paraxial region thereof, and an image-side surface 822 being concave in a paraxial region thereof. Both the object-side surface 821 and the image-side surface 822 are aspheric.

The third lens element 830 has negative refractive power and is made of plastic material. The third lens element 830 has an object-side surface 831 being concave in a paraxial region thereof, and an image-side surface 832 being concave in a paraxial region thereof. Both the object-side surface 831 and the image-side surface 832 are aspheric, and there are one inflection point and one critical point on the image-side surface 832.

The fourth lens element 840 has negative refractive power and is made of plastic material. The fourth lens element 840 has an object-side surface 841 being concave in a paraxial region thereof, and an image-side surface 842 being convex in a paraxial region thereof. Both the object-side surface 841 and the image-side surface 842 are aspheric, and there is one inflection point on the image-side surface 842.

The fifth lens element 850 has negative refractive power and is made of plastic material. The fifth lens element 850 has an object-side surface 851 being concave in a paraxial region thereof, and an image-side surface 852 being convex in a paraxial region thereof. Both the object-side surface 851 and the image-side surface 852 are aspheric, and there are one inflection point on the object-side surface 851 and one inflection point on the image-side surface 852.

The filter 860 is disposed between the fifth lens element 850 and the image surface 870. The filter 860 is made of glass material and does not affect the focal length of the imaging optical lens assembly.

The detailed optical data of the 8th embodiment are shown in TABLE 15, and the aspheric surface data are shown in TABLE 16.

TABLE 15

(8th Embodiment)
f = 10.50 mm, Fno = 2.05, HFOV = 13.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.280 | | | | |
| 2 | Lens 1 | 2.878 | ASP | 2.090 | Plastic | 1.544 | 55.9 | 4.48 |
| 3 | | −11.760 | ASP | 0.040 | | | | |
| 4 | Lens 2 | 20.923 | ASP | 0.360 | Plastic | 1.686 | 18.4 | −9.20 |
| 5 | | 4.815 | ASP | 2.362 | | | | |
| 6 | Lens 3 | −42.555 | ASP | 0.360 | Plastic | 1.544 | 55.9 | −6.96 |
| 7 | | 4.167 | ASP | 0.107 | | | | |
| 8 | Stop 1 | Plano | | 0.589 | | | | |
| 9 | Lens 4 | −14.019 | ASP | 0.360 | Plastic | 1.686 | 18.4 | −691.92 |
| 10 | | −14.597 | ASP | 0.119 | | | | |
| 11 | Stop 2 | Plano | | 0.551 | | | | |
| 12 | Lens 5 | −4.472 | ASP | 0.922 | Plastic | 1.686 | 18.4 | −24.55 |
| 13 | | −6.600 | ASP | 0.462 | | | | |
| 14 | Filter | Plano | | 0.210 | Glass | 1.517 | 64.2 | — |
| 15 | | Plano | | 0.200 | | | | |
| 16 | Image Surface | Plano | | — | | | | |

Remark: Reference wavelength is d-line 587.6 nm.
* The effective radius of Surface 8 (Stop 1) is 1.400 mm
* The effective radius of Surface 11 (Stop 2) is 2.040 mm

TABLE 16

Aspheric Coefficient

| Surface # | 2 | 3 | 4 | 5 | 6 |
|---|---|---|---|---|---|
| k = | −3.9627E−01 | −4.8070E−01 | −9.8868E+01 | −2.1954E+01 | 9.0000E+01 |
| A4 = | 2.9543E−05 | 5.4978E−03 | 5.5205E−04 | 2.0828E−02 | −1.0629E−02 |
| A6 = | 3.0376E−04 | −2.2869E−03 | −2.6611E−03 | −9.6705E−03 | −3.3725E−02 |
| A8 = | −8.7264E−05 | 8.6422E−04 | 1.8925E−03 | 4.5540E−03 | 3.0663E−02 |
| A10 = | 3.2771E−06 | −1.7017E−04 | −4.3646E−04 | −1.0794E−03 | −2.6464E−02 |
| A12 = | 1.5097E−06 | 1.4902E−05 | 3.7730E−05 | 9.8075E−05 | 1.6762E−02 |
| A14 = | −2.2667E−07 | −4.5321E−07 | −3.9518E−07 | | −6.7138E−03 |
| A16 = | | | | | 1.1562E−03 |

| Surface # | 7 | 9 | 10 | 12 | 13 |
|---|---|---|---|---|---|
| k = | −9.5060E+01 | 2.0621E+01 | 1.0567E+01 | −5.0554E+00 | −5.3827E+01 |
| A4 = | 1.1984E−01 | −1.3972E−01 | −1.5914E−01 | −1.6639E−01 | −2.1179E−01 |
| A6 = | −1.7474E−01 | 2.0293E−01 | 2.9082E−01 | 2.9264E−01 | 2.5304E−01 |
| A8 = | 1.2748E−01 | −2.3805E−01 | −3.6289E−01 | −2.6696E−01 | −2.0419E−01 |
| A10 = | −5.3469E−02 | 4.2313E−02 | 2.3676E−01 | 1.3474E−01 | 1.1151E−01 |
| A12 = | 8.7299E−03 | 9.9088E−02 | −8.7899E−02 | −3.7707E−02 | −4.3201E−02 |
| A14 = | | −7.9220E−02 | 1.9887E−02 | 4.8941E−03 | 1.1866E−02 |
| A16 = | | 2.3956E−02 | −2.6595E−03 | 1.4760E−04 | −2.2340E−03 |
| A18 = | | −2.6424E−03 | 1.6232E−04 | −1.3768E−04 | 2.7076E−04 |
| A20 = | | | | 1.7050E−05 | −1.8827E−05 |
| A22 = | | | | −7.2023E−07 | 5.6585E−07 |

In the 8th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in the table below.

| 8th Embodiment | | | |
|---|---|---|---|
| f [mm] | 10.50 | (R5 + R6)/(R5 − R6) | 0.82 |
| Fno. | 2.05 | f/f3 | −1.51 |
| HFOV [deg.] | 13.4 | f/f4 | −0.02 |
| Nmax | 1.686 | f/f5 | −0.43 |
| Vdmin | 18.4 | (|f/f4| + |f/f5|)/|f/f3| | 0.29 |
| (Vi/Ni)min | 10.9 | ImgH/f | 0.24 |
| V4 + V5 | 36.8 | EPD/ImgH | 2.05 |
| CT4/CT1 | 0.17 | tan(FOV) | 0.51 |
| CT5/ET5 | 2.34 | f/EPD | 2.05 |
| (CT4 + T45)/CT5 | 1.12 | TL/f | 0.83 |
| (CT2 + CT3 + CT4)/T23 | 0.46 | SL/TL | 0.85 |
| T23/(T12 + T34 + T45) | 1.68 | BL/TD | 0.11 |
| (CT1 + T23)/BL | 5.11 | Y11/Y31 | 1.97 |
| (R2 + R3)/(R2 − R3) | −0.28 | Y11/Y52 | 1.15 |

9th Embodiment

Figure 9A:
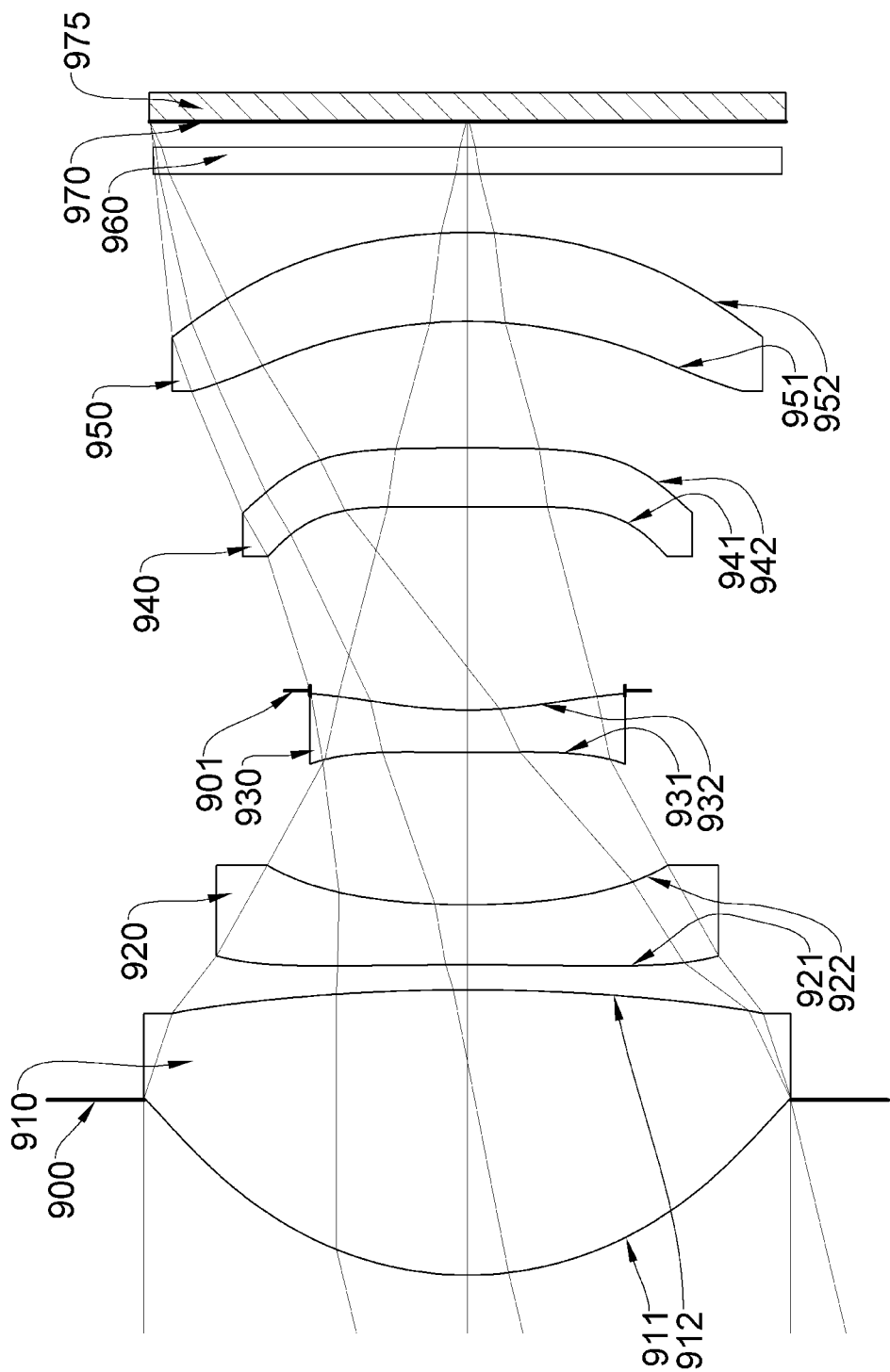
FIG. 9A is a schematic view of an imaging apparatus according to the 9th embodiment of the present disclosure.
Figure 9B:
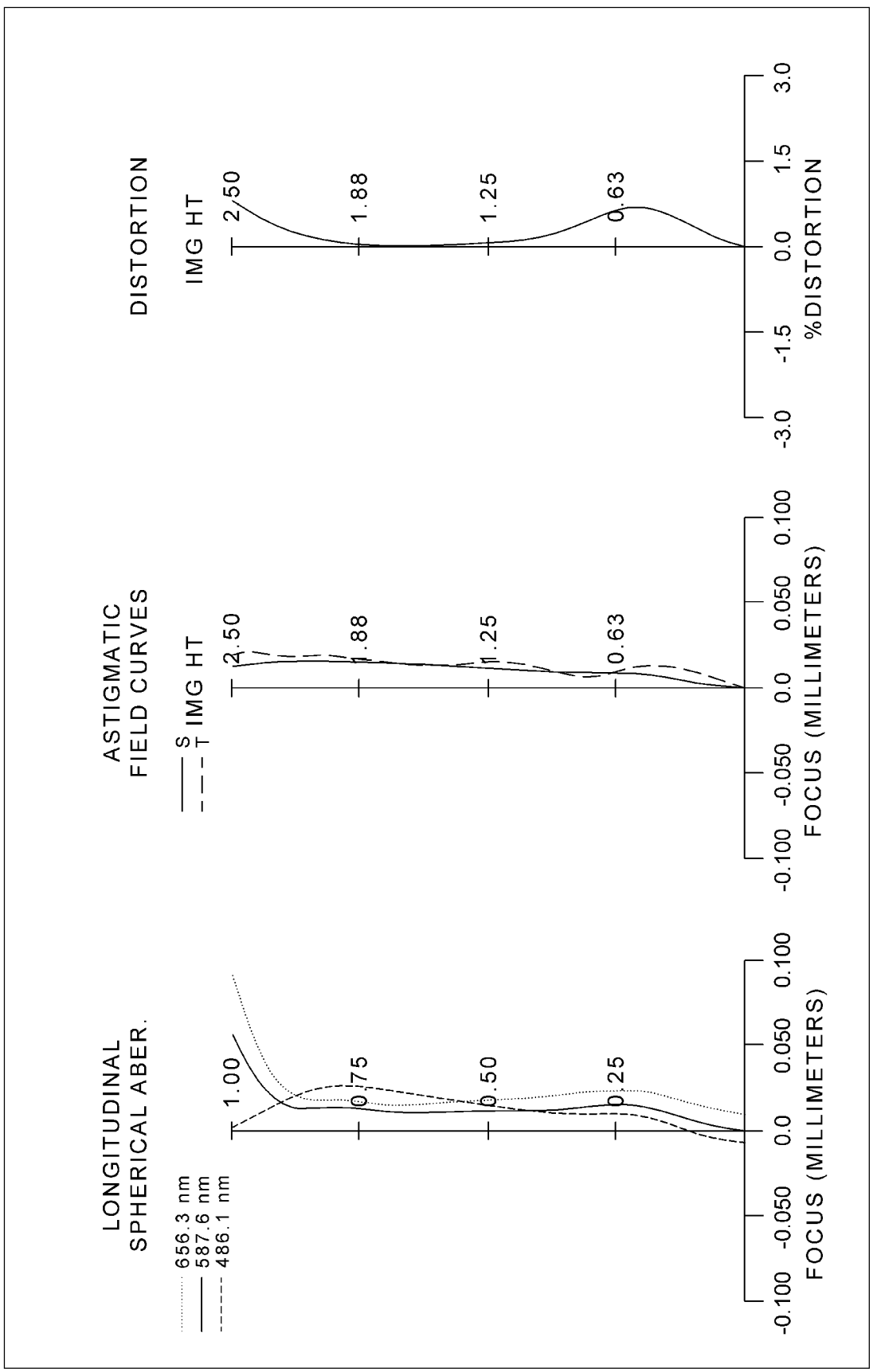
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an imaging optical lens assembly (not otherwise herein labeled) of the present disclosure and an image sensor 975. The imaging optical lens assembly includes, in order from an object side to an image side along an optical path, an aperture stop 900, a first lens element 910, a second lens element 920, a third lens element 930, a stop 901, a fourth lens element 940, a fifth lens element 950, a filter 960, and an image surface 970. The image sensor 975 is disposed on or near the image surface 970. There is an air gap between each of adjacent lens elements of the first lens element 910, the second lens element 920, the third lens element 930, the fourth lens element 940, and the fifth lens element 950, and there is no additional lens element inserted between the five lens elements.

The first lens element 910 has positive refractive power and is made of plastic material. The first lens element 910 has an object-side surface 911 being convex in a paraxial region thereof, and an image-side surface 912 being convex in a paraxial region thereof. Both the object-side surface 911 and the image-side surface 912 are aspheric, and there is one inflection point on the object-side surface 911.

The second lens element 920 has negative refractive power and is made of plastic material. The second lens element 920 has an object-side surface 921 being concave in a paraxial region thereof, and an image-side surface 922 being concave in a paraxial region thereof. Both the object-side surface 921 and the image-side surface 922 are aspheric, and there is one inflection point on the object-side surface 921.

The third lens element 930 has negative refractive power and is made of plastic material. The third lens element 930 has an object-side surface 931 being convex in a paraxial region thereof, and an image-side surface 932 being concave in a paraxial region thereof. Both the object-side surface 931 and the image-side surface 932 are aspheric, and there are one inflection point on the object-side surface 931 and one inflection point on the image-side surface 932.

The fourth lens element 940 has positive refractive power and is made of plastic material. The fourth lens element 940 has an object-side surface 941 being convex in a paraxial region thereof, and an image-side surface 942 being convex in a paraxial region thereof. Both the object-side surface 941 and the image-side surface 942 are aspheric, and there are two inflection points on the object-side surface 941 and one inflection point on the image-side surface 942.

The fifth lens element 950 has positive refractive power and is made of plastic material. The fifth lens element 950 has an object-side surface 951 being concave in a paraxial region thereof, and an image-side surface 952 being convex in a paraxial region thereof. Both the object-side surface 951 and the image-side surface 952 are aspheric, and there are one inflection point on the object-side surface 951 and one inflection point on the image-side surface 952.

The filter 960 is disposed between the fifth lens element 950 and the image surface 970. The filter 960 is made of glass material and does not affect the focal length of the imaging optical lens assembly.

The detailed optical data of the 9th embodiment are shown in TABLE 17, and the aspheric surface data are shown in TABLE 18.

In the 9th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in the table below.

TABLE 17

(9th Embodiment)
f = 10.43 mm, Fno = 2.05, HFOV = 13.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.380 | | | | |
| 2 | Lens 1 | 2.706 | ASP | 2.248 | Plastic | 1.545 | 56.1 | 4.43 |
| 3 | | −15.670 | ASP | 0.197 | | | | |
| 4 | Lens 2 | −38.348 | ASP | 0.474 | Plastic | 1.686 | 18.4 | −7.72 |
| 5 | | 6.180 | ASP | 1.200 | | | | |
| 6 | Lens 3 | 18.044 | ASP | 0.335 | Plastic | 1.544 | 56.1 | −7.24 |
| 7 | | 3.212 | ASP | 0.152 | | | | |
| 8 | Stop | Plano | | 1.448 | | | | |
| 9 | Lens 4 | 24.204 | ASP | 0.464 | Plastic | 1.686 | 18.4 | 24.02 |
| 10 | | −51.217 | ASP | 1.000 | | | | |
| 11 | Lens 5 | −3.444 | ASP | 0.700 | Plastic | 1.685 | 18.5 | 365.90 |
| 12 | | −3.678 | ASP | 0.462 | | | | |
| 13 | Filter | Plano | | 0.210 | Glass | 1.517 | 64.2 | — |
| 14 | | Plano | | 0.202 | | | | |
| 15 | Image Surface | Plano | | — | | | | |

Remark: Reference wavelength is d-line 587.6 nm.
* The effective radius of Surface 8 (Stop) is 1.240 mm

TABLE 18

Aspheric Coefficient

| Surface # | 2 | 3 | 4 | 5 | 6 |
|---|---|---|---|---|---|
| k = | −3.2982E−01 | 0.0000E+00 | 0.0000E+00 | −9.8320E+00 | 0.0000E+00 |
| A4 = | 3.2184E−04 | 1.5520E−03 | 8.4669E−03 | 2.0445E−02 | −6.5490E−02 |
| A6 = | 6.7936E−04 | −3.2084E−03 | −5.6377E−03 | −2.8924E−03 | 1.7425E−02 |
| A8 = | −6.1405E−04 | 2.2330E−03 | 3.2651E−03 | 4.9591E−04 | −1.7279E−02 |
| A10 = | 3.1606E−04 | −7.6741E−04 | −3.0453E−04 | 2.3800E−03 | 1.7023E−02 |
| A12 = | −9.8047E−05 | 1.4249E−04 | −3.5147E−04 | −1.8439E−03 | −1.1942E−02 |
| A14 = | 1.7617E−05 | −1.3984E−05 | 1.5656E−04 | 5.9863E−04 | 4.1770E−03 |
| A16 = | −1.7278E−06 | 5.7138E−07 | −2.6298E−05 | −7.4850E−05 | −6.0322E−04 |
| A18 = | 6.8828E−08 | | 1.6485E−06 | | |

| Surface # | 7 | 9 | 10 | 11 | 12 |
|---|---|---|---|---|---|
| k = | 3.9195E+00 | 0.0000E+00 | 0.0000E+00 | −1.0000E+00 | 0.0000E+00 |
| A4 = | −8.0424E−02 | −3.2199E−02 | −1.2035E−02 | 5.9172E−02 | 8.5802E−02 |
| A6 = | 2.4188E−03 | −5.1404E−02 | −9.1195E−02 | −1.4002E−01 | −2.2497E−01 |
| A8 = | 2.8651E−02 | 7.6578E−02 | 1.5947E−01 | 1.9000E−01 | 3.1712E−01 |
| A10 = | −6.8531E−02 | −9.0623E−02 | −1.8945E−01 | −1.5750E−01 | −2.9148E−01 |
| A12 = | 8.0842E−02 | 6.6410E−02 | 1.4628E−01 | 8.3698E−02 | 1.8832E−01 |
| A14 = | −5.6247E−02 | −3.1225E−02 | −7.4772E−02 | −2.9603E−02 | −8.8490E−02 |
| A16 = | 2.1027E−02 | 9.1648E−03 | 2.5210E−02 | 7.1058E−03 | 3.0549E−02 |
| A18 = | −3.3171E−03 | −1.5077E−03 | −5.3898E−03 | −1.1509E−03 | −7.7146E−03 |
| A20 = | | 1.0736E−04 | 6.6270E−04 | 1.2082E−04 | 1.4030E−03 |
| A22 = | | | −3.5686E−05 | −7.4314E−06 | −1.7835E−04 |
| A24 = | | | | 2.0314E−07 | 1.5006E−05 |
| A26 = | | | | | −7.4933E−07 |
| A28 = | | | | | 1.6787E−08 |

| 9th Embodiment | | | |
|---|---|---|---|
| f [mm] | 10.43 | (R5 + R6)/(R5 − R6) | 1.43 |
| Fno. | 2.05 | f/f3 | −1.44 |
| HFOV [deg.] | 13.3 | f/f4 | 0.43 |
| Nmax | 1.686 | f/f5 | 0.03 |
| Vdmin | 18.4 | (|f/f4| + |f/f5|)/|f/f3| | 0.32 |
| (Vi/Ni)min | 10.9 | ImgH/f | 0.24 |
| V4 + V5 | 36.9 | EPD/ImgH | 2.04 |
| CT4/CT1 | 0.21 | tan(FOV) | 0.50 |
| CT5/ET5 | 1.64 | f/EPD | 2.05 |
| (CT4 + T45)/CT5 | 2.09 | TL/f | 0.87 |
| (CT2 + CT3 + CT4)/T23 | 1.06 | SL/TL | 0.85 |
| T23/(T12 + T34 + T45) | 0.43 | BL/TD | 0.11 |
| (CT1 + T23)/BL | 3.95 | Y11/Y31 | 2.05 |
| (R2 + R3)/(R2 − R3) | −2.38 | Y11/Y52 | 1.10 |

10th Embodiment

Figure 10A:
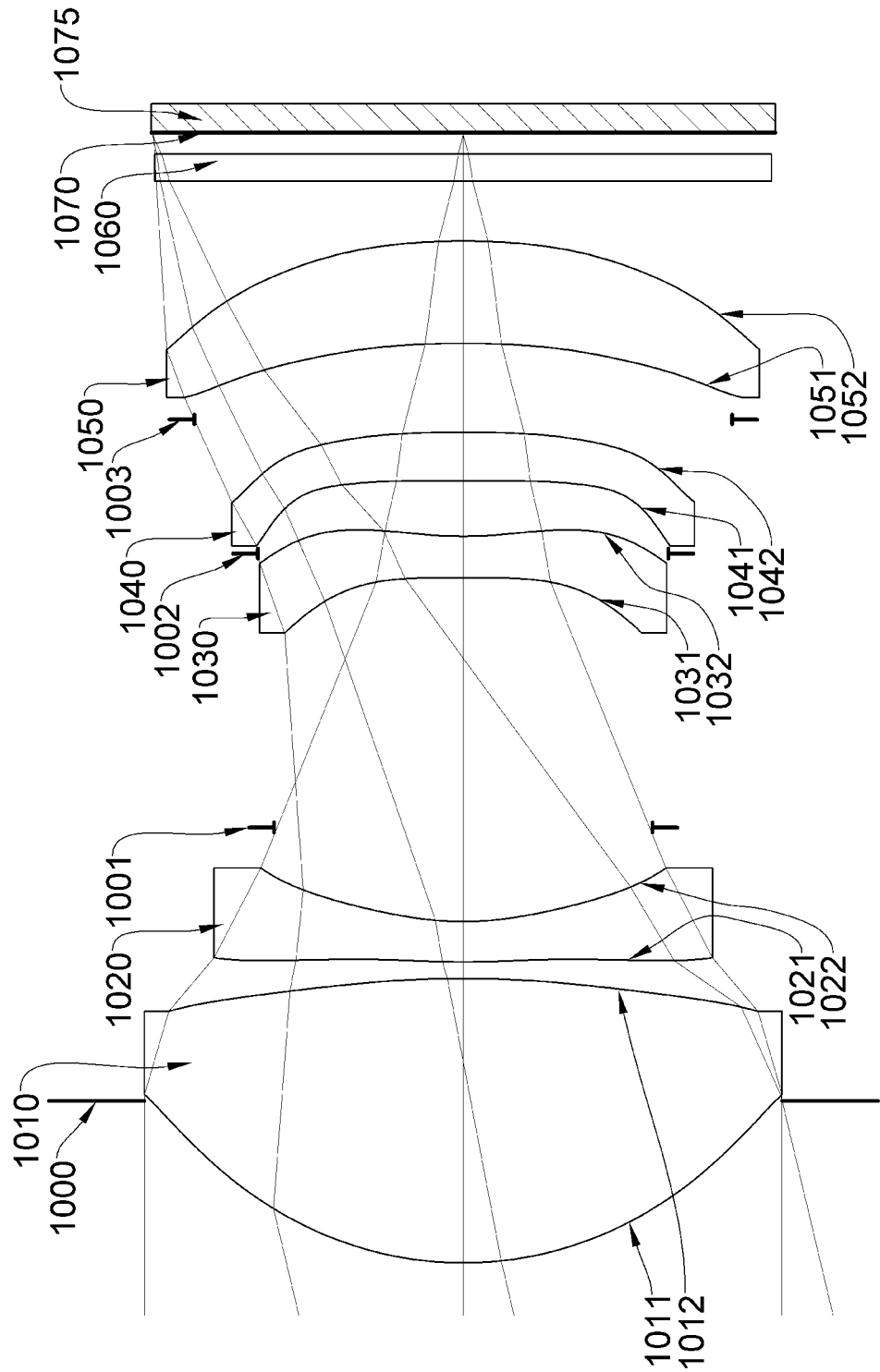
FIG. 10A is a schematic view of an imaging apparatus according to the 10th embodiment of the present disclosure.
Figure 10B:
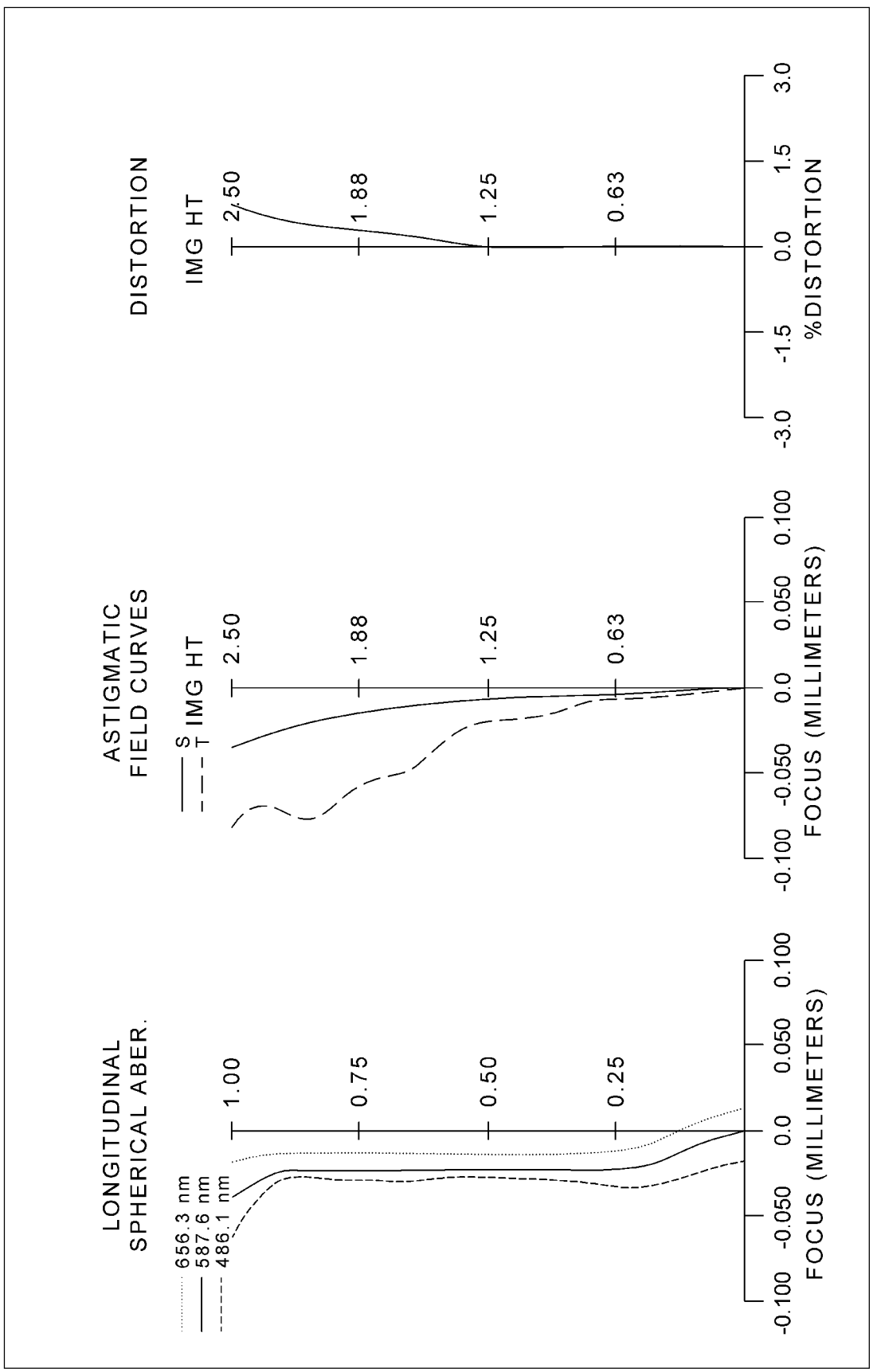
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an imaging optical lens assembly (not otherwise herein labeled) of the present disclosure and an image sensor 1075. The imaging optical lens assembly includes, in order from an object side to an image side along an optical path, an aperture stop 1000, a first lens element 1010, a second lens element 1020, a first stop 1001, a third lens element 1030, a second stop 1002, a fourth lens element 1040, a third stop 1003, a fifth lens element 1050, a filter 1060, and an image surface 1070. There is an air gap between each of adjacent lens elements of the first lens element 1010, the second lens element 1020, the third lens element 1030, the fourth lens element 1040, and the fifth lens element 1050, and there is no additional lens element inserted between the five lens elements.

The first lens element 1010 has positive refractive power and is made of plastic material. The first lens element 1010 has an object-side surface 1011 being convex in a paraxial region thereof, and an image-side surface 1012 being convex in a paraxial region thereof. Both the object-side surface 1011 and the image-side surface 1012 are aspheric, and there is one inflection point on the object-side surface 1011.

The second lens element 1020 has negative refractive power and is made of plastic material. The second lens element 1020 has an object-side surface 1021 being convex in a paraxial region thereof, and an image-side surface 1022 being concave in a paraxial region thereof. Both the object-side surface 1021 and the image-side surface 1022 are aspheric, and there are two inflection points on the object-side surface 1021.

The third lens element 1030 has negative refractive power and is made of plastic material. The third lens element 1030 has an object-side surface 1031 being convex in a paraxial region thereof, and an image-side surface 1032 being concave in a paraxial region thereof. Both the object-side surface 1031 and the image-side surface 1032 are aspheric, and there are one inflection point on the object-side surface 1031 and two inflection points and one critical point on the image-side surface 1032.

The fourth lens element 1040 has positive refractive power and is made of plastic material. The fourth lens element 1040 has an object-side surface 1041 being convex in a paraxial region thereof, and an image-side surface 1042 being convex in a paraxial region thereof. Both the object-side surface 1041 and the image-side surface 1042 are aspheric, and there are two inflection points on the object-side surface 1041, and there is one inflection point on the image-side surface 1042.

The fifth lens element 1050 has positive refractive power and is made of plastic material. The fifth lens element 1050 has an object-side surface 1051 being concave in a paraxial region thereof, and an image-side surface 1052 being convex in a paraxial region thereof. Both the object-side surface 1051 and the image-side surface 1052 are aspheric, and there are one inflection point on the object-side surface 1051 and one inflection point on the image-side surface 1052.

The filter 1060 is disposed between the fifth lens element 1050 and the image surface 1070. The filter 1060 is made of glass material and does not affect the focal length of the imaging optical lens assembly.

The detailed optical data of the 10th embodiment are shown in TABLE 19, and the aspheric surface data are shown in TABLE 20.

TABLE 19

(10th Embodiment)
f = 10.50 mm, Fno = 2.05, HFOV = 13.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.301 | | | | |
| 2 | Lens 1 | 2.841 | ASP | 2.286 | Plastic | 1.545 | 56.1 | 4.31 |
| 3 | | −9.719 | ASP | 0.134 | | | | |
| 4 | Lens 2 | 6.613 | ASP | 0.325 | Plastic | 1.642 | 22.4 | −5.85 |
| 5 | | 2.349 | ASP | 0.758 | | | | |
| 6 | Stop 1 | Plano | | 2.007 | | | | |
| 7 | Lens 3 | 100.000 | ASP | 0.335 | Plastic | 1.544 | 56.0 | −5.70 |
| 8 | | 3.003 | ASP | −0.140 | | | | |
| 9 | Stop 2 | Plano | | 0.584 | | | | |
| 10 | Lens 4 | 73.198 | ASP | 0.392 | Plastic | 1.686 | 18.4 | 16.86 |
| 11 | | −13.710 | ASP | 0.104 | | | | |
| 12 | Stop 3 | Plano | | 0.611 | | | | |
| 13 | Lens 5 | −7.768 | ASP | 0.823 | Plastic | 1.686 | 18.4 | 21.28 |
| 14 | | −5.289 | ASP | 0.481 | | | | |
| 15 | Filter | Plano | | 0.218 | Glass | 1.517 | 64.2 | — |

TABLE 19-continued (10th Embodiment)
f = 10.50 mm, Fno = 2.05, HFOV = 13.3 deg.

| Surface # | | Curvature Radius | Thickness | Material | Index | Abbe # | Focal Length |
|---|---|---|---|---|---|---|---|
| 16 | | Plano | 0.173 | | | | |
| 17 | Image Surface | Plano | — | | | | |

Remark: Reference wavelength is d-line 587.6 nm.
* The effective radius of Surface 6 (Stop 1) is 1.520 mm
* The effective radius of Surface 9 (Stop 2) is 1.649 mm
* The effective radius of Surface 12 (Stop 3) is 2.160 mm

TABLE 20

Aspheric Coefficient

| Surface # | 2 | 3 | 4 | 5 | 7 |
|---|---|---|---|---|---|
| k = | −3.4705E−01 | 0.0000E+00 | 0.0000E+00 | −1.3580E+01 | 0.0000E+00 |
| A4 = | 1.1219E−03 | −1.5975E−02 | −1.0150E−01 | 2.1928E−02 | −1.6598E−01 |
| A6 = | 2.7123E−04 | 1.9019E−02 | 6.4642E−02 | −4.0732E−02 | 1.1501E−02 |
| A8 = | −3.3175E−04 | −9.1865E−03 | −2.1809E−02 | 5.6988E−02 | 8.3489E−02 |
| A10 = | 1.8953E−04 | 2.5298E−03 | 1.7202E−03 | −4.0654E−02 | −1.1612E−01 |
| A12 = | −5.4833E−05 | −4.0994E−04 | 1.5465E−03 | 1.6469E−02 | 7.3238E−02 |
| A14 = | 8.2699E−06 | 3.6032E−05 | −6.1000E−04 | −3.5277E−03 | −2.2225E−02 |
| A16 = | −6.0468E−07 | −1.3314E−06 | 9.2848E−05 | 3.1412E−04 | 2.6326E−03 |
| A18 = | 1.2908E−08 | | −5.3063E−06 | | |

| Surface # | 8 | 10 | 11 | 13 | 14 |
|---|---|---|---|---|---|
| k = | −8.37036E+00 | 0.00000E+00 | 0.00000E+00 | 0.00000E+00 | −7.20796E+00 |
| A4 = | −1.2640E−01 | −2.7613E−02 | −2.7012E−02 | 4.7034E−03 | −5.4606E−03 |
| A6 = | −8.1124E−03 | −5.9678E−02 | −3.8069E−02 | −4.5694E−02 | −2.1997E−02 |
| A8 = | 1.2088E−01 | 3.9053E−02 | −1.5456E−03 | 3.0980E−02 | 9.6779E−03 |
| A10 = | −1.4272E−01 | 9.1963E−02 | 1.2153E−01 | 9.2244E−03 | 3.6755E−03 |
| A12 = | 7.8430E−02 | −1.6172E−01 | −1.6026E−01 | −2.1556E−02 | −4.7279E−03 |
| A14 = | −2.2330E−02 | 1.0814E−01 | 9.9219E−02 | 1.2571E−02 | 1.8841E−03 |
| A16 = | 3.0647E−03 | −3.7993E−02 | −3.5080E−02 | −3.9991E−03 | −4.0193E−04 |
| A18 = | −1.4343E−04 | 6.9873E−03 | 7.2782E−03 | 7.7680E−04 | 4.9165E−05 |
| A20 = | | −5.2724E−04 | −8.2503E−04 | −9.2288E−05 | −3.2532E−06 |
| A22 = | | | 3.9418E−05 | 6.1905E−06 | 9.0465E−08 |
| A24 = | | | | −1.8028E−07 | |

In the 10th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in the table below.

| 10th Embodiment | | | |
|---|---|---|---|
| f [mm] | 10.50 | (R5 + R6)/(R5 − R6) | 1.06 |
| Fno. | 2.05 | f/f3 | −1.84 |
| HFOV [deg.] | 13.3 | f/f4 | 0.62 |
| Nmax | 1.686 | f/f5 | 0.49 |
| Vdmin | 18.4 | (|f/f4| + |f/f5|)/|f/f3| | 0.61 |
| (Vi/Ni)min | 10.9 | ImgH/f | 0.24 |
| V4 + V5 | 36.8 | EPD/ImgH | 2.05 |
| CT4/CT1 | 0.17 | tan(FOV) | 0.50 |
| CT5/ET5 | 2.13 | f/EPD | 2.05 |
| (CT4 + T45)/CT5 | 1.34 | TL/f | 0.87 |
| (CT2 + CT3 + CT4)/T23 | 0.38 | SL/TL | 0.86 |
| T23/(T12 + T34 + T45) | 2.14 | BL/TD | 0.11 |
| (CT1 + T23)/BL | 5.79 | Y11/Y31 | 1.79 |
| (R2 + R3)/(R2 − R3) | 0.19 | Y11/Y52 | 1.08 |

11th Embodiment

Figure 11A:
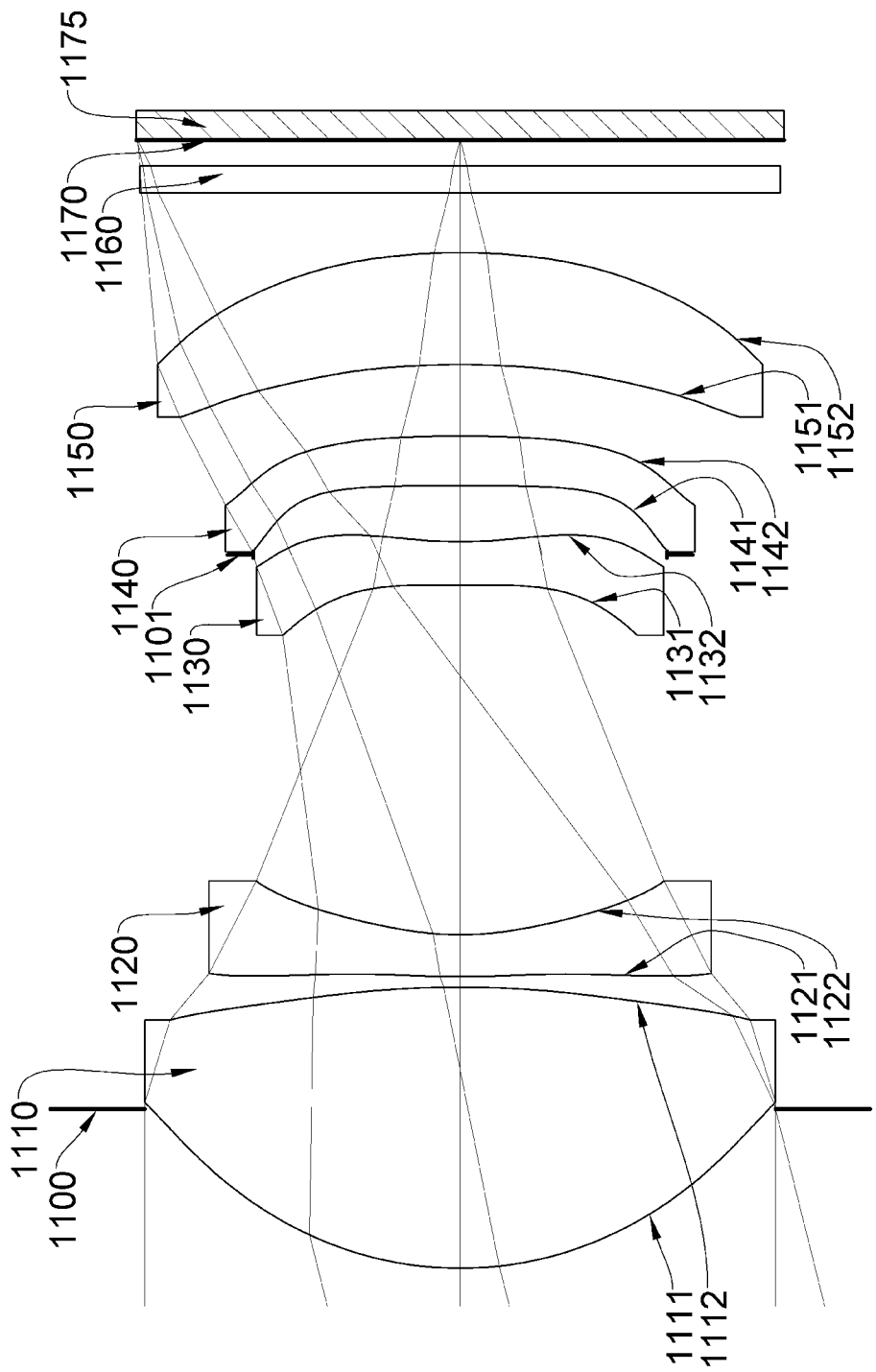
FIG. 11A is a schematic view of an imaging apparatus according to the 11th embodiment of the present disclosure.
Figure 11B:
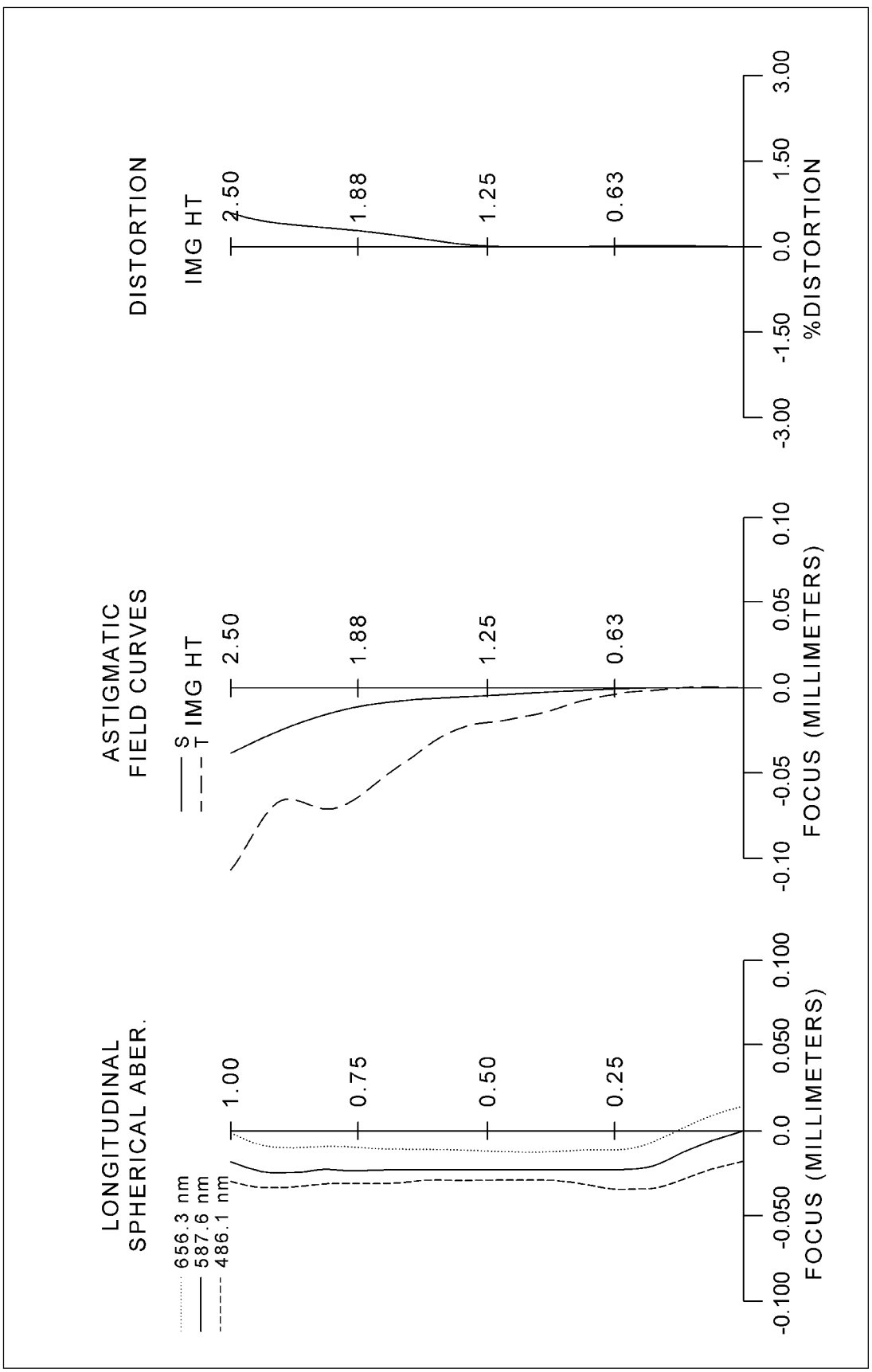
FIG. 11B shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B shows, in order from left to right, longitudinal spherical aberration curves, astigmatic field curves and a distortion curve of the imaging apparatus according to the 11th embodiment.

In FIG. 11A, the imaging apparatus includes an imaging optical lens assembly (not otherwise herein labeled) of the present disclosure and an image sensor 1175. The imaging optical lens assembly includes, in order from an object side to an image side along an optical path, an aperture stop 1100, a first lens element 1110, a second lens element 1120, a third lens element 1130, a stop 1101, a fourth lens element 1140, a fifth lens element 1150, a filter 1160, and an image surface 1170. There is an air gap between each of adjacent lens elements of the first lens element 1110, the second lens element 1120, the third lens element 1130, the fourth lens element 1140, and the fifth lens element 1150, and there is no additional lens element inserted between the five lens elements.

The first lens element 1110 has positive refractive power and is made of plastic material. The first lens element 1110 has an object-side surface 1111 being convex in a paraxial region thereof, and an image-side surface 1112 being convex in a paraxial region thereof. Both the object-side surface 1111 and the image-side surface 1112 are aspheric, and there is one inflection point on the object-side surface 1111.

The second lens element 1120 has negative refractive power and is made of plastic material. The second lens element 1120 has an object-side surface 1121 being convex in a paraxial region thereof, and an image-side surface 1122 being concave in a paraxial region thereof. Both the object-side surface 1121 and the image-side surface 1122 are aspheric, and there are two inflection points on the object-side surface 1121.

The third lens element 1130 has negative refractive power and is made of plastic material. The third lens element 1130 has an object-side surface 1131 being convex in a paraxial region thereof, and an image-side surface 1132 being concave in a paraxial region thereof. Both the object-side surface 1131 and the image-side surface 1132 are aspheric, and there are one inflection point on the object-side surface 1131 and two inflection points on the image-side surface 1132.

The fourth lens element 1140 has positive refractive power and is made of plastic material. The fourth lens element 1140 has an object-side surface 1141 being concave in a paraxial region thereof, and an image-side surface 1142 being convex in a paraxial region thereof. Both the object-side surface 1141 and the image-side surface 1142 are aspheric, and there are one inflection point on the object-side surface 1141 and one inflection point on the image-side surface 1142.

The fifth lens element 1150 has positive refractive power and is made of plastic material. The fifth lens element 1150 has an object-side surface 1151 being concave in a paraxial region thereof, and an image-side surface 1152 being convex in a paraxial region thereof. Both the object-side surface 1151 and the image-side surface 1152 are aspheric, and there are one inflection point on the object-side surface 1151 and one inflection point on the image-side surface 1152.

The filter 1160 is disposed between the fifth lens element 1150 and the image surface 1170. The filter 1160 is made of glass material and does not affect the focal length of the imaging optical lens assembly.

The detailed optical data of the 11th embodiment are shown in TABLE 21, and the aspheric surface data are shown in TABLE 22.

TABLE 21

(11th Embodiment)
f = 10.01 mm, Fno = 2.05, HFOV = 14.0 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | Infinity  |          |       |        |              |
| 1         | Ape. Stop | Plano            |     | −1.233    |          |       |        |              |
| 2         | Lens 1    | 2.742            | ASP | 2.177     | Plastic  | 1.545 | 56.1   | 4.08         |
| 3         |           | −8.454           | ASP | 0.081     |          |       |        |              |
| 4         | Lens 2    | 6.428            | ASP | 0.325     | Plastic  | 1.639 | 23.5   | −5.59        |
| 5         |           | 2.251            | ASP | 2.710     |          |       |        |              |
| 6         | Lens 3    | 100.000          | ASP | 0.335     | Plastic  | 1.544 | 56.0   | −6.07        |
| 7         |           | 3.192            | ASP | −0.100    |          |       |        |              |
| 8         | Stop      | Plano            |     | 0.533     |          |       |        |              |
| 9         | Lens 4    | −38.562          | ASP | 0.385     | Plastic  | 1.686 | 18.4   | 20.52        |
| 10        |           | −10.353          | ASP | 0.554     |          |       |        |              |
| 11        | Lens 5    | −6.544           | ASP | 0.867     | Plastic  | 1.686 | 18.4   | 24.89        |
| 12        |           | −4.986           | ASP | 0.462     |          |       |        |              |
| 13        | Filter    | Plano            |     | 0.210     | Glass    | 1.517 | 64.2   | —            |
| 14        |           | Plano            |     | 0.200     |          |       |        |              |
| 15        | Image Surface | Plano        |     | —         |          |       |        |              |

Remark: Reference wavelength is d-line 587.6 nm.
* The effective radius of Surface 8 (Stop) is 1.600 mm

TABLE 22

Aspheric Coefficient

| Surface # | 2 | 3 | 4 | 5 | 6 |
|-----------|---|---|---|---|---|
| k =  | −3.3407E−01 | 0.0000E+00  | 0.0000E+00  | −1.3133E+01 | 0.0000E+00  |
| A4 = | 1.5038E−03  | −1.6900E−02 | −1.0682E−01 | 2.8290E−02  | −1.4612E−01 |
| A6 = | 1.7118E−04  | 2.1152E−02  | 6.3344E−02  | −5.8219E−02 | −2.9212E−02 |
| A8 = | −2.9774E−04 | −1.0271E−02 | −1.7224E−02 | 7.8290E−02  | 1.2786E−01  |
| A10 = | 1.8596E−04 | 2.8565E−03  | −1.2209E−02 | −5.4822E−02 | −1.4900E−01 |
| A12 = | −5.5815E−05 | −4.6992E−04 | 2.5024E−03 | 2.2060E−02  | 8.8353E−02  |
| A14 = | 8.3883E−06 | 4.1948E−05  | −7.8115E−04 | −4.7505E−03 | −2.6064E−02 |
| A16 = | −5.5472E−07 | −1.5726E−06 | 1.0837E−04 | 4.2947E−04  | 3.0544E−03  |
| A18 = | 2.9901E−09 |             | −5.8104E−06 |             |             |

| Surface # | 7 | 9 | 10 | 11 | 12 |
|-----------|---|---|----|----|----|
| k =  | −4.9052E+00 | 0.0000E+00  | 0.0000E+00  | 0.0000E+00  | −8.0187E+00 |
| A4 = | −9.2295E−02 | 3.4977E−02  | 3.4727E−02  | 2.4611E−02  | −8.3579E−03 |
| A6 = | −1.1457E−01 | −1.5835E−01 | −1.4132E−01 | −6.0725E−02 | −1.2688E−02 |
| A8 = | 2.8240E−01  | 9.3504E−02  | 8.8863E−02  | 3.0701E−02  | 1.6572E−03  |
| A10 = | −3.0723E−01 | 1.1812E−01 | 6.7610E−02  | 1.9841E−02  | 6.0838E−03  |
| A12 = | 1.8518E−01 | −2.4043E−01 | −1.3984E−01 | −3.1527E−02 | −4.4759E−03 |

TABLE 22-continued

Aspheric Coefficient

| A14 = | −6.4170E−02 | 1.7626E−01 | 9.5851E−02 | 1.7611E−02 | 1.5138E−03 |
| --- | --- | --- | --- | --- | --- |
| A16 = | 1.2029E−02 | −6.9074E−02 | −3.5733E−02 | −5.5953E−03 | −2.9216E−04 |
| A18 = | −9.3972E−04 | 1.4495E−02 | 7.7121E−03 | 1.0997E−03 | 3.2879E−05 |
| A20 = | | −1.2749E−03 | −9.0241E−04 | −1.3268E−04 | −1.9953E−06 |
| A22 = | | | 4.4031E−05 | 9.0315E−06 | 5.0087E−08 |
| A24 = | | | | −2.6618E−07 | |

In the 11th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 11th embodiment, so an explanation in this regard will not be provided again.

Moreover, these parameters can be calculated from TABLE 21 and TABLE 22 and satisfy the conditions stated in the table below.

| 11th Embodiment | | | |
| --- | --- | --- | --- |
| f [mm] | 10.01 | (R5 + R6)/(R5 − R6) | 1.07 |
| Fno. | 2.05 | f/f3 | −1.65 |
| HFOV [deg.] | 14.0 | f/f4 | 0.49 |
| Nmax | 1.686 | f/f5 | 0.40 |
| Vdmin | 18.4 | (|f/f4| + |f/f5|)/|f/f3| | 0.54 |
| (Vi/Ni)min | 10.9 | ImgH/f | 0.25 |
| V4 + V5 | 36.8 | EPD/ImgH | 1.95 |
| CT4/CT1 | 0.18 | tan(FOV) | 0.53 |
| CT5/ET5 | 2.12 | f/EPD | 2.05 |
| (CT4 + T45)/CT5 | 1.08 | TL/f | 0.87 |
| (CT2 + CT3 + CT4)/T23 | 0.39 | SL/TL | 0.86 |
| T23/(T12 + T34 + T45) | 2.54 | BL/TD | 0.11 |
| (CT1 + T23)/BL | 5.60 | Y11/Y31 | 1.78 |
| (R2 + R3)/(R2 − R3) | 0.14 | Y11/Y52 | 1.04 |

12th Embodiment

Figure 12A:
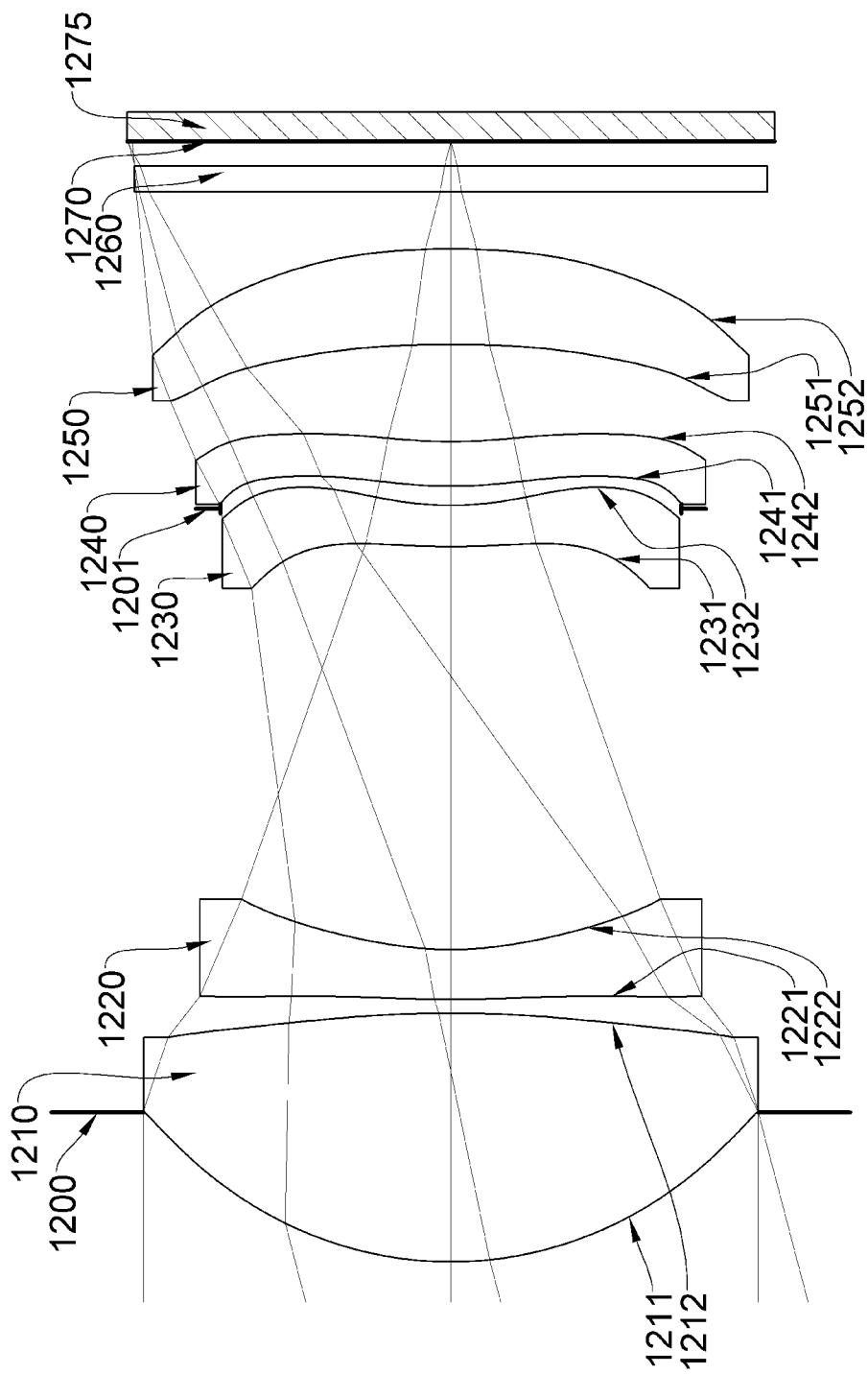
FIG. 12A is a schematic view of an imaging apparatus according to the 12th embodiment of the present disclosure.
Figure 12B:
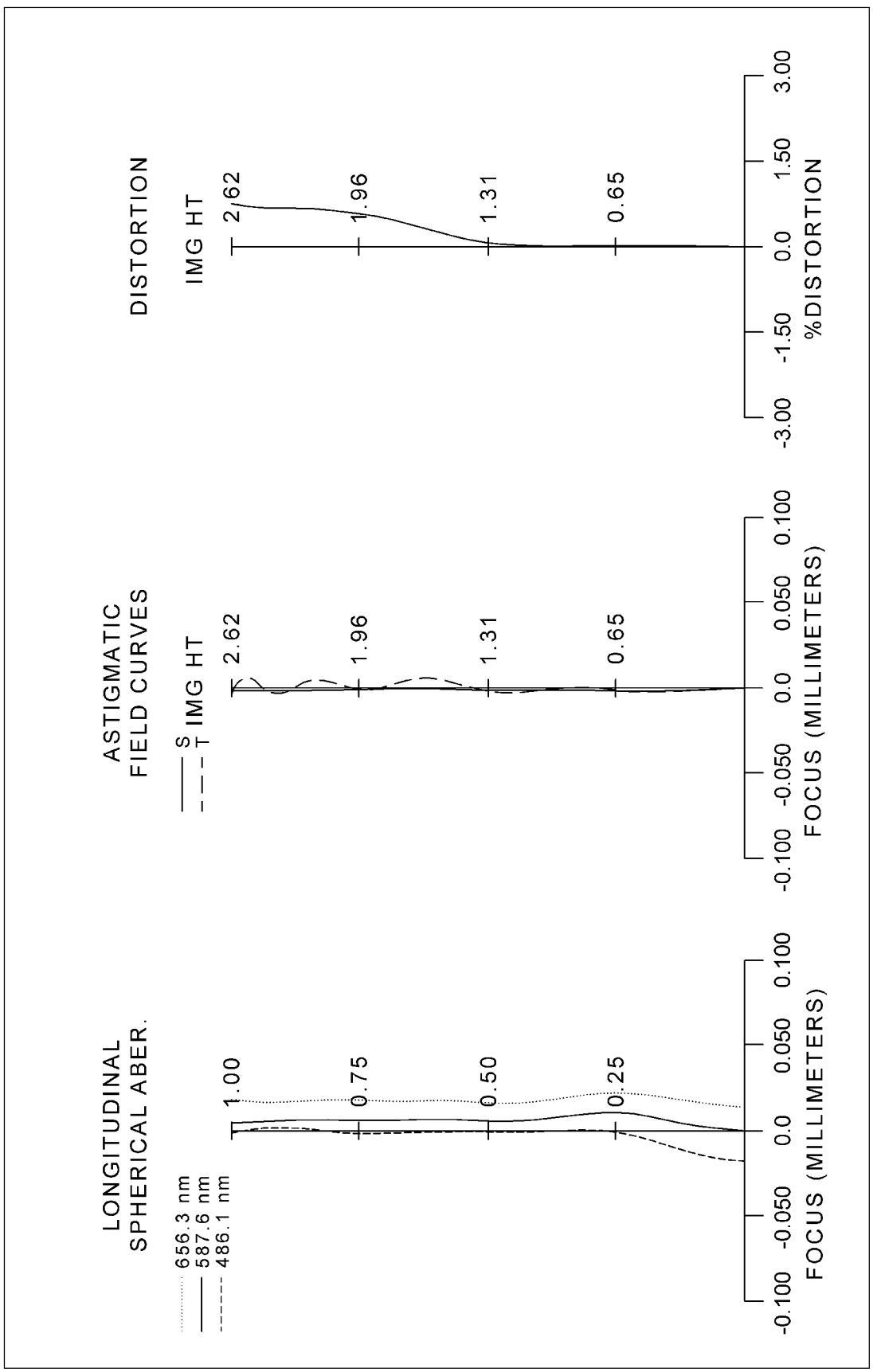
FIG. 12B shows longitudinal spherical aberration curves, astigmatic field curves and a distortion curve of the imaging apparatus according to the 12th embodiment.

FIG. 12A is a schematic view of an imaging apparatus according to the 12th embodiment of the present disclosure. FIG. 12B shows, in order from left to right, longitudinal spherical aberration curves, astigmatic field curves and a distortion curve of the imaging apparatus according to the 12th embodiment.

In FIG. 12A, the imaging apparatus includes an imaging optical lens assembly (not otherwise herein labeled) of the present disclosure and an image sensor 1275. The imaging optical lens assembly includes, in order from an object side to an image side along an optical path, an aperture stop 1200, a first lens element 1210, a second lens element 1220, a third lens element 1230, a stop 1201, a fourth lens element 1240, a fifth lens element 1250, a filter 1260, and an image surface 1270. The image sensor 1275 is disposed on or near the image surface 1270. There is an air gap between each of adjacent lens elements of the first lens element 1210, the second lens element 1220, the third lens element 1230, the fourth lens element 1240, and the fifth lens element 1250, and there is no additional lens element inserted between the five lens elements.

The first lens element 1210 has positive refractive power and is made of plastic material. The first lens element 1210 has an object-side surface 1211 being convex in a paraxial region thereof, and an image-side surface 1212 being convex in a paraxial region thereof. Both the object-side surface 1211 and the image-side surface 1212 are aspheric, and there is one inflection point on the object-side surface 1211.

The second lens element 1220 has negative refractive power and is made of plastic material. The second lens element 1220 has an object-side surface 1221 being convex in a paraxial region thereof, and an image-side surface 1222 being concave in a paraxial region thereof. Both the object-side surface 1221 and the image-side surface 1222 are aspheric, and there are two inflection points on the object-side surface 1221.

The third lens element 1230 has negative refractive power and is made of plastic material. The third lens element 1230 has an object-side surface 1231 being convex in a paraxial region thereof, and an image-side surface 1232 being concave in a paraxial region thereof. Both the object-side surface 1231 and the image-side surface 1232 are aspheric, and there are one inflection point on the object-side surface 1231 and two inflection points and one critical point on the image-side surface 1232.

The fourth lens element 1240 has positive refractive power and is made of plastic material. The fourth lens element 1240 has an object-side surface 1241 being convex in a paraxial region thereof, and an image-side surface 1242 being concave in a paraxial region thereof. Both the object-side surface 1241 and the image-side surface 1242 are aspheric, and there are two inflection points on the object-side surface 1241 and two inflection points on the image-side surface 1242.

The fifth lens element 1250 has positive refractive power and is made of plastic material. The fifth lens element 1250 has an object-side surface 1251 being concave in a paraxial region thereof, and an image-side surface 1252 being convex in a paraxial region thereof. Both the object-side surface 1251 and the image-side surface 1252 are aspheric, and there are one inflection point on the object-side surface 1251 and three inflection points on the image-side surface 1252.

The filter 1260 is disposed between the fifth lens element 1250 and the image surface 1270. The filter 1260 is made of glass material and does not affect the focal length of the imaging optical lens assembly.

The detailed optical data of the 12th embodiment are shown in TABLE 23, and the aspheric surface data are shown in TABLE 24.

TABLE 23

(12th Embodiment)
f = 9.89 mm, Fno = 1.98, HFOV = 14.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.211 | | | | |
| 2 | Lens 1 | 3.021 | ASP | 2.017 | Plastic | 1.545 | 56.1 | 4.56 |
| 3 | | −10.747 | ASP | 0.111 | | | | |
| 4 | Lens 2 | 8.442 | ASP | 0.405 | Plastic | 1.639 | 23.5 | −6.68 |
| 5 | | 2.781 | ASP | 3.269 | | | | |
| 6 | Lens 3 | 6.359 | ASP | 0.335 | Plastic | 1.544 | 56.0 | −8.35 |
| 7 | | 2.601 | ASP | −0.028 | | | | |
| 8 | Stop | Plano | | 0.183 | | | | |
| 9 | Lens 4 | 3.627 | ASP | 0.361 | Plastic | 1.686 | 18.4 | 61.03 |
| 10 | | 3.811 | ASP | 0.788 | | | | |
| 11 | Lens 5 | −10.451 | ASP | 0.776 | Plastic | 1.686 | 18.4 | 21.65 |
| 12 | | −6.320 | ASP | 0.462 | | | | |
| 13 | Filter | Plano | | 0.210 | Glass | 1.517 | 64.2 | — |
| 14 | | Plano | | 0.199 | | | | |
| 15 | Image Surface | Plano | | — | | | | |

Remark: Reference wavelength is d-line 587.6 nm.
* The effective radius of Surface 8 (Stop) is 1.869 mm

TABLE 24

Aspheric Coefficient

| Surface # | 2 | 3 | 4 | 5 | 6 |
|---|---|---|---|---|---|
| k = | −3.1279E−01 | −3.3376E−01 | 4.5741E−03 | −7.2766E+00 | 1.4465E+00 |
| A4 = | 1.0754E−03 | −1.0880E−02 | −5.7215E−02 | −1.1981E−02 | −4.1908E−02 |
| A6 = | 5.9551E−05 | 1.2972E−02 | 2.7119E−02 | 4.9878E−03 | −6.2507E−02 |
| A8 = | 1.3247E−05 | −5.7982E−03 | −4.3056E−02 | 7.0751E−03 | 5.4999E−02 |
| A10 = | −3.5609E−05 | 1.5062E−03 | −2.5009E−03 | −7.1178E−03 | −3.2472E−02 |
| A12 = | 2.4684E−05 | −2.3549E−04 | 1.7136E−03 | 3.0384E−03 | 1.2353E−02 |
| A14 = | −7.2220E−06 | 2.0379E−05 | −4.5527E−04 | −6.3269E−04 | −2.7898E−03 |
| A16 = | 9.9142E−07 | −7.6225E−07 | 5.9245E−05 | 5.3341E−05 | 2.8718E−04 |
| A18 = | −5.4359E−08 | | −3.1068E−06 | | |

| Surface # | 7 | 9 | 10 | 11 | 12 |
|---|---|---|---|---|---|
| k = | −3.7926E−01 | 7.7440E−02 | 5.5210E−02 | 4.9330E−01 | −1.5936E+01 |
| A4 = | 4.5860E−03 | −3.5285E−02 | −7.7853E−02 | −1.4625E−02 | −9.2062E−01 |
| A6 = | −1.6146E−01 | −1.0596E−01 | −3.1186E−02 | 2.2041E−03 | 7.6640E−02 |
| A8 = | 1.7530E−01 | 1.5578E−01 | 7.5218E−02 | −1.8484E−02 | −5.0960E+00 |
| A10 = | −1.2289E−01 | −1.2745E−01 | −5.9592E−02 | 3.3712E−02 | 6.0053E+01 |
| A12 = | 5.6503E−02 | 7.0411E−02 | 3.0417E−02 | −2.6539E−02 | −2.2475E+02 |
| A14 = | −1.5828E−02 | −2.6446E−02 | −1.1344E−02 | 1.2025E−02 | 4.3908E+02 |
| A16 = | 2.3840E−03 | 6.4402E−03 | 3.0601E−03 | −3.4454E−03 | −5.0434E+02 |
| A18 = | −1.4559E−04 | −9.2215E−04 | −5.5476E−04 | 6.3444E−04 | 3.4024E+02 |
| A20 = | | 5.8877E−05 | 5.9197E−05 | −7.2622E−05 | −1.2266E+02 |
| A22 = | | | −2.7634E−06 | 4.6924E−06 | 1.7753E+01 |
| A24 = | | | | −1.3061E−07 | |

In the 12th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 12th embodiment, so an explanation in this regard will not be provided again.

Moreover, these parameters can be calculated from TABLE 23 and TABLE 24 and satisfy the conditions stated in the table below.

| 12th Embodiment | | | |
|---|---|---|---|
| f [mm] | 9.89 | (R5 + R6)/(R5 − R6) | 2.38 |
| Fno. | 1.99 | f/f3 | −1.18 |

-continued

| 12th Embodiment | | | |
|---|---|---|---|
| HFOV [deg.] | 14.7 | f/f4 | 0.16 |
| Nmax | 1.686 | f/f5 | 0.46 |
| Vdmin | 18.4 | (|f/f4| + |f/f5|)/|f/f3| | 0.52 |
| (Vi/Ni)min | 10.9 | ImgH/f | 0.26 |
| V4 + V5 | 36.8 | EPD/ImgH | 1.91 |
| CT4/CT1 | 0.18 | tan(FOV) | 0.56 |
| CT5/ET5 | 2.07 | f/EPD | 1.99 |
| (CT4 + T45)/CT5 | 1.48 | TL/f | 0.92 |
| (CT2 + CT3 + CT4)/T23 | 0.34 | SL/TL | 0.87 |
| T23/(T12 + T34 + T45) | 3.10 | BL/TD | 0.11 |
| (CT1 + T23)/BL | 6.07 | Y11/Y31 | 1.54 |
| (R2 + R3)/(R2 − R3) | 0.12 | Y11/Y52 | 1.03 |

13th Embodiment

Figure 13:
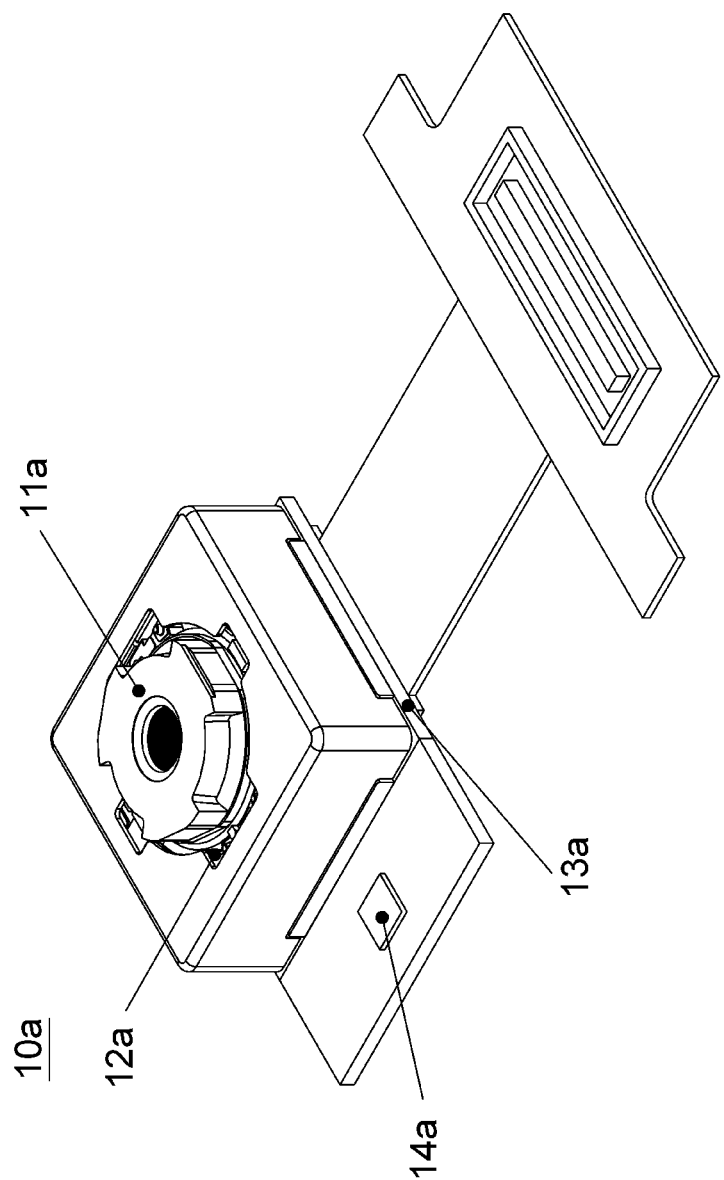
FIG. 13 is a perspective view of the imaging apparatus according to the 13th embodiment of the present disclosure.

Please refer to FIG. 13. FIG. 13 is a 3-dimensional schematic view of an imaging apparatus 10a according to the 13th embodiment of the present disclosure. In the present embodiment, the imaging apparatus 10a is a camera module. The imaging apparatus 10a includes a photographing optical lens assembly 11a, a driving device 12a, and an image sensor 13a. The photographing optical lens assembly 11a includes the imaging optical lens assembly of the 1st embodiment described above and a lens barrel (not otherwise herein labeled) for carrying the imaging optical lens assembly. The imaging apparatus 10a uses the photographing optical lens assembly 11a to allow light converging and generate an image, utilizes the driving device 12a for focusing so as to form the image on the image sensor 13a, and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the photographing optical lens assembly 11a to obtain a better imaging position, so that a clear image can be obtained wherever an imaged object is at different object distances.

The imaging apparatus 10a may be equipped with an image sensor 13a (e.g., CMOS, CCD) with high sensitivity and low noise on the image surface to provide accurate and satisfactory image quality from the photographing optical lens assembly.

In addition, the imaging apparatus 10a may further include an image stabilizer 14a, which may be a motion sensing element such as an accelerometer, a gyro sensor or a Hall Effect sensor. The image stabilizer 14a in the 10th embodiment is a gyro sensor but is not limited thereto. By adjusting the photographing optical lens assembly in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

14th Embodiment

Figure 14A:
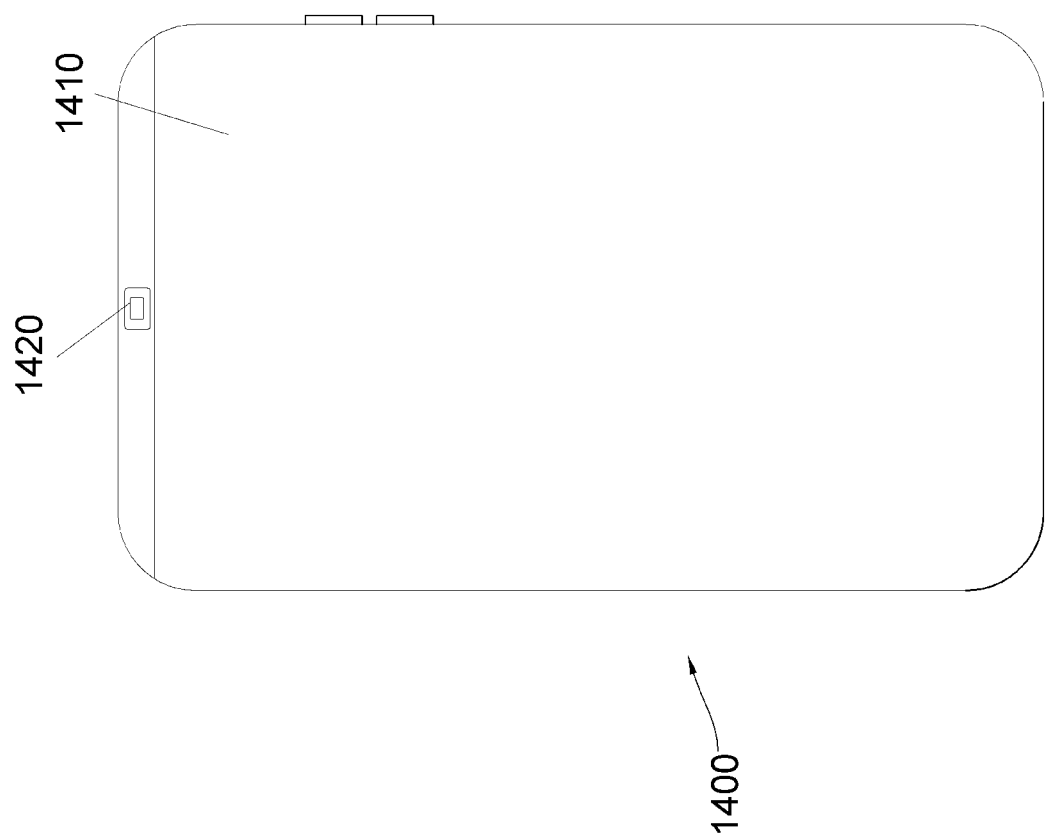
FIG. 14A is a front view of the electronic device according to the 14th embodiment of the present disclosure.
Figure 14B:
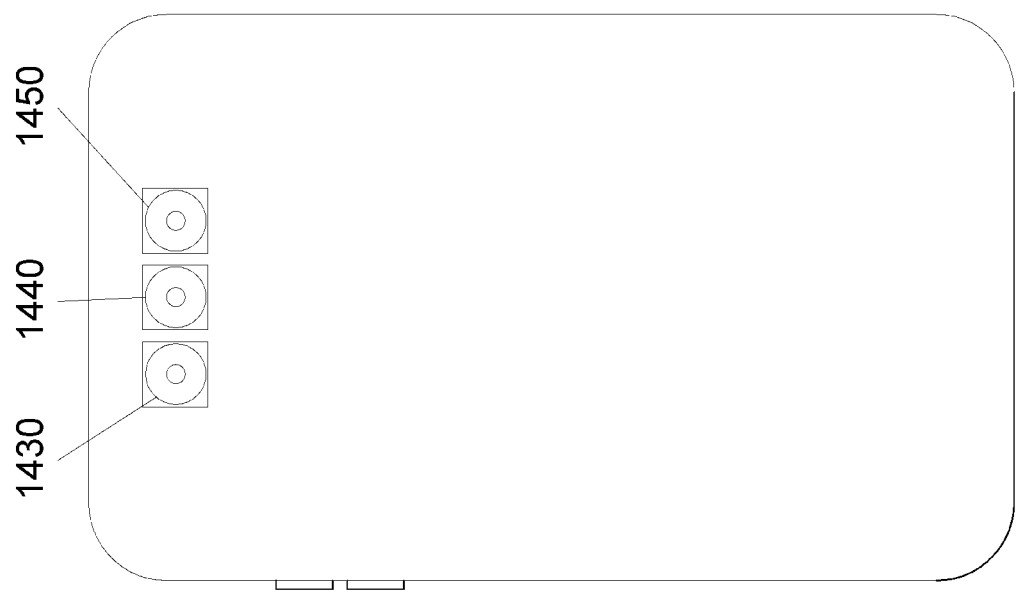
FIG. 14B is a rear view of the electronic device according to the 14th embodiment of the present disclosure.

Please refer to FIG. 14A and FIG. 14B. FIG. 14A is a front view of an electronic device 1400. FIG. 14B is a rear view of the electronic device 1400 according to the 14th embodiment shown in FIG. 14A. In the present embodiment, the electronic device 1400 is a smartphone. The front of the electronic device includes a display 1410 and an imaging apparatus 1420, wherein the imaging apparatus 1420 can be implemented by any one of the 1st embodiment to the 12th embodiment of the present disclosure and adopts a non-circular opening configuration.

As shown in FIG. 14B, the back of the electronic device 1400 includes an imaging apparatus 1430, an imaging apparatus 1440, and an imaging apparatus 1450, and the difference in the fields of view between each of the imaging apparatuses is at least 30 degrees. Among them, the imaging apparatus 1430 is a telephoto configuration, the imaging apparatus 1440 is a wide-angle configuration, and the imaging apparatus 1450 is an ultra-wide configuration.

15th Embodiment

Figure 15A:
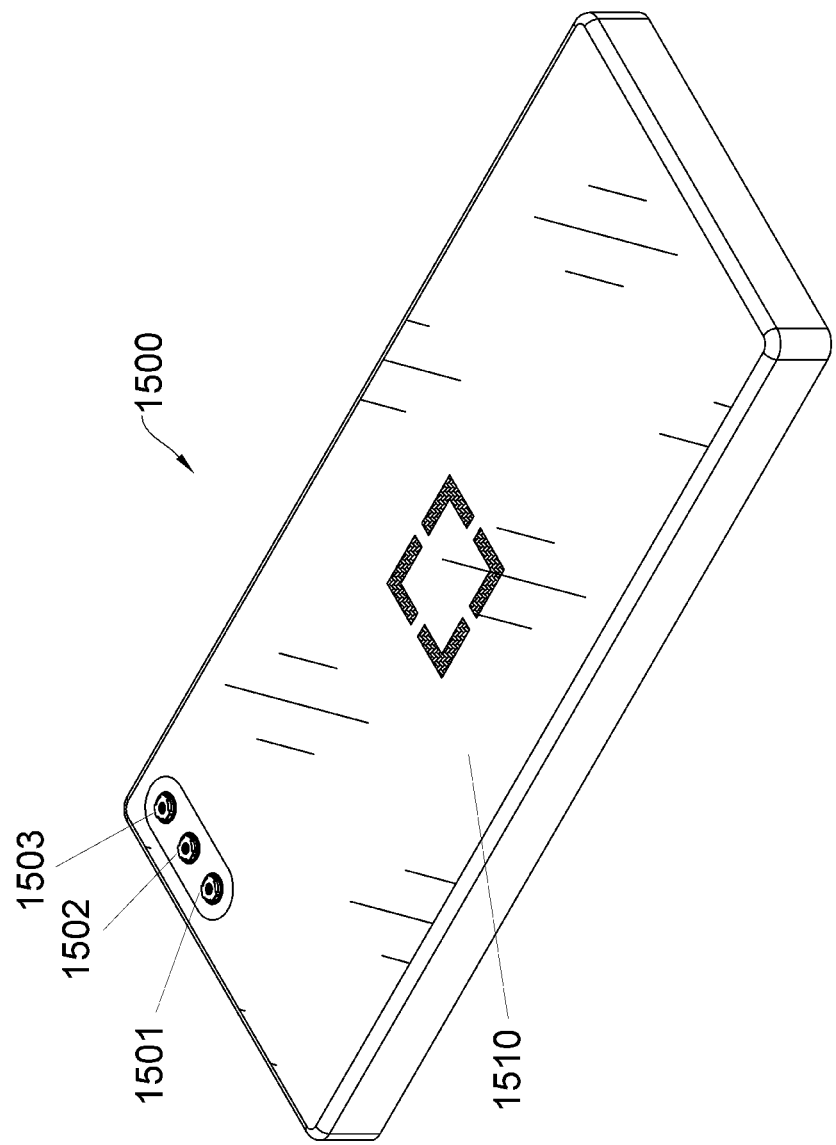
FIG. 15A is a front view of the electronic device according to the 15th embodiment of the present disclosure.
Figure 15B:
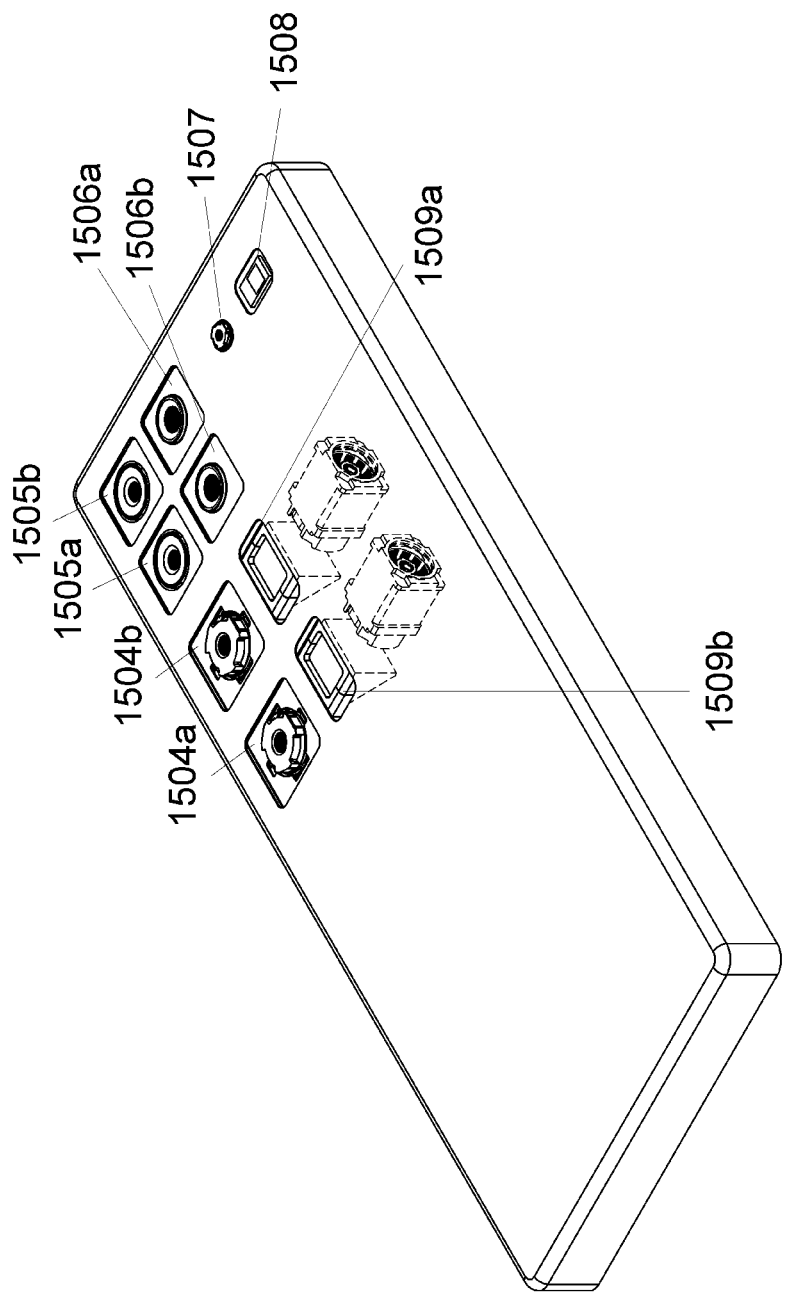
FIG. 15B is a rear view of the electronic device according to the 15th embodiment of the present disclosure.

Please refer to FIG. 15A and FIG. 15B. FIG. 15A is a front view of an electronic device 1500 according to the 15th embodiment. FIG. 15B is a rear view of the electronic device 1500 shown in FIG. 15A. In the present embodiment, the electronic device 1500 is a smartphone. As shown in FIG. 15A, the electronic device 1500 includes a display 1510, a TOF (Time of Flight) module 1501, an imaging apparatus 1502, and an imaging apparatus 1503 on the front side of the electronic device 1500. The imaging apparatus 1502 and the imaging apparatus 1503 are located above the display 1510, facing the same direction and arranged horizontally on the upper edge of electronic device 1500. The imaging apparatus 1502 is an ultra-wide angle configuration, and the imaging apparatus 1503 is a wide-angle configuration. The field of view of the imaging apparatus 1502 is larger than that of the imaging apparatus 1503 by at least 30 degrees.

As shown in FIG. 15B, the electronic device 1500 includes a TOF (Time of Flight) module 1507, a flash module 1508, an imaging apparatus 1504a, an imaging apparatus 1504b, an imaging apparatus 1505a, an imaging apparatus 1505b, an imaging apparatus 1506a, an imaging apparatus 1506b, an imaging apparatus 1509a, and an imaging apparatus 1509b on the back side of the electronic device 1500. The imaging apparatus 1504a, the imaging apparatus 1504b, the imaging apparatus 1505a, the imaging apparatus 1505b, the imaging apparatus 1506a, the imaging apparatus 1506b, the imaging apparatus 1509a, and the imaging apparatus 1509b face the same direction, and are divided into two rows vertically arranged on the back side of the electronic device 1500. The TOF (Time of Flight) module 1507 and the flash module 1508 are disposed on the upper edge of the back side of the electronic device 1500, at the proximity of the imaging apparatus 1506a. The imaging apparatuses 1505a and 1505b are ultra-wide angle configurations. The imaging apparatuses 1504a and 1504b are wide-angle configurations utilizing the imaging optical lens assembly according to the first embodiment of the present disclosure. The imaging apparatuses 1506a and 1506b are telephoto configurations. The imaging apparatuses 1509a and 1509b are telephoto configurations with non-circular openings and containing an optical element which allows directional changes of the optical path. The fields of view of the imaging apparatuses 1505a, 1505b are larger than those of the imaging apparatuses 1504a, 1504b by at least 30 degrees. The fields of view of the imaging apparatuses 1504a, 1504b are larger than those of the imaging apparatuses 1506a, 1506b, 1509a, and 1509b by at least 30 degrees.

The aforementioned electronic apparatus is merely exemplary of practical use of the present disclosure and does not limit the scope of application of the imaging apparatus of the present disclosure. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising five lens elements, the five lens elements being, in order from an object side to an image side along an optical path: a first lens element, a second lens element, a third lens element, a fourth lens element and a fifth lens element, each of the five lens elements having an object-side surface facing the object side and an image-side surface facing the image side:

wherein the first lens element has positive refractive power, the second lens element has negative refractive power, and the third lens element has negative refractive power;

wherein an axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an entrance pupil diameter of the imaging optical lens assembly is EPD, a central thickness of the first lens element is CT1, a central thickness of the fourth lens element is CT4, and the following conditions are satisfied:

$0.50 < TL/f < 1.0;$ $10.0 < V4+V5 < 45.0;$ $0.15 < T23/(T12+T34+T45);$ $0.50 < f/EPD < 2.40;$ and $0.08 < CT4/CT1 < 0.25.$ 2. The imaging optical lens assembly of claim 1, wherein the object-side surface of the fifth lens element is concave in a paraxial region thereof and the image-side surface of the fifth lens element is convex in a paraxial region thereof.

3. The imaging optical lens assembly of claim 1, wherein the object-side surface of the second lens element is convex in a paraxial region thereof and the image-side surface of the second lens element is concave in a paraxial region thereof, the axial distance between the object-side surface of the first lens element and the image surface is TL, the focal length of the imaging optical lens assembly is f, and the following condition is satisfied:

$0.60 < TL/f < 0.90.$

4. The imaging optical lens assembly of claim 1, wherein a minimum among Abbe numbers of the lens elements of the imaging optical lens assembly is Vdmin, and the following condition is satisfied:

$10.0 < Vdmin < 20.0.$

5. The imaging optical lens assembly of claim 1, wherein a maximum effective radius on the object-side surface of the first lens element is Y11, a maximum effective radius on the image-side surface of the fifth lens element is Y52, and the following condition is satisfied:

$1.0 < Y11/Y52 < 1.80.$

6. The imaging optical lens assembly of claim 1, wherein the entrance pupil diameter of the imaging optical lens assembly is EPD, a maximal image height of the imaging optical lens assembly is ImgH, and the following condition is satisfied:

$1.50 < EPD/ImgH < 3.0.$

7. The imaging optical lens assembly of claim 1, wherein the imaging optical lens assembly further comprises an aperture stop, at least one of the five lens elements has at least one inflection point, an axial distance between the aperture stop and the image surface is SL, the axial distance between the object-side surface of the first lens element and the image surface is TL, and the following condition is satisfied:

$0.75 < SL/TL < 0.92.$

8. The imaging optical lens assembly of claim 1, wherein a central thickness of the second lens element is CT2, a central thickness of the third lens element is CT3, a central thickness of the fourth lens element is CT4, the axial distance between the second lens element and the third lens element is T23, and the following condition is satisfied:

$0.05 < (CT2+CT3+CT4)/T23 < 1.10.$

9. The imaging optical lens assembly of claim 1, wherein the axial distance between the second lens element and the third lens element is a maximum among all axial distances between adjacent lens elements of the imaging optical lens assembly.

10. An imaging apparatus, comprising the imaging optical lens assembly of claim 1, a reflective element, and an image sensor.

11. An electronic device, comprising at least two imaging apparatuses disposed on the same side of the electronic device, wherein the at least two imaging apparatuses comprise:

a first imaging apparatus comprising the imaging optical lens assembly of claim 1 and a first image sensor; and a second imaging apparatus comprising an optical lens assembly and a second imager sensor;

wherein a field of view of the first imaging apparatus differs from a field of view of the second imaging apparatus by at least 30 degrees.

12. An imaging optical lens assembly comprising five lens elements, the five lens elements being, in order from an object side to an image side along an optical path: a first lens element, a second lens element, a third lens element, a fourth lens element and a fifth lens element, each of the five lens elements has an object-side surface facing the object side and an image-side surface facing the image side:

wherein the third lens element has negative refractive power; an axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the image-side surface of the fifth lens element and the image surface is BL, an axial distance between the object-side surface of the first lens element and the image-side surface of the fifth lens element is TD, a curvature radius of the image-side surface of the first lens element is R2, a curvature radius of the object-side surface of the second lens element is R3, a central thickness of the first lens element is CT1, a central thickness of the fourth lens element is CT4, and the following conditions are satisfied:

$0.50<TL/f<1.0;$ $10.0<V4+V5<45.0;$ $0.38<T23/(T12+T34+T45);$ $0.03<BL/TD<0.50;$ $-7.0<(R2+R3)/(R2-R3)<2.80;$ and $0.08<CT4/CT1<0.25.$ 13. The imaging optical lens assembly of claim 12, wherein the first lens element has positive refractive power, the object-side surface of the first lens element is convex in a paraxial region thereof, and the image-side surface of the first lens element is convex in a paraxial region thereof.

14. The imaging optical lens assembly of claim 12, wherein the second lens element has negative refractive power, a curvature radius of the object-side surface of the third lens element is R5, a curvature radius of the image-side surface of the third lens element is R6, and the following condition is satisfied:

$0<(R5+R6)/(R5-R6)<1.45.$

15. The imaging optical lens assembly of claim 12, wherein the image-side surface of the third lens element is concave in a paraxial region thereof and comprises at least one convex critical point in an off-axis region thereof.

16. The imaging optical lens assembly of claim 12, wherein a maximal image height of the imaging optical lens assembly is ImgH, the focal length of the imaging optical lens assembly is f, and the following condition is satisfied:

$0.10<ImgH/f<0.26.$

17. The imaging optical lens assembly of claim 12, wherein an absolute value of the focal length of the first lens element is a minimum among absolute values of focal lengths of the five lens elements.

18. An imaging optical lens assembly comprising five lens elements, the five lens elements being, in order from an object side to an image side along an optical path: a first lens element, a second lens element, a third lens element, a fourth lens element and a fifth lens element, each of the five lens elements having an object-side surface facing the object side and an image-side surface facing the image side:
wherein the first lens element has positive refractive power, and the third lens element has negative refractive power; an axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the fourth lens element is f4, a maximum effective radius on the object-side surface of the first lens element is Y11, a maximum effective radius on the object-side surface of the third lens element is Y31, and the following conditions are satisfied:

$0.50<TL/f<1.0;$ $10.0<V4+V5<45.0;$ $0.50<T23/(T12+T34+T45);$ $-2.0<f/f4<1.50;$ and $1.50<Y11/Y31<2.80.$ 19. The imaging optical lens assembly of claim 18, wherein the object-side surface of the first lens element is convex in a paraxial region thereof, the image-side surface of the second lens element is concave in a paraxial region thereof, the image-side surface of the third lens element is concave in a paraxial region thereof, the focal length of the imaging optical lens assembly is f, a focal length of the third lens element is f3, a maximum among refractive indices of the five lens elements of the imaging optical lens assembly is Nmax, and the following conditions are satisfied:

$-2.80<f/f3<-1.20;$ and $1.67<Nmax<1.75.$

20. The imaging optical lens assembly of claim 18, wherein the object-side surface of the fifth lens element is concave in a paraxial region thereof and the image-side surface of the fifth lens element is convex in a paraxial region thereof, the focal length of the imaging optical lens assembly is f, a focal length of the fifth lens element is f5, and the following condition is satisfied:

$-0.60<f/f5<0.80.$

21. The imaging optical lens assembly of claim 18, wherein the effective radius on the object-side surface of the first lens element is a maximum among all effective radii on the surfaces of the five lens elements.

22. An imaging optical lens assembly comprising five lens elements, the five lens elements being, in order from an object side to an image side along an optical path: a first lens element, a second lens element, a third lens element, a fourth lens element and a fifth lens element, each of the five lens elements having an object-side surface facing the object side and an image-side surface facing the image side:
wherein the first lens element has positive refractive power, the third lens element has negative refractive power, and at least one of the object-side surface and the image-side surface of the third lens element is aspherical; at least one of the five lens elements is made of plastic; and there is an air gap between each of adjacent lens elements of the five lens elements;
wherein an axial distance between the object-side surface of the first lens element and an image surface is TL, a focal length of the imaging optical lens assembly is f, an Abbe number of the fourth lens element is V4, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the fourth lens element is f4, a central thickness of the fourth lens element is CT4, a central thickness of the fifth lens element is CT5, a maximum effective radius on the object-side surface of the first lens element is Y11, a maximum effective radius on the object-side surface of the third lens element is Y31, an axial distance between the aperture stop and the image surface is SL, and the following conditions are satisfied:

$0.50 < TL/f < 1.0;$ $10.0 < V4 + V5 < 70.0;$ $0.75 < T23/(T12 + T34 + T45);$ $-2.0 < f/f4 < 2.20;$ $0.20 < (CT4 + T45)/CT5 <$ $1.50 < Y11/Y31 < 2.80;$ and $0.75 < SL/TL < 0.92.$ 23. The imaging optical lens assembly of claim 22, wherein the object-side surface of the first lens element is convex in a paraxial region thereof and the image-side surface of the first lens element is convex in a paraxial region thereof, the second lens element has negative refractive power, the image-side surface of the second lens element is concave in a paraxial region thereof, and the image-side surface of the third lens element is concave in a paraxial region thereof.

24. The imaging optical lens assembly of claim 22, wherein a central thickness of the first lens element is CT1, the axial distance between the second lens element and the third lens element is T23, an axial distance between the image-side surface of the fifth lens element and the image surface is BL, and the following condition is satisfied:

$3.50 < (CT1 + T23)/BL < 13.0.$

25. The imaging optical lens assembly of claim 22, wherein a field of view of the imaging optical lens assembly is FOV, the central thickness of the fifth lens element is CT5, a distance in parallel with the optical axis from an effective radius position on the object-side surface to an effective radius position on the image-side surface of the fifth lens element is ET5, and the following conditions are satisfied:

$0.10 < \tan(FOV) < 0.55;$ and $1.20 < CT5/ET5 < 4.50.$

26. The imaging optical lens assembly of claim 22, wherein the focal length of the imaging optical lens assembly is f, a focal length of the third lens element is f3, the focal length of the fourth lens element is f4, a focal length of the fifth lens element is f5, and the following condition is satisfied:

$(|f/f4| + |f/f5|)/|f/f3| < 1.0.$

27. The imaging optical lens assembly of claim 22, wherein an Abbe number of the first lens element is V1, an Abbe number of the second lens element is V2, an Abbe number of the third lens element is V3, the Abbe number of the fourth lens element is V4, the Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the i-th lens element is Ni, a minimum of Vi/Ni is (Vi/Ni)min, and the following condition is satisfied:

$(Vi/Ni)min < 11.2,$ wherein $i = 1, 2, 3, 4, 5.$

28. The imaging optical lens assembly of claim 22, wherein an effective radius on the object-side surface or the image-side surface of the third lens element is a minimum among effective radii on the surfaces of the five lens elements.

* * * * *